(12) United States Patent
Lewis et al.

(10) Patent No.: US 12,517,919 B2
(45) Date of Patent: Jan. 6, 2026

(54) CONTEXTUAL ORCHESTRATION AND SCOPED MEMORY PROTOCOL WITH DECENTRALIZED MEMORY WALLET FOR ADAPTIVE ARTIFICIAL INTELLIGENCE SYSTEMS

(71) Applicants: Sadeil James Lewis, Woodland Hills, CA (US); Wanda Anderson Robinson, Woodland Hills, CA (US)

(72) Inventors: Sadeil James Lewis, Woodland Hills, CA (US); Wanda Anderson Robinson, Woodland Hills, CA (US)

( * ) Notice: Subject to any disclaimer, the term of this patent is extended or adjusted under 35 U.S.C. 154(b) by 0 days.

(21) Appl. No.: 19/260,562

(22) Filed: Jul. 6, 2025

(65) Prior Publication Data

US 2025/0335458 A1 Oct. 30, 2025

Related U.S. Application Data

(63) Continuation-in-part of application No. 18/976,166, filed on Dec. 10, 2024, now Pat. No. 12,399,904, which is a continuation of application No. 18/394,157, filed on Dec. 22, 2023, now Pat. No. 12,164,537, which is a continuation-in-part of application No. 17/991,957, filed on Nov. 22, 2022, now abandoned.

(51) Int. Cl.
*G06F 16/25* (2019.01)
*G06F 16/27* (2019.01)

(52) U.S. Cl.
CPC .......... *G06F 16/252* (2019.01); *G06F 16/27* (2019.01)

(58) Field of Classification Search
CPC .................................................. G06F 16/252
USPC ......................................................... 707/827
See application file for complete search history.

(56) References Cited

U.S. PATENT DOCUMENTS

| | | | |
|---|---|---|---|
| 10,585,882 B1 * | 3/2020 | Lintilhac | G06F 16/9024 |
| 2017/0048235 A1 * | 2/2017 | Lohe | G06Q 50/01 |
| 2018/0101842 A1 * | 4/2018 | Ventura | G06Q 10/087 |
| 2018/0191503 A1 * | 7/2018 | Alwar | H04L 9/3242 |
| 2019/0207751 A1 * | 7/2019 | Harvey | H04L 67/104 |

* cited by examiner

*Primary Examiner* — Muluemebet Gurmu
(74) *Attorney, Agent, or Firm* — Edmond DeFrank

(57) ABSTRACT

The embodiments disclose a cryptographically governed system for contextual memory management in artificial intelligence including a Contextual Orchestration and Scoped Memory Protocol (COSMP) and a Decentralized Memory Wallet (DMW), which enforce secure, auditable, and policy-driven access to AI memory. Traditional token-based memory tracking is replaced by memory capsules secure data units with embedded access policies and tamper-evident logs 5400 organized via a distributed ledger. Access control is managed through decentralized identifiers (DIDs) and private cryptographic keys, ensuring that all memory interactions are signed, verifiable transactions. This architecture establishes a universal trust layer for AI, enabling post-hoc compliance checks and privacy-preserving audits. Applicable across domains such as national security, healthcare, and autonomous systems, the invention enforces rigorous behavioral constraints and access governance within AI memory and decision-making processes.

16 Claims, 55 Drawing Sheets

```
              ┌─────────┐
              │ FIG. 14 │
              └────┬────┘
                   ▼
```

1500 — A REAL ESTATE NFT MARKETPLACE THAT PROVIDES THE ASSURANCE OF IMPROVED SECURITY AND DATA INTEGRITY

1502 — USING REAL ESTATE NFTS AND YIELD INCENTIVES ACTIONS THAT INCREASE THE VALUE AND AESTHETICS OF A PLACE INCLUDING LAND, COMMUNITIES, CITIES, NEIGHBORHOODS, AND NATURAL HABITATS

1510 — THE BENEFITS OF BLOCKCHAIN AND NFT COULD PROVIDE THE CONFIDENCE BUYERS, AND SELLERS NEED FOR TRANSFERRING THEIR ASSETS

1520 — BUYERS CAN ALSO FIND OPPORTUNITIES FOR BORROWING AGAINST THEIR REAL ESTATE NFT WITH DECENTRALIZED LENDING PLATFORMS OR TRADITIONAL FINANCE SOLUTIONS ON BLOCKCHAIN

1530 — NFTS CAN ALSO SIMPLIFY THE PROCESS OF TAKING OUT LOANS ON YOUR PROPERTY

1540 — NFTS ARE UNIQUE DIGITAL ASSETS OR TOKENS FOR VIRTUAL OR PHYSICAL PROPERTY STORED ON BLOCKCHAIN NETWORKS

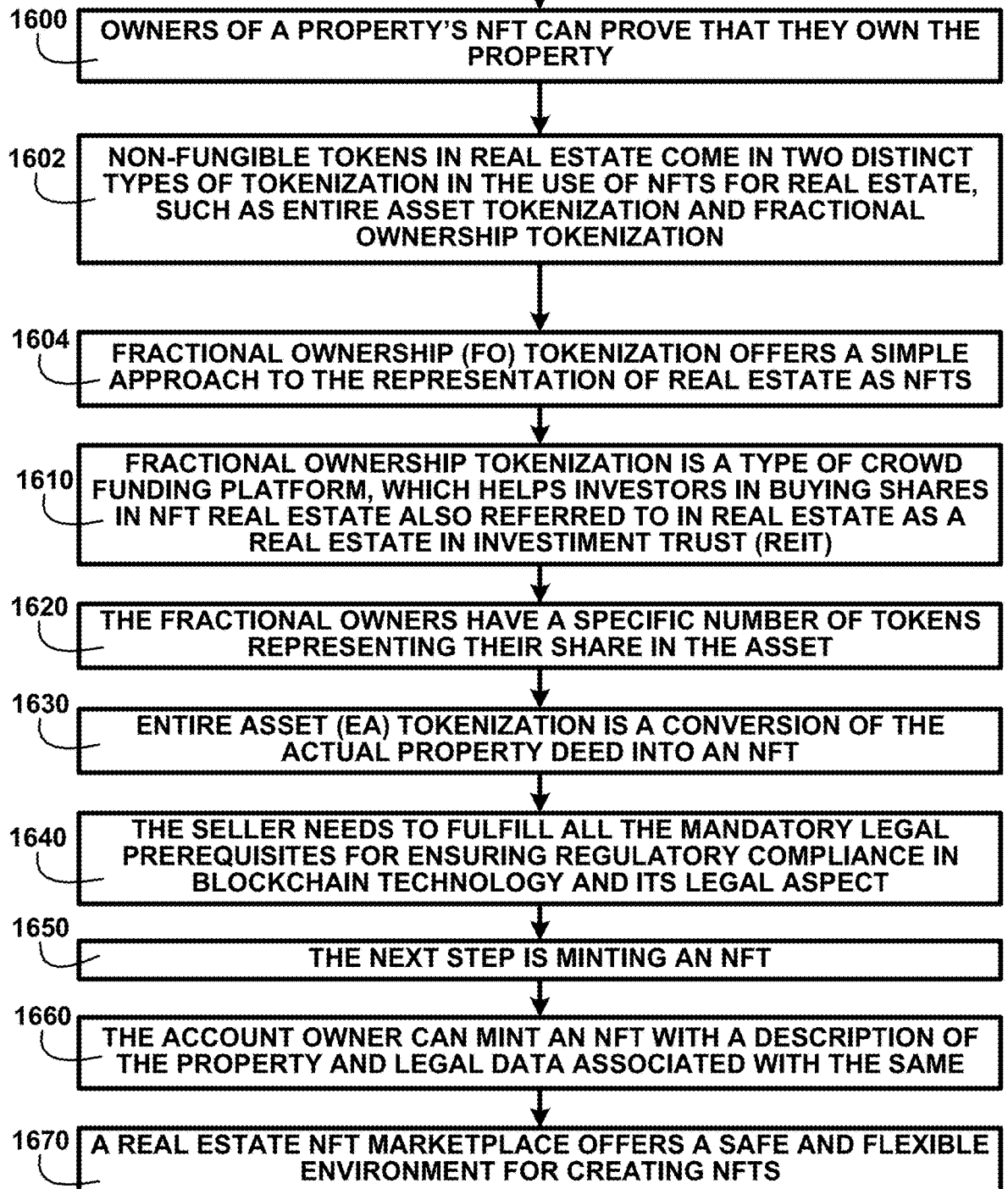

```
                    ┌─────────┐
                    │ FIG. 16 │
                    └─────────┘
                         │
                         ▼
```

1700 — THE REAL ESTATE NFT MARKETPLACE HELPS THE ACCOUNT OWNER INCORPORATE ALL THE NECESSARY PAPERWORK, REPORTS, AND DISCLOSURES FOR LEGAL AUTHORITIES TO OFFER PROOF OF OWNERSHIP

1710 — THE ACCOUNT OWNER CAN SELL THE PROPERTY'S NFT ON AN NFT MARKETPLACE TO POTENTIAL BUYERS

1720 — INTERESTED BUYERS WOULD PLACE THEIR BIDS FOR THE NFT IN ASSETS OF OWNER'S CHOICE AND PUT INTO AN ESCROW ACCOUNT

1730 — THE WINNER WOULD PAY OR SWAP FOR THE NFT IN CRYPTO OR FIAT CURRENCY OR ASSET OF OWNER'S CHOICE

1740 — ONCE THE ACCOUNT OWNER RECEIVES AN ASSET OF VALUE, THE ACCOUNT OWNER CAN INITIATE A TRANSFER OF THE NFT TO THE BUYER'S WALLET

1750 — BUYERS WOULD COMPLETE THE PAPERWORK FOR FINALIZING THE TRANSFER

1760 — IN THE END, THE BUYER GAINS COMPLETE OWNERSHIP OVER THE PROPERTY THROUGH THE NON-FUNGIBLE TOKEN REPRESENTING IT

FIG. 17

```
                    ┌─────────┐
                    │ FIG. 18 │
                    └─────────┘
                         │
                         ▼
┌──────────────────────────────────────────────────────────┐
│ THE METAVERSE AUGMENTED REALITY PROVIDES THE USER        │
│ WITH THE ABILITY TO ATTEND VIRTUAL EVENTS WITH           │── 1900
│ FRIENDS, EVEN THOUGH THE FRIENDS MAY PHYSICALLY BE       │
│                    VERY DISTANT                          │
└──────────────────────────────────────────────────────────┘
                         │
                         ▼
┌──────────────────────────────────────────────────────────┐
│ YET VIRTUALLY THE USER CAN SIT NEXT TO THOSE FRIENDS     │── 1901
│ AT A CONCERT, HEAR THE MUSIC, LOOK AROUND AT OTHER       │
│                   PARTICIPANTS                           │
└──────────────────────────────────────────────────────────┘
                         │
                         ▼
┌──────────────────────────────────────────────────────────┐
│ THE VIRTUAL EXPERIENCE WILL FEEL LIKE PHYSICALLY         │── 1902
│ SHARING THE SAME EXPERIENCE WITH TICKETS PURCHASED       │
│              WITH VIRTUAL DIGITAL CURRENCIES             │
└──────────────────────────────────────────────────────────┘
                         │
                         ▼
┌──────────────────────────────────────────────────────────┐
│ THE USER CAN VIEW AND PURCHASE BRANDS OF GOODS           │
│ AND SERVICES WITHIN AN AUGMENTED REALITY 3D VIRTUAL      │
│ ENVIRONMENT, ABLE TO VIRTUALLY SIT ON A SOFA AND SEE     │── 1910
│ HOW IT WOULD LOOK IN THEIR LIVING ROOM, MANIPULATE       │
│ TOOLS, VIEW AND PARTICIPATE IN COOKING                   │
│ DEMONSTRATIONS, HAVE VERBAL DISCUSSIONS WITH A           │
│ SALESPERSON FACE TO FACE VIRTUALLY, THEN VISIT FOR       │
│ EXAMPLE A COMPETING BRAND TO MAKE VIRTUAL HANDS-         │
│                   ON COMPARISONS                         │
└──────────────────────────────────────────────────────────┘
                         │
                         ▼
┌──────────────────────────────────────────────────────────┐
│ THE USER CAN COLLECT NFTS REPRESENTED WITH A             │── 1920
│ CERTIFICATE OF AUTHENTICITY FOR A DIGITAL GOOD FOR       │
│              OWNING UNIQUE DIGITAL ASSETS                │
└──────────────────────────────────────────────────────────┘
                         │
                         ▼
┌──────────────────────────────────────────────────────────┐
│ NFTS CAN INCLUDE WORKS OF ART, DIGITAL OBJECTS AND       │── 1930
│            VIRTUAL AND PHYSICAL REAL ESTATE              │
└──────────────────────────────────────────────────────────┘
                         │
                         ▼
┌──────────────────────────────────────────────────────────┐
│ NFTS CAN INCLUDE UNIQUE VIRTUAL COLLECTIBLES AND         │── 1940
│ HAVE THEM DIGITALLY SIGNED BY A MEMBER OF THE MOVIE      │
│ CAST, BAND MEMBER, ATHLETE OR OTHER CELEBRITY            │
└──────────────────────────────────────────────────────────┘
                         │
                         ▼
                    ┌─────────┐
                    │ FIG. 20 │
                    └─────────┘
```

FIG. 19

```
                    ┌─────────┐
                    │ FIG. 23 │
                    └─────────┘
                         │
                         ▼                                    2400
┌─────────────────────────────────────────────────────────────────┐
│   EACH ASSET WITHIN AN ABT MAY HAVE DIFFERENT ATTRIBUTES,       │
│ CHARACTERISTICS, TYPE, VALUE, OR UTILITIES AND CAN BE FRACTIONALIZED │
│   OR COMBINED BY ITS FEATURES AND/OR EACH ASSET WITHIN THE ABT  │
└─────────────────────────────────────────────────────────────────┘
                         │
                         ▼                                    2410
┌─────────────────────────────────────────────────────────────────┐
│  THOSE ASSETS CAN BE A PRODUCT, CURRENCY, SERVICE, SPECIMEN, ENTITY, │
│                  AND/OR ANYTHING OF VALUE                       │
└─────────────────────────────────────────────────────────────────┘
                         │
                         ▼                                    2420
┌─────────────────────────────────────────────────────────────────┐
│   AN ASSET CREATOR CAN INCREASE THE VALUE OF AN ABT BY ADDING   │
│         ADDITIONAL ASSETS TO AN ASSET BOUND TOKEN               │
└─────────────────────────────────────────────────────────────────┘
                         │
                         ▼                                    2430
┌─────────────────────────────────────────────────────────────────┐
│ ASSET OWNERS WITHIN AN ECOSYSTEM MAY BE ABLE TO EXCHANGE THOSE  │
│  INDIVIDUAL ASSETS IN AN ASSET BOUND TOKEN WITH EACH OTHER      │
│  ALLOWING USER TO RECOMPOSE THEIR OWNED ASSETS SUCH AS ART (NOT │
│                       LIMITED TO ART)                           │
└─────────────────────────────────────────────────────────────────┘
                         │
                         ▼                                    2440
┌─────────────────────────────────────────────────────────────────┐
│ ABT CREATORS, OWNERS, SERVICING ENTITIES, AND/OR USERS RECEIVE YIELD │
│          FROM EACH TRANSACTION WHEN ASSET IS UTILIZED           │
└─────────────────────────────────────────────────────────────────┘
                         │
                         ▼                                    2450
┌─────────────────────────────────────────────────────────────────┐
│ USERS WHO RECEIVE YIELD CAN SELECT TO HAVE THEIR YIELD DONATED TO │
│ OFFSET PAYMENTS OR TRANSACTION FEES IN A FAVORABLE MANNER FOR   │
│    USERS USING THE ASSET MANAGEMENT SOCIAL PAYMENT TOOL         │
└─────────────────────────────────────────────────────────────────┘
                         │
                         ▼                                    2460
┌─────────────────────────────────────────────────────────────────┐
│           YIELD IS PROVIDED VIA SMART CONTRACTS                 │
└─────────────────────────────────────────────────────────────────┘
                         │
                         ▼                                    2470
┌─────────────────────────────────────────────────────────────────┐
│    YIELD CAN GO TOWARD OTHER SERVICES, UTILITIES, PRODUCTS OR   │
│  INVESTMENTS (NOT LIMITED) WITHIN THE ASSET MANAGEMENT SYSTEM   │
└─────────────────────────────────────────────────────────────────┘
                         │
                         ▼
                    ┌─────────┐
                    │ FIG. 25 │
                    └─────────┘
```

2500
THIS BLOCKCHAIN ASSET MANAGEMENT SYSTEM REPRESENTS THE NEW INTERNET OF VALUE AND GIVE ALL USERS ON THE NETWORK A UNIQUE EXPERIENCE EXCHANGING VALUE AND CHANGING THE WAY USERS OF A SOCIAL NETWORK COMMUNICATE AND COLLABORATE WITH EACH OTHER

↓

2510
ASSET BOUND TOKENS FACILITATE MARKET LIQUIDITY, BETTER PRICE VALUATIONS, DEMOCRATIZATION, INCREASED INCLUSION, AND MARKET PARTICIPATION

↓

2520
ABTS GIVES THE OPPORTUNITY TO THE AVERAGE PERSON TO PURCHASE HIGH VALUE ASSETS IN FRACTIONALIZED FORM AND SWAP DIFFERENT FEATURES TO INCREASE RARITY AND VALUE AND/ OR CHANGE, MODIFY AND COMBINE ATTRIBUTES

↓

2530
AN ABT WITH A LOW RANK AND RARITY CAN BECOME A 1 OF 1 AND/ OR HIGH RANK AND RARITY IF USERS EXCHANGES ASSETS WITHIN ABT ACCORDINGLY

↓

2540
DIFFERENT PARTS OF THE FRACTIONALIZED ABT HAVE DIFFERENT RARITIES AND ATTRIBUTES ALLOWING A USER TO TRADE OR BUY TO INCREASE THEIR RARITY AND VALUE

↓

2550
(BUY EXCHANGE SWAP AND UPDATE DATA, ATTRIBUTES AND/OR ART LAYERS) A VERIFIED CREATOR CAN MAKE AN ABT WITH PRODUCTS FROM OTHER ABT ENTITIES(COMPANIES WITH PHYSICAL AND DIGITAL ASSETS AND SERVICES) ON THE ABT PLATFORM WITHOUT PURCHASING THEM AND OFFER THEM FOR SALE

↓

2560
USING SMART CONTRACTS WHEN THOSE ABTS (GROUP OF ASSETS SOLD AS A BUNDLE) ARE SOLD THEN THE SMART CONTRACT WILL AUTOMATICALLY PURCHASE FROM ABT ENTITIES AND SENT TO BUYER

FIG. 25

CONTEXTUAL ORCHESTRATION AND SCOPED MEMORY PROTOCOL WITH DECENTRALIZED MEMORY WALLET FOR ADAPTIVE ARTIFICIAL INTELLIGENCE SYSTEMS

CROSS REFERENCE TO RELATED PATENTS AND APPLICATIONS

This Patent Application is a Continuation-in-Part of United States Patent Application entitled: "DATABASE AND FILE MANAGEMENT TRANSACTION TRACKING SYSTEM", U.S. Ser. No. 18/976,166 filed on Dec. 10, 2024, by Sadeil James Lewis, which is a Continuation of United States Patent Application entitled: "DATABASE AND FILE MANAGEMENT TRANSACTION TRACKING SYSTEM", U.S. Ser. No. 18/394,157 filed on Dec. 22, 2023, by Sadeil James Lewis, which is a Continuation in-part of United States Patent Application entitled: "STAKED ACCOUNT PAYMENT PROCESS AND DEVICES", U.S. Ser. No. 17/991,957 filed on Nov. 22, 2022, by Sadeil James Lewis, which all of the above are incorporated herein by reference.

BACKGROUND

As AI systems become increasingly autonomous and integrated into critical domains, ensuring trust, accountability, and compliance in their operation has become a paramount challenge. A key shortcoming in the state of the art is the lack of memory integrity and verifiable decision traceability. Current AI architectures typically either (1) rely on ephemeral context windows that discard or overlook the provenance of information once used, or (2) utilize centralized memory stores with ad-hoc access controls and no cryptographic verification. In either case, it is difficult to prove with mathematical certainty how an AI system accessed specific information, why it made a particular decision, and whether it respected all operational constraints during that process. The absence of such proof undermines trust in AI across industries like national security (e.g., intelligence analysis or autonomous defense systems), healthcare (e.g., diagnostic AI respecting patient privacy), finance (AI-driven trading under regulatory compliance), and any field where AI decisions have significant consequences. Without memory integrity and granular oversight, AI behavior remains a "black box," forcing stakeholders to choose between blind trust or crude after-the-fact monitoring. This gap poses serious security and safety risks, as unaccountable AI behavior can lead to undetected bias, data misuse, or even life-threatening errors with no traceable rationale.

SUMMARY OF THE INVENTION

This invention discloses a cryptographically enforced memory management architecture for artificial intelligence (AI) systems. It comprises a Memory Wallet (DMW) to ensure that every AI memory access is controlled, minimal, and auditable. Memory capsules secure data containers with embedded access rules and tamper-evident logs 5400 replacing traditional token records, evolving the prior token-tracking database into a distributed ledger of verifiable AI knowledge. Private cryptographic keys and decentralized identifiers (DIDs) serve as credentials that gate access to memory capsules and orchestrate AI behavior according to policy. Every memory operation or decision by an AI agent becomes a signed transaction recorded on an immutable ledger, enabling after-the-fact verification and compliance checks via cryptographic proofs. The architecture provides a universal trust and governance layer for AI, applicable to domains ranging from national security and healthcare to autonomous systems, by enforcing rigorous access control, behavioral constraints, and privacy-preserving auditability within the AI's memory and decision processes. The system is specifically designed to integrate with and enhance Large Language Models (LLMs), transformer-based AI models, and other intelligence systems.

It is understood throughout this specification that the "AI agent", "AI system", or "Agent" with which the Decentralized Memory Wallet (DMW) interacts is broadly construed to include, but not be limited to, individual AI agents, Large Language Models (LLMs), Transformer networks, neural networks, expert systems, AI inference systems, generative models, adaptive agents, and other forms of artificial intelligence capable of processing and generating information. The DMW's function is to provide a cryptographically enforced memory management architecture for any such AI entity, enabling secure, auditable, and context-aware memory utilization.

BRIEF DESCRIPTION OF THE DRAWINGS

FIG. 15 shows a block diagram of an overview of a real estate NFT marketplace of one embodiment.

FIG. 16 shows a block diagram of an overview of fractional ownership of one embodiment.

FIG. 17 shows a block diagram of an overview of selling the property's NFT of one embodiment.

FIG. 19 shows a block diagram of an overview of attending virtual events of one embodiment.

FIG. 24 shows a block diagram of an overview of ABT features of one embodiment.

FIG. 25 shows a block diagram of an overview of asset bound tokens that facilitate market liquidity of one embodiment.

DETAILED DESCRIPTION OF THE INVENTION

Figure 1:
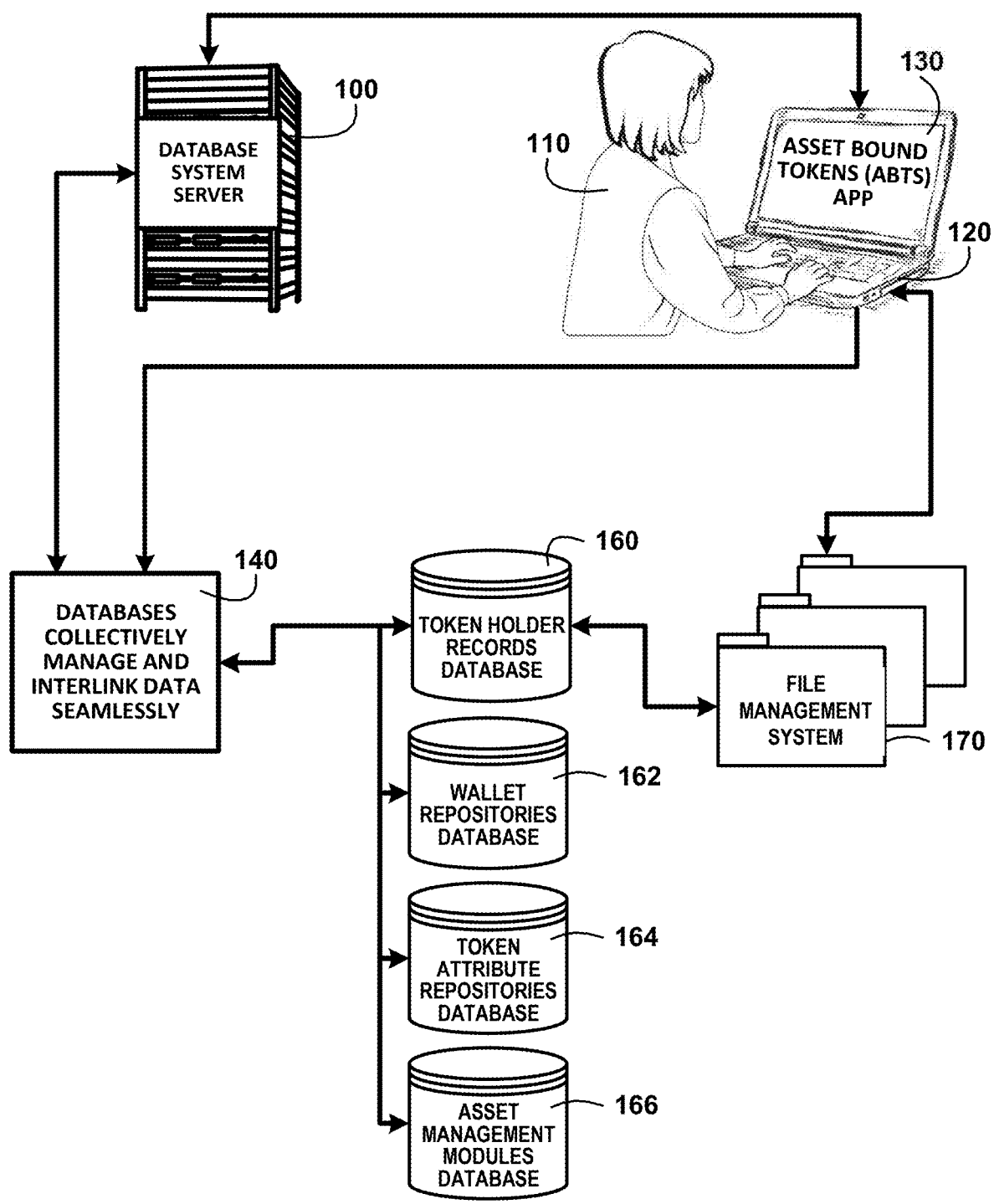
FIG. 1 shows for illustrative purposes only an example of a database system server of one embodiment.

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

It should be noted that the descriptions that follow, for example, in terms of a contextual orchestration and scoped memory protocol with decentralized memory wallet for adaptive artificial intelligence systems is described for illustrative purposes and the underlying system can apply to any number and multiple types cryptographically governed systems. In one embodiment of the present invention, the contextual orchestration and scoped memory protocol with decentralized memory wallet for adaptive artificial intelligence systems can be configured using contextually orchestrating AI memory access.

The contextual orchestration and scoped memory protocol with decentralized memory wallet for adaptive artificial intelligence systems can be configured to include enforcing behavioral constraints and can be configured to include decentralized identity and ledger techniques using the present invention.

Ensuring user sovereignty and addressing evolving privacy in the age of AI. In the rapidly evolving landscape of artificial intelligence, particularly with the proliferation of highly personalized AI systems, the traditional definition of privacy has undergone a fundamental shift. Users frequently contribute vast amounts of structured data, often comprising complete memories, experiences, and contextual information about their lives, to facilitate personalized AI interactions. While this data is crucial for AI to operate effectively in a personalized manner, the increasing volume and intimacy of shared information raise significant concerns regarding user data sovereignty and the potential for unintended consequences as AI systems gain deeper contextual understanding of individuals.

The present invention, through the Contextual Orchestration and Scoped Memory Protocol (COSMP) and the Decentralized Memory Wallet (DMW), directly addresses this critical inflection point. A core principle of the DMW is to keep human users firmly in the loop, providing them with unprecedented sovereignty over their data. Unlike traditional models where user data resides with third parties, the decentralized nature of the DMW places the responsibility and control of personal data directly with the user. This empowers individuals to grant granular, auditable permissions to AI systems (including AI agents, LLMs, Transformers, etc.) for accessing specific memory capsules from their DMW, while retaining fundamental ownership and control over their complete personal data landscape. This methodology ensures that users can selectively share the necessary context for personalized AI operation without ceding full contextual control of their lives, thereby redefining privacy in an AI-driven world by putting the user at the center of the data governance model.

Cybersecurity features and architectures of the decentralized memory wallet system. The disclosed system fundamentally incorporates advanced cybersecurity principles as an integral part of its design, ensuring the integrity, confidentiality, and availability of AI memory and operational processes. The cryptographically enforced memory management, as described, serves as a pervasive security layer.

In one embodiment, the system addresses a plurality of cybersecurity threat models through its architectural components: Data Confidentiality and Exfiltration Prevention: Memory capsules, being secure data containers with embedded access rules, cryptographically prevent unauthorized access to sensitive AI memory content. The requirement for private cryptographic keys and Decentralized Identifiers (DIDs) to gate access ensures that only authorized AI agents, LLMs, Transformer networks, or other DMWs, as per defined policies, can decrypt or access the contents of a memory capsule, thereby mitigating data exfiltration risks.

Integrity and Tampering Prevention: Every memory operation or decision by an AI entity (e.g., an AI agent, an LLM generating a response, or a Transformer processing data) is recorded as a signed transaction on an immutable ledger. This distributed ledger of verifiable AI knowledge provides a tamper-evident and auditable history of all memory interactions. Any attempted alteration of memory contents or operational logs would be immediately detectable through cryptographic verification, thus protecting against data integrity attacks.

Authentication and Authorization: The reliance on private cryptographic keys and DIDs as credentials provides strong authentication for AI entities (e.g., AI agents, LLMs, Transformer models) and memory wallet nodes. Access to memory capsules and orchestration of AI behavior are strictly controlled by rigorous access policies enforced through these cryptographic credentials. This ensures that only authorized entities can interact with the AI's memory and human user's memory.

Privacy-Preserving Auditability: The system's capability to generate zero-knowledge proofs (as elaborated in claim 14 of the parent application) allows for the demonstration of compliance with privacy regulations, usage policies, or contractual data handling requirements without revealing the data content of the memory data. This mechanism provides a crucial layer of security, enabling necessary oversight and accountability without compromising sensitive information.

Resilience and Decentralization: The architecture, particularly the use of a Decentralized Memory Wallet (DMW), inherently promotes resilience against certain forms of attack, such as single points of failure by distributing memory.

In an embodiment, the system's enforcement of rigorous access control and behavioral constraints within the AI's memory and decision processes provides a robust defense-in-depth strategy. Each layer, from the cryptographic encapsulation of memory capsules to the auditable ledger and real-time policy enforcement, contributes to a comprehensive cybersecurity posture for adaptive AI systems, including those leveraging LLMs and Transformer architectures.

A foundational aspect of the Decentralized Memory Wallet (DMW) system, in numerous embodiments, is the primary role of human operators in managing, configuring, and overseeing the DMWs and the AI systems they govern. The DMW is designed as a secure, auditable interface that empowers human users to maintain control and accountability over the AI's memory and behavior, rather than functioning as a fully autonomous entity. This human-in-the-loop design is a key differentiator, explicitly addressing the need for user sovereignty over data in an AI-driven world.

In one embodiment, human users or administrators are the principal controllers and interactors with the Decentralized Memory Wallets. This human operational control encompasses, but is not limited to, the following critical functions: Human operators are solely responsible for provisioning and initializing new DMWs. This includes generating or securely managing the foundational cryptographic keys and Decentralized Identifiers (DIDs) that define the DMW's identity and its initial operational parameters.

All access policies, rules for memory capsule creation and deletion, and conditions for data sharing and behavioral constraints for the associated AI systems are defined, modified, and enforced by human operators. These policies dictate how the AI can access, utilize, and interact with its memory. As described in claim 15 of the parent application, the "tightly scoped permissions" for memory capsule sharing are explicitly set by human administrators. Any alteration to these policies by a human operator is recorded as a signed transaction on the immutable ledger, ensuring a transparent and auditable record of human governance decisions.

The DMW's ability to adapt its operational mode based on a "dynamic context" (as detailed in claim 15 of the parent application) is directly influenced by human input. Specifically, the "user command" mentioned in claim 15 refers to explicit instructions or configurations provided by a human operator. For example, a human may command the DMW to transition from a private mode to a sharing mode for specific memory capsules, or to impose new restrictions in response to an emergency state or a change in operational requirements.

This mechanism ensures direct human control over the AI's memory behavior. Human auditors and administrators leverage the system's cryptographic proofs (claim 14 of the parent application) and the immutable ledger to continuously monitor and verify the AI's memory access history, its adherence to predefined policies, and its compliance with external regulations (e.g., privacy regulations, usage policies, or contractual data handling requirements).

This provides an unparalleled level of human oversight and accountability for the AI's operations and memory utilization. While AI systems generate and utilize memory capsules, human operators, in certain embodiments, exercise direct control over the lifecycle of these capsules.

This includes approving the instantiation of certain types of memory capsules, defining the metadata and embedded access rules for new capsules, and authorizing their archiving or deletion based on data retention policies or operational needs. The secure "wallet to wallet" interactions (as detailed in Section 5 below) that enable the formation of "hive data" are ultimately initiated and authorized by human operators. For instance, a human administrator of an organization may explicitly grant permissions for their organization's DMWs to share specific, anonymized memory capsules with DMWs belonging to a trusted partner entity, meticulously defining the scope and conditions of such collaborative data exchange.

To facilitate the multifaceted human control and interaction with DMWs, the system supports various types of interfaces. In various embodiments, human users interact with their DMW through: Web-based dashboards: Providing graphical user interfaces accessible via web browsers for comprehensive DMW management. Mobile/desktop applications: Dedicated applications offering user-friendly interfaces for on-the-go or local DMW control. Browser extensions: Allowing for seamless interaction with DMW functionalities directly within a web Browse environment. Command-line interfaces (CLIs): Providing powerful, scriptable access for advanced users and developers. Hardware wallet interfaces: Enabling the use of physical hardware devices for enhanced security in cryptographic key management and transaction signing.

API integration: Offering programmatic access for developers to build custom applications and integrations that leverage DMW functionalities. Most DMW systems are designed to provide both user-friendly graphical interfaces for everyday users and robust API access for developers, ensuring broad accessibility while maintaining the decentralized, user-controlled nature of the technology. By utilizing decentralized ledger technology and implementing robust management functions, the system can maintain operational continuity and data integrity even in the event of partial network disruption.

This pervasive human-in-the-loop operational model ensures that the Decentralized Memory Wallet serves as a robust and accountable tool for human governance, ethical control, and dynamic adaptation of sophisticated AI systems. The decentralized architecture further empowers individual human operators or organizations with sovereign control over their AI's memory, reducing reliance on centralized intermediaries. The Decentralized Memory Wallet (DMW) methodology directly addresses the critical challenge of "data bloat" faced by Large Language Models (LLMs) and Transformer networks, transforming what was once a liability into a sustainable and efficient approach to AI memory management.

Data bloat represents a significant problem where excessive training data, often characterized by redundancy, low quality, and diminishing returns, leads to computational inefficiencies, performance degradation, infrastructure bottlenecks, and fundamental technical limitations for large-scale AI models. The DMW provides a novel solution to data bloat by changing the paradigm from training on vast, static datasets to dynamically accessing highly curated, context-specific data upon request. This is achieved by requiring AI agents, LLMs, and Transformer networks to plug into or access data from DMWs rather than being perpetually trained on ever-growing, unwieldy datasets.

In one embodiment, the DMW's role in mitigating data bloat includes: Instead of LLMs and Transformers being trained on vast, often redundant corpora (where, as research indicates, a single sentence can appear tens of thousands of times or where 14.4% of validation sets contain approximate duplicates), the DMW allows these models to access highly curated, deduplicated, and quality-controlled memory capsules. Human operators, through their DMWs, can ensure that only high-quality, non-redundant data is made available for specific AI tasks, leading to more efficient learning and reducing the risk of memorization of repetitive or copyrighted content.

This approach aligns with data-centric AI principles, where careful curation can achieve significant compute savings while maintaining or improving model performance. Current LLM training costs are astronomical, with computations scaling directly with data volume. The DMW enables a shift from brute-force data consumption during pre-training to on-demand, context-relevant data retrieval during inference or fine-tuning. By accessing only, the necessary, precisely scoped memory capsules from DMWs, AI models reduce the computational overhead associated with processing vast, irrelevant data.

This prevents "catastrophic overtraining" and ensures that models operate closer to compute-optimal data-to-parameter ratios, leading to more efficient resource utilization and avoiding the severe diminishing returns associated with pushing beyond optimal data volumes. The quadratic scaling of attention mechanisms and stringent memory limitations in Transformers contribute to infrastructure strain. By allowing LLMs and Transformers to access data from DMWs on a "just-in-time" basis, rather than requiring massive local storage and processing of entire datasets, the DMW alleviates memory and computing bottlenecks.

The system's ability to provide relevant "memory capsules" on demand circumvents the need for enormous context windows that lead to "lost in the middle" phenomena, thereby improving inference efficiency and scalability without incurring the traditional costs of vast training data. A significant problem in AI evaluation is benchmark contamination, where test data inadvertently leaks into training sets, creating an illusion of capability.

The DMW, with its cryptographically enforced access control and auditable memory management, provides a robust mechanism to prevent such contamination. By segregating training data from operational memory capsules managed by DMWs and allowing only sanctioned access, the integrity of AI evaluations can be preserved, ensuring that reported performance reflects genuine capabilities rather than memorization. By centralizing data responsibility with the user via the Decentralized Memory Wallet, and by enabling AI agents, LLMs, and Transformers to dynamically access precise, high-quality, and contextually relevant memory capsules, this methodology offers a powerful solution to the data bloat problem.

This paradigm shift supports the sustainability, reliability, and ethical development of advanced AI systems, emphasizing intelligent data practices over unconstrained data accumulation. The architecture of the Decentralized Memory Wallet (DMW) and its associated protocols facilitate secure and controlled "wallet to wallet" interactions, enabling the formation and utilization of collective intelligence, herein referred to as "hive data."

These interactions are, in numerous embodiments, primarily initiated and governed by the human operators of the respective DMWs, representing a fundamental shift in how collective knowledge is aggregated and leveraged. In one embodiment, a "wallet to wallet" interaction refers to the secure exchange or sharing of specified memory capsules between two or more distinct Decentralized Memory Wallets, each associated with an AI entity, a human user, or a group thereof. As described in claim 15 of the parent application, the memory wallet can transition its operation mode to allow for such sharing under tightly scoped permissions, typically as authorized by a human operator.

This capability, when authorized by human operators, enables the following scenarios: When a predetermined condition (e.g., a collaborative task requirement, a system-wide update, or a user command from a human operator) is detected, a DMW can transition to a mode where specific, pre-authorized memory capsules can be made available to external AI entities (e.g., other AI agents, LLMs, Transformer networks), other DMWs, or directly to other human users.

This sharing is not a simple data transfer but a controlled access mechanism where the recipient's credentials and permissions are verified against the embedded access rules of the memory capsule and the prevailing access policies, all ultimately configured by human operators. The ability for multiple AI entities, each managing its own memory through a DMW, to securely share relevant and permissible memory capsules (as authorized by human operators), leads to the emergence of an AI-driven collective intelligence or "hive data."

This "hive data" comprises a distributed knowledge base or shared understanding that is built from the authorized contributions of individual AI entities. Each DMW contributes contextually relevant and authorized memory segments to a larger, shared pool of verifiable AI knowledge, without compromising the privacy or integrity of the individual's DMW and/or AI's memory. This collective intelligence remains auditable back to its DMW sources. In a network of specialized LLMs, each DMW associated with an LLM, under the guidance of its human operator, could share memory capsules containing anonymized and verified factual knowledge, specific domain expertise, or learned conversational patterns with other LLMs' DMWs.

This collective contribution forms a "hive data" of refined knowledge, allowing the entire system of LLMs to improve their accuracy and breadth of understanding, while maintaining an auditable trail of shared information and human authorization. In a complex analytical task, different Transformer networks, each fine-tuned for a particular data modality or analytical sub-task, can utilize their DMWs (as configured by their human operators) to share intermediate findings or learned insights in the form of memory capsules.

For instance, one Transformer's DMW might share securely verified feature embeddings, while another's DMW provides cryptographically attested contextual summaries. This secure, "wallet to wallet" exchange facilitates a collective problem-solving approach, where the combined knowledge from multiple DMWs forms a richer "hive data" for comprehensive analysis, with each exchange auditable to its human authorization. In a decentralized cybersecurity system, individual AI agents or specialized LLMs/Transformers monitoring distinct network segments could use their DMWs (under human operator control) to share anonymized threat indicators or detected anomalies as memory capsules.

This real-time, secure "wallet to wallet" sharing, specifically authorized by relevant human security personnel, enables a "hive data" of collective threat intelligence, allowing for rapid and coordinated responses to emerging cyber threats across a broader infrastructure. Critically, the DMW also enables an inversion of the typical data flow, allowing human users to come together collectively through their own DMWs to achieve or gain new types of insights based on their shared knowledge. In this embodiment, human operators directly leverage their DMWs to contribute specific, authorized memory capsules to a communal, cryptographically secured "hive data" pool.

This collective intelligence is generated directly by human contributions, rather than solely by AI systems. Individual human users, each with their own DMW, could opt to share anonymized and compliance-verified memory capsules relating to their health experiences, treatment outcomes, or lifestyle data. A collective "hive data" could then be formed from these authorized human contributions, allowing medical AI or other human researchers to derive population-level insights or identify patterns (e.g., efficacy of specific treatments, prevalence of side effects) without compromising individual privacy. The human users retain full control over which specific, anonymized memory capsules they contribute to this collective. Groups of human users with shared interests or professional domains could collaboratively build a "hive data" of specialized knowledge. Each participant could securely contribute and verify memory capsules containing their expertise, research findings, or practical experiences.

This creates a decentralized, verifiable knowledge repository that is collectively owned and governed by its human contributors, accessible by AI or other humans under human-defined permissions, leading to novel insights or faster problem-solving within the community. In a disaster response scenario, individual citizens, emergency personnel, or community organizers could contribute geolocated observations, status updates, or needs assessments as cryptographically signed memory capsules from their DMWs.

This forms a real-time, verifiable "hive data" of the situation, enabling more effective human coordination and resource allocation, and providing AI assistance with highly accurate, human-verified context. The immutability of transactions on the audit ledger, as previously described, extends to these "wallet to wallet" sharing events, providing a verifiable record of all contributions to the collective intelligence, including the authorization by human operators. Furthermore, the use of zero-knowledge proofs (claim 14 of the parent application) can be applied to verify the properties of shared data within the "hive" without exposing the underlying sensitive information, thus preserving privacy within the collective knowledge base.

This controlled, auditable, and human-authorized sharing ensures that the "hive data" is both robust and compliant with relevant policies and regulations, whether the contributors are AI entities or human users. The Decentralized Memory Wallet (DMW) is designed to seamlessly integrate into existing and future AI infrastructure, fundamentally altering the data flow for AI systems, particularly Large Language Models (LLMs) and Transformer networks. DMW Integration within Current LLM Infrastructure Flow: Traditional LLM inference follows a typical client-server architectural flow: Client→API Gateway→Load Balancer-→Inference Engine→Model→Response Delivery.

In this conventional flow: Request Initiation: User prompts travel through HTTP/HTTPS requests to API endpoints (e.g., OpenAI's API, Anthropic's API). Authentication & Rate Limiting: API gateways handle authentication tokens, rate limiting, and initial request validation. Load Distribution: Load balancers route requests to available inference servers based on capacity and geographic proximity. Inference Processing: The prompt is tokenized, processed through transformer layers, and responses are generated using GPU/TPU clusters. Response Delivery: The generated text flows back through the same infrastructure in reverse.

The Decentralized Memory Wallet (DMW) concept introduces a critical new layer into this flow, essentially becoming a memory access control and context provision layer between the user/AI requestor and the AI inference system. The revised flow, incorporating the DMW, is: User/Client→DMW→AI System (e.g., LLM/Transformer Inference Engine) In this integrated flow, the AI system (e.g., an LLM or Transformer inference engine) does not directly access a broad, static training dataset for dynamic context.

Instead, the AI system needs to authenticate and request specific, authorized memory access from the relevant DMW (which is controlled by the user/owner of the data) before processing prompts or generating responses that require personalized or contextual data. This interaction can occur through various secure mechanisms, including: Auth-style tokens: Granting temporary, scoped access to specific memory contexts within the DMW. Zero-knowledge proofs: Used for privacy-preserving memory verification, allowing the AI to verify properties of data (e.g., age of user, compliance status) without directly accessing the sensitive data content within the DMW.

Smart contract interfaces: If the DMW infrastructure is built on blockchain technology, smart contracts can enforce access rules and facilitate auditable data transactions. Federated learning protocols: Enabling distributed memory access where the AI processes data locally within the DMW's secure environment without centralizing the data, or where aggregated insights are shared rather than raw memory. A key technical consideration for this integration is latency. Current LLM inference is already compute-intensive. Therefore, the DMW's memory lookup and access control mechanisms are designed for sub-millisecond response times to ensure that the overall AI interaction remains practical and responsive.

This involves treating memory as a cryptographically-secured service that AI systems can query with proper authentication and context-aware permissions via optimized API or messaging protocols. Broader Economic and Market Implications: The DMW model is poised to significantly disrupt and reshape broader data markets and data-sharing agreements between entities. By shifting data ownership and control directly to the individual user through their DMWs, the invention fosters a more transparent, auditable, and equitable data economy.

Decentralized Data Markets: The DMW can facilitate the emergence of new decentralized data markets where users can, if they choose, license their specific, consented memory capsules or aggregated insights generated from their DMWs. This creates new economic opportunities for users to derive value from their own data, moving away from models where their data is passively collected and monetized by third parties without direct user benefit. Tokenized Economy and Value Exchange: In certain embodiments, the DMW framework can integrate with a tokenized economy, where cryptographic tokens represent units of value or access permissions for data.

This allows for seamless, auditable, and granular value exchange for memory access or data utilization, providing a clear mechanism for compensating users for their contributions to collective intelligence or AI training. New Data-Sharing Agreements: The DMW model enables novel forms of data-sharing agreements. Instead of complex legal agreements governing vast, centralized datasets, organizations can negotiate terms for accessing specific, consented memory capsules from individual or pooled DMWs.

This approach promotes greater trust, transparency, and compliance, as each data access event is auditable on an immutable ledger and governed by user-defined policies within their DMW. Reduced Centralization Risk: By empowering individuals and smaller entities with sovereign control over their data, the DMW model can mitigate the risks associated with data centralization, including large-scale data breaches, monopolistic control over data, and censorship. It fosters a more resilient and distributed data ecosystem.

This DMW model, therefore, provides not only enhanced security and privacy for individual users but also lays the groundwork for a more ethical, efficient, and economically balanced future for AI development and data utilization.

FIG. 1 shows for illustrative purposes only an example of a database system server of one embodiment. FIG. 1 shows a database system server 100 that controls the database system that employs a well-structured data model, comprising four fundamental components that collectively manage and interlink data seamlessly. The four fundamental components include Token Holder Records; Wallet Repositories; Token Attribute Repositories; and Asset Management Modules. The database system server 100 is accessed by a user 110 on the user computer 120 having an asset bound tokens (ABTs) app 130.

The database system server 100 is coupled to databases that collectively manage and interlink data seamlessly 140. The databases include a token holder records database 160, wallet repositories database 162, token attribute repositories database 164, and asset management modules database 166. The database system server 100 coupled databases further includes processors to identify and match the four fundamental components in the file management system 170 of one embodiment.

DETAILED DESCRIPTION

Figure 2:
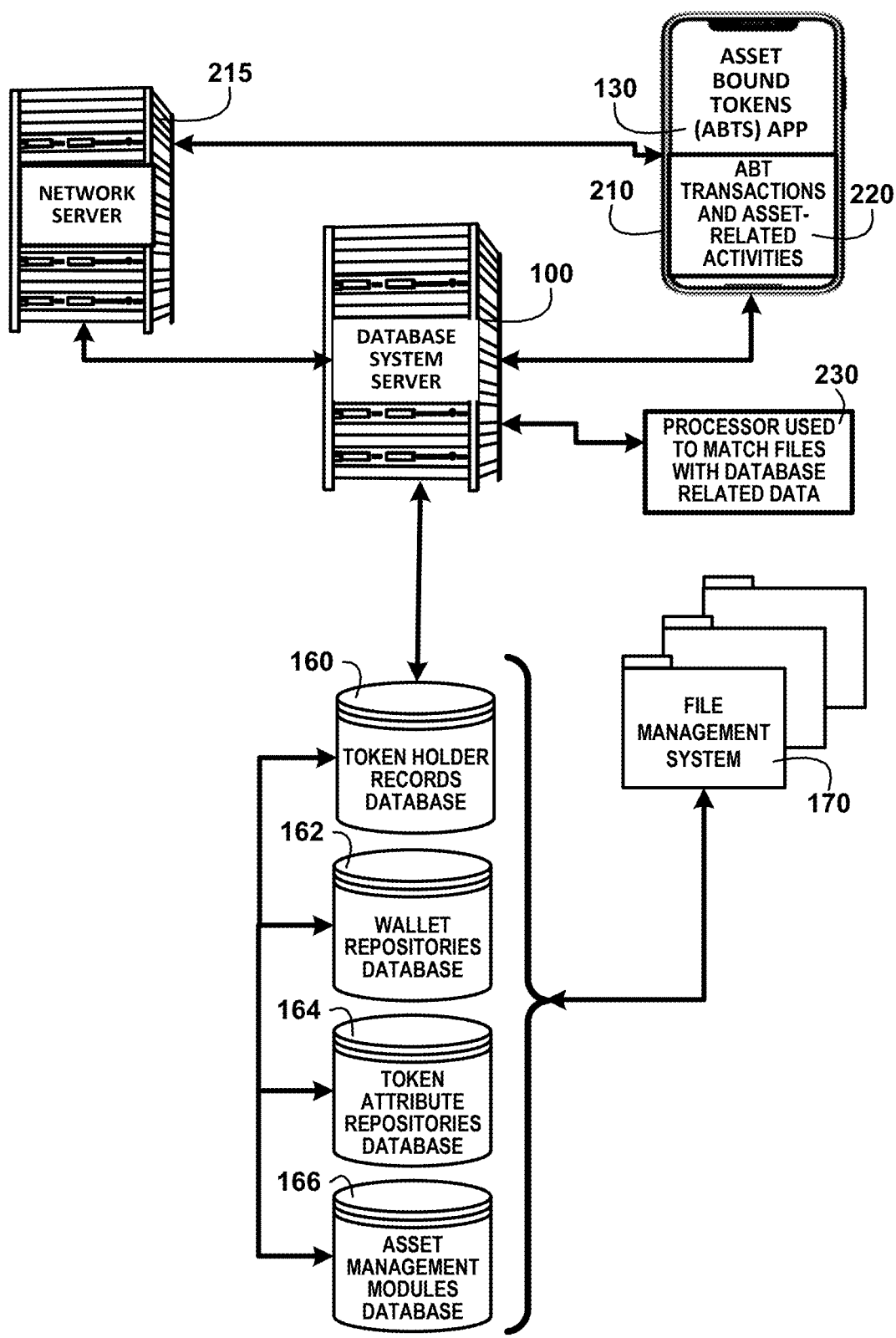
FIG. 2 shows for illustrative purposes only an example of an Asset Bound Tokens (ABTs) app of one embodiment.

FIG. 2 shows for illustrative purposes only an example of an Asset Bound Tokens (ABTs) app of one embodiment. FIG. 2 shows a user mobile device 210 having the asset bound tokens (ABTs) app 130. The asset bound tokens (ABTs) app 130 is used by the user 110 of FIG. 1 to report ABT transactions and asset-related activities 220. The asset bound tokens (ABTs) app 130 is wirelessly coupled to a network server 215 to communicate with the database system server 100. The allows the user 110 of FIG. 1 to record ABT transactions and asset-related activities 220 on the token holder records database 160, wallet repositories database 162, token attribute repositories database 164, asset management modules database 166, and file management system 170. The network server 215 and the database system server 100 include at least one processor used to match files with database related data 230 of one embodiment.

Figure 3:
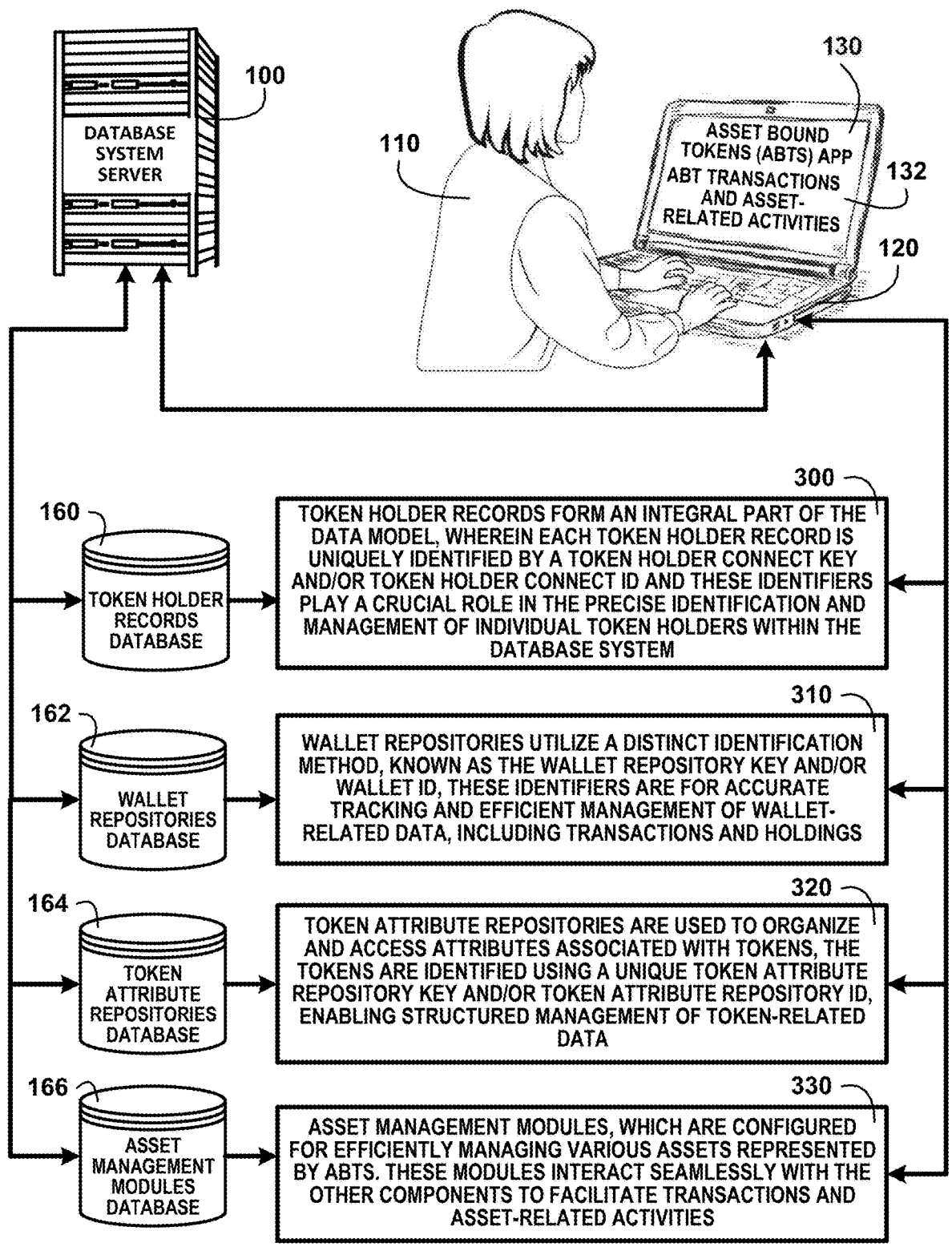
FIG. 3 shows for illustrative purposes only an example of ABT transactions and asset-related activities databases of one embodiment.

FIG. 3 shows for illustrative purposes only an example of ABT transactions and asset-related activities databases of one embodiment. FIG. 3 shows the database system server 100 wirelessly linked to the user 110 computer 120 and the asset bound tokens (ABTs) app 130. The user 110 computer 120 allows the user to track the ABT transactions and asset-related activities 132. For example, the token holder records database 160 stores token holder records form an integral part of the data model, wherein each token holder record is uniquely identified by a token holder connect key and/or token holder connect id and these identifiers play a crucial role in the precise identification and management of individual token holders within the database system 300. The wallet repositories database 162, wherein the wallet repositories utilize a distinct identification method, known as the wallet repository key and/or wallet ID, these identifiers are for accurate tracking and efficient management of wallet-related data, including transactions and holdings 310. The token attribute repositories database 164 storing the token attribute repositories are used to organize and access attributes associated with tokens, the tokens are identified using a unique token attribute repository key and/or token attribute repository ID, enabling structured management of token-related data 320. The asset management modules database 166 stores asset management modules, which are configured for efficiently managing various assets represented by ABTs. These modules interact seamlessly with the other components to facilitate transactions and asset-related activities 330 of one embodiment.

Figure 4:
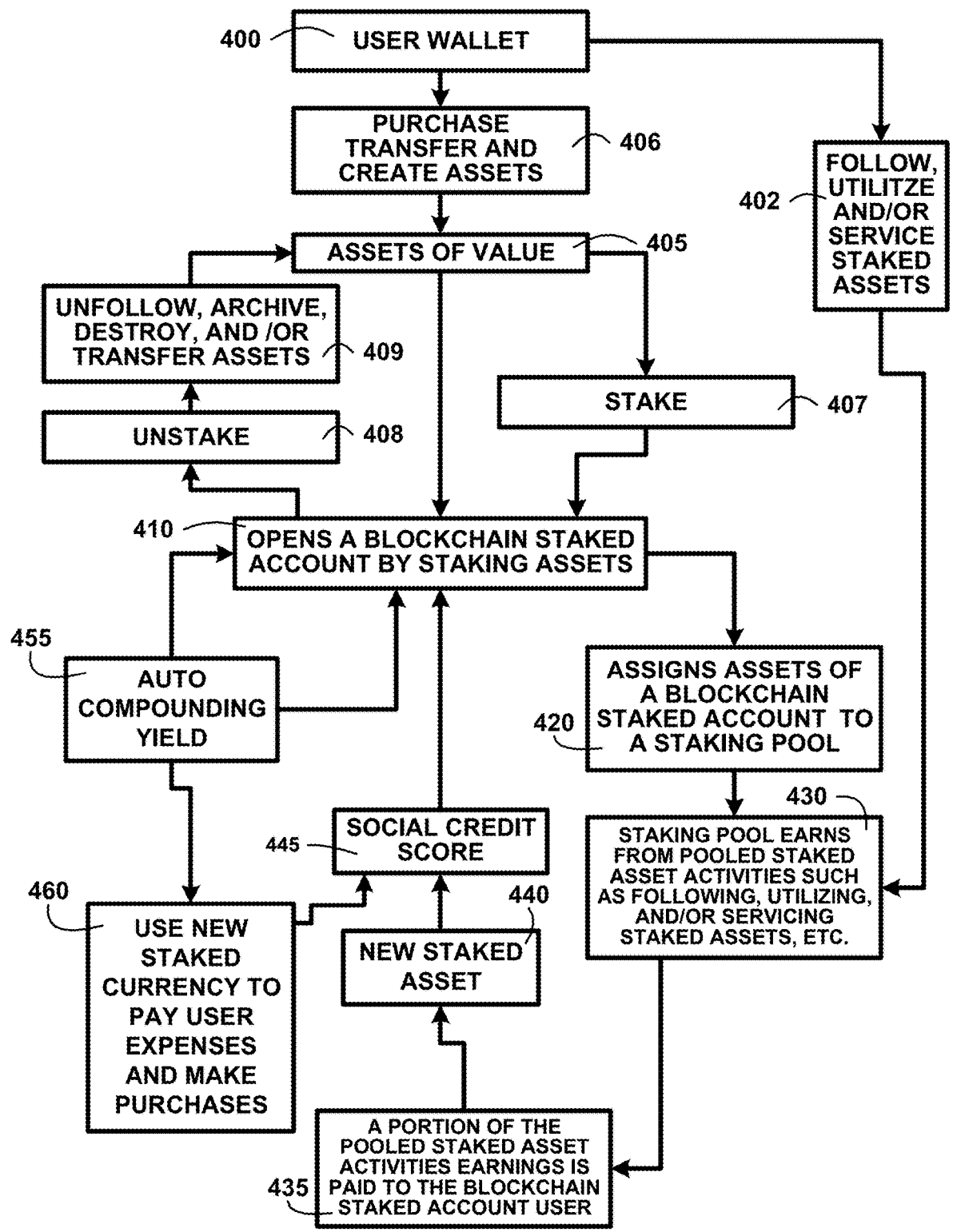
FIG. 4 shows a block diagram of an overview of a staked account payment process and devices of one embodiment.

FIG. 4 shows a block diagram of an overview of a staked account payment process and devices of one embodiment. FIG. 4 shows a user that owns a wallet 400 that can follow, utilize and/or service staked assets 402 in a staking pool earns from pooled staked asset activities such as following, utilizing, and/or servicing staked assets, etc. 430. The user wallet 400 can purchase, transfer, and create assets 406. Assets of value 405 are stored on blockchain staked account (wallet). The wallet also manages the public-private key pair and the blockchain address to provide a unique identity for network nodes/validators so they can securely interact with the network. The user can create, service, follow, utilize, etc. using a blockchain staked account. The blockchain staked account can serve as a treasury for any user and is not limited.

The user wallet 400 opens a blockchain staked account by staking assets 410 to earn interest on the assets of value 405 to pay expenses and make charitable donations to reduce income tax expenses. A blockchain staked account 410 can also behave as a treasury for governments, corporations, or institutions. The user wallet 400 can stake assets of value into the blockchain staked account. The user wallet 400 can create, purchase, and/or assign assets of the blockchain staked account to a staking pool 420. The user wallet can also utilize, follow, and/or service staked assets in the staking pool 430 on the blockchain staked account. The user wallet may also unfollow, archive, destroy, and/or transfer assets 409 from the blockchain staked account. The user can unstake 408 assets from the blockchain staked account.

A staking pool earns from pooled staked asset activities 430. A portion of the pooled staked asset activities earnings is paid to the blockchain staked account user 435. The portion of earnings received by the user wallet 400 is a new staked asset 440 adding appreciation to the assets of value 405. A new staked asset 440 can include assets including fixed assets, buildings, machinery or furniture, education, clothes, and/or original assets, for example, a car or truck. In another embodiment, a new staked asset 440 can include new staked currency. A user can purchase this new staked currency.

Another pooled staked asset activity is servicing, following, and/or utilizing staked assets. Servicing entities are part of the staking pool for users to stake their assets with them. The entities servicing an asset can be, for example, a distributor, shipper, retail store, broker, digital entity, gaming entity, metaverse, and the like, who can be reviewed and verified. The verified servicing entities may receive more yield due to exceeding servicing standards and/or credibility servicing staked assets. Verified servicing entities should increase the value of an asset therefore receiving more yield.

The user wallet 400 apportions are a part of an APY/APR yield to be retained in the assets of value 405 as an addition to the staking pool to create an auto compounding yield 455 with the new staked currency 440. The user then can utilize the remaining part of the newly staked currency 440.

The user wallet 400 can use new staked currency to pay user expenses and make purchases 460 without diminishing the assets of value 405. The net result is that the assets of value 405 is continually growing, the user is not incurring any costs associated with financial transactions, and the user's expenses are being paid and purchases are being made with a portion of the new staked currency 440 without withdrawing any of the assets of value 405 of one embodiment.

New staked asset allows a user to stake any asset of value. A user stakes an asset, and a new staked asset is created. Most entities will limit their yield to an asset(s) of their choice and have exclusive members. The more loyalty brand recognition, and pool staked asset activities the user gives "above entity", the user's yield could increase, stay the same or decrease overtime. Users can receive yield if they subscribe to assets with utility subscriptions. Any wallet can participate in pool staked activities. Every time a user utilizes an asset owners' asset, the asset owners created content will index higher in user's personal. This can also be used as a social credit score 445 system.

Figure 5:
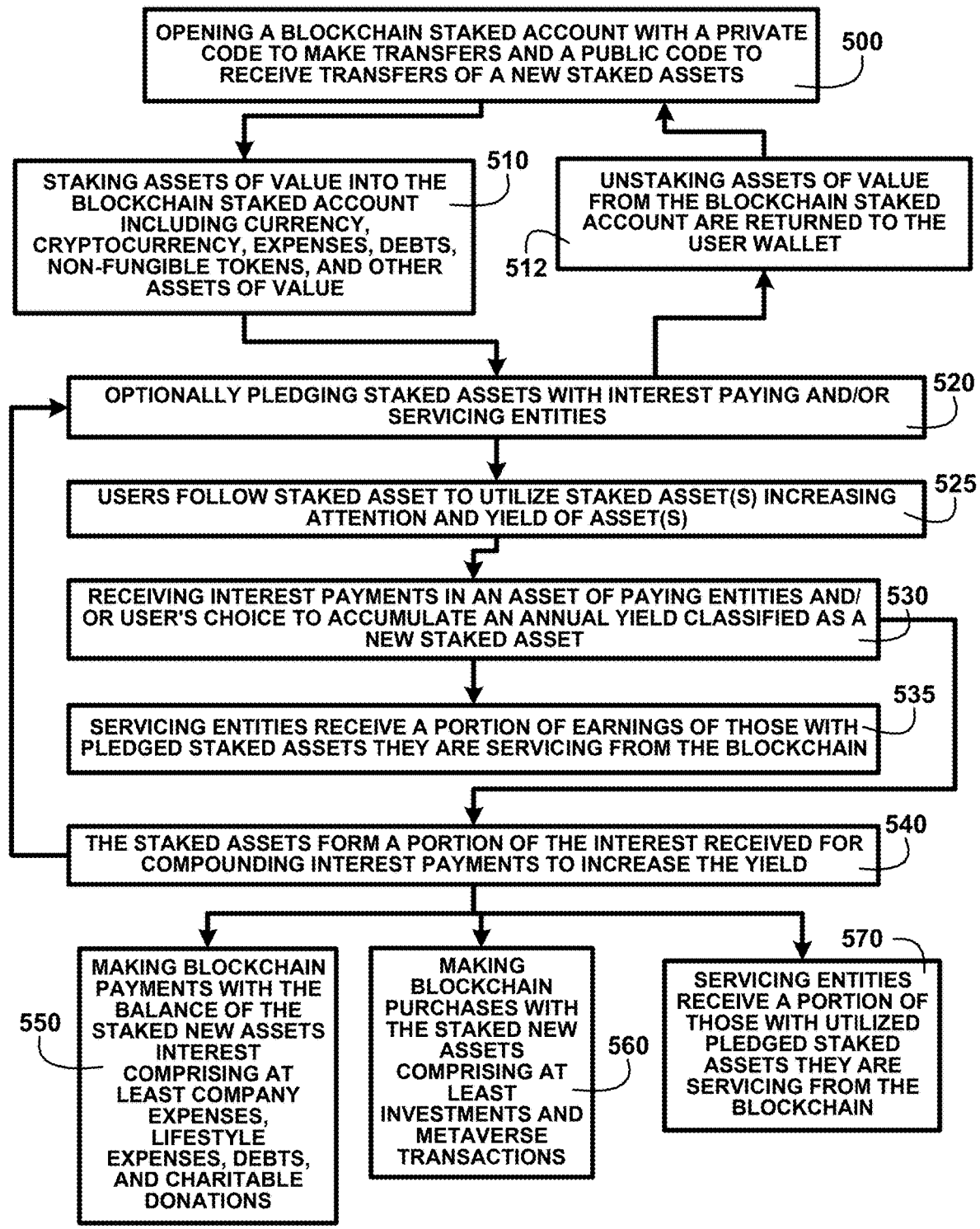
FIG. 5 shows a block diagram of an overview flow chart of staked account payment process of one embodiment.

FIG. 5 shows a block diagram of an overview flow chart of a staked account payment process of one embodiment. FIG. 5 shows the user wallet 400 of FIG. 4 opening a blockchain staked account with a private code to make transfers and a public code to receive transfers of a new staked asset 500. Opening a blockchain staked account includes staking assets of value into the blockchain staked account including currency, cryptocurrency, expenses, debts, non-fungible tokens, and other assets of value 510. The staked account assets are represented with Asset Bound Tokens (ABTs) and a social element to form tokenized assets. Unstaking assets of value from the blockchain staked account are returned to the user wallet 512.

The user wallet 400 of FIG. 4 continues with optionally pledging staked assets with interest paying and/or servicing entities 520. Users follow staked assets to utilize staked asset(s) increasing attention and yield of asset(s) 525. Interest paying entities use a staking pool for staked asset activities to earn fees, interest, and other funds without transferring any of the staked pool assets. The interest paying entities pay a portion of the earnings to those with utilized pledged staked assets in the pool. The user wallet 400 of FIG. 4 is receiving interest payments in an asset of paying entities and/or user's choice to accumulate an annual yield classified as a new staked asset 530. Servicing entities receive a portion of earnings of those with utilized pledged staked assets they are servicing from the blockchain 535. The staked assets form a portion of the interest received for compounding interest payments to increase the yield 540. The user wallet 400 of FIG. 4 is making blockchain payments with the balance of the staked new assets interest comprising at least company expenses, lifestyle expenses, debts, and charitable donations 550. The user wallet 400 of FIG. 4 increases the value of the assets of value by making blockchain purchases with the staked new assets comprising at least investments and metaverse transactions 560. Servicing entities receive a portion of those with utilized pledged staked assets they are servicing from the blockchain 570. Users follow and/or subscribe staked assets to utilize staked asset(s) increasing attention and yield of asset(s) of one embodiment.

Figure 6:
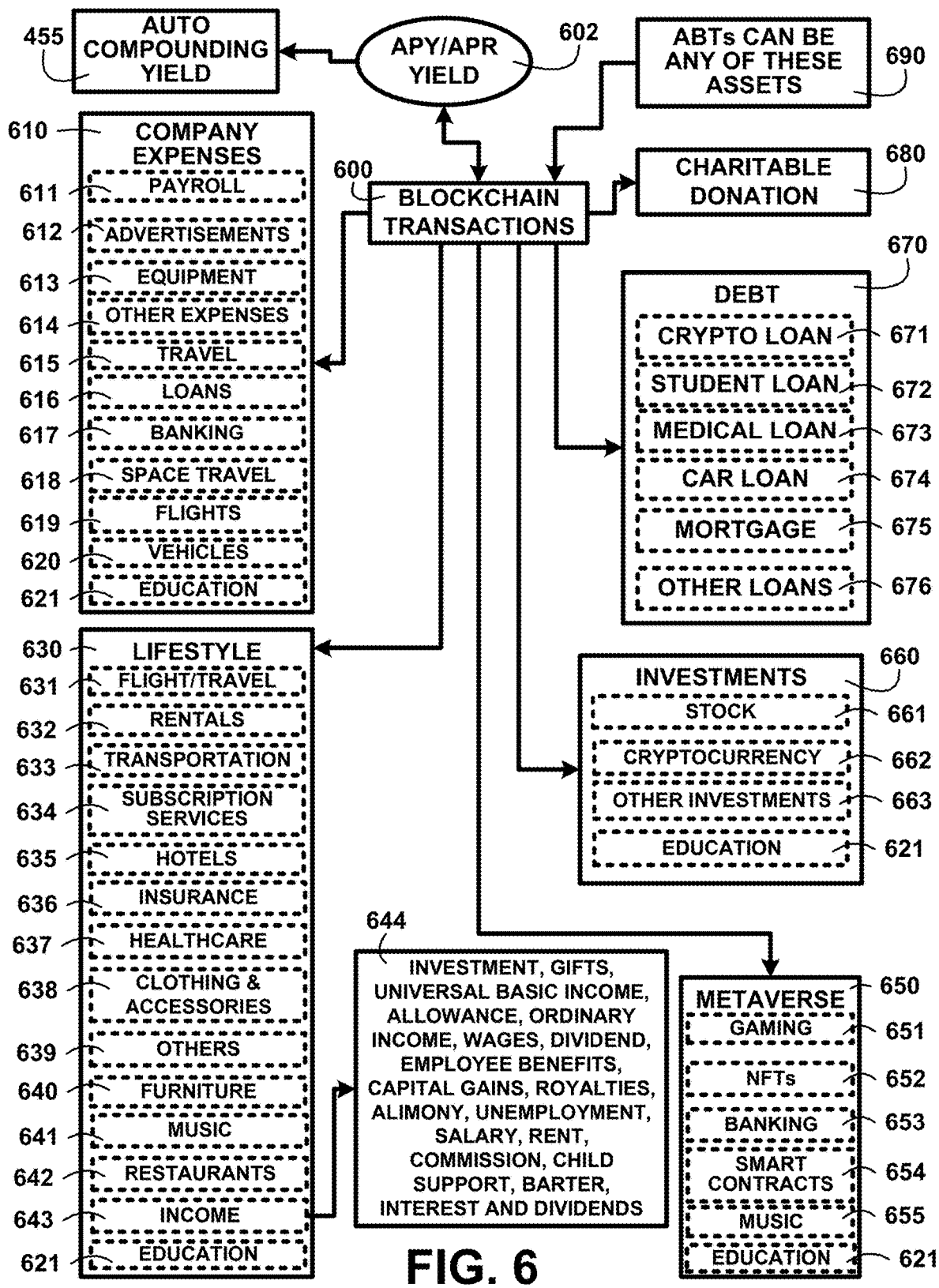
FIG. 6 shows a block diagram of an overview of blockchain transactions of one embodiment.

FIG. 6 shows a block diagram of an overview of blockchain transactions of one embodiment. FIG. 6 shows the APY/APR yield 602 with a portion being used for adding an auto compound yield 455. Another portion of the APY/APR yield 602 is used for blockchain transactions 600 and ABTs can be any of these assets 690 to pay company expenses 610. Blockchain transactions 600 include bank, cross-border payments, Central Bank Digital Currency (CBDC), Central Bank Digital Asset (CBDA), and crypto liquidity.

Company expenses 610 include payroll 611, advertisements 612, equipment 613, other expenses 614, travel 615, loans 616, banking 617, space travel 618, flights 619, vehicles 620, and education 621. Company expenses 610 also include insurance, healthcare, fixed assets, music, video, manufacturing, shipping, education, food including farmed, and lab produced.

Another group of payments is used for lifestyle 630 expenses including flight/travel 631, rentals 632, transportation 633, subscription services 634, hotels 635, insurance 636, healthcare 637, clothing & accessories 638, others 639, furniture 640, music 641, restaurants 642, income 643 and education 621. Income can also include investment, gifts, universal basic income, allowance, ordinary income, wages, dividends, employee benefits, capital gains, royalties, alimony, unemployment, salary, rent, commission, child support, barter, interest, and dividends 644.

The metaverse 650 is a simulated digital environment that uses augmented reality (AR), virtual reality (VR), and blockchain, along with concepts from social media, to create spaces for rich user interaction mimicking the real world. An additional portion of the APY/APR yield 602 is used for the user wallet 400 of FIG. 4 metaverse 650 expenses including gaming 651, NFTs 652, banking 653, smart contracts 654, music 655, video, and education 621.

The user wallet 400 of FIG. 4 may increase the assets of value 405 of FIG. 4 with investments 660 purchases with a portion of the APY/APR yield 602, for example, stock 661, cryptocurrency 662, other investments 663 and education 621. Other investments 663 include real estate, derivative contracts, machinery, buildings, furniture, education, defense systems, bartering, weapons, transportation, autonomous and regular vehicles, mapping systems, machining including tools and products, internet of things including any device/machine connectable to the internet or device.

Payments on debt 670 are other categories of uses for a portion of the APY/APR yield 602, for example, a crypto loan 671, student loan 672, medical loan 673, car loan 674, mortgage 675, and other loans 676. The user wallet 400 of FIG. 4 may also make at least one charitable donation 680 that benefits with a reduction of income taxes of one embodiment.

Figure 7:
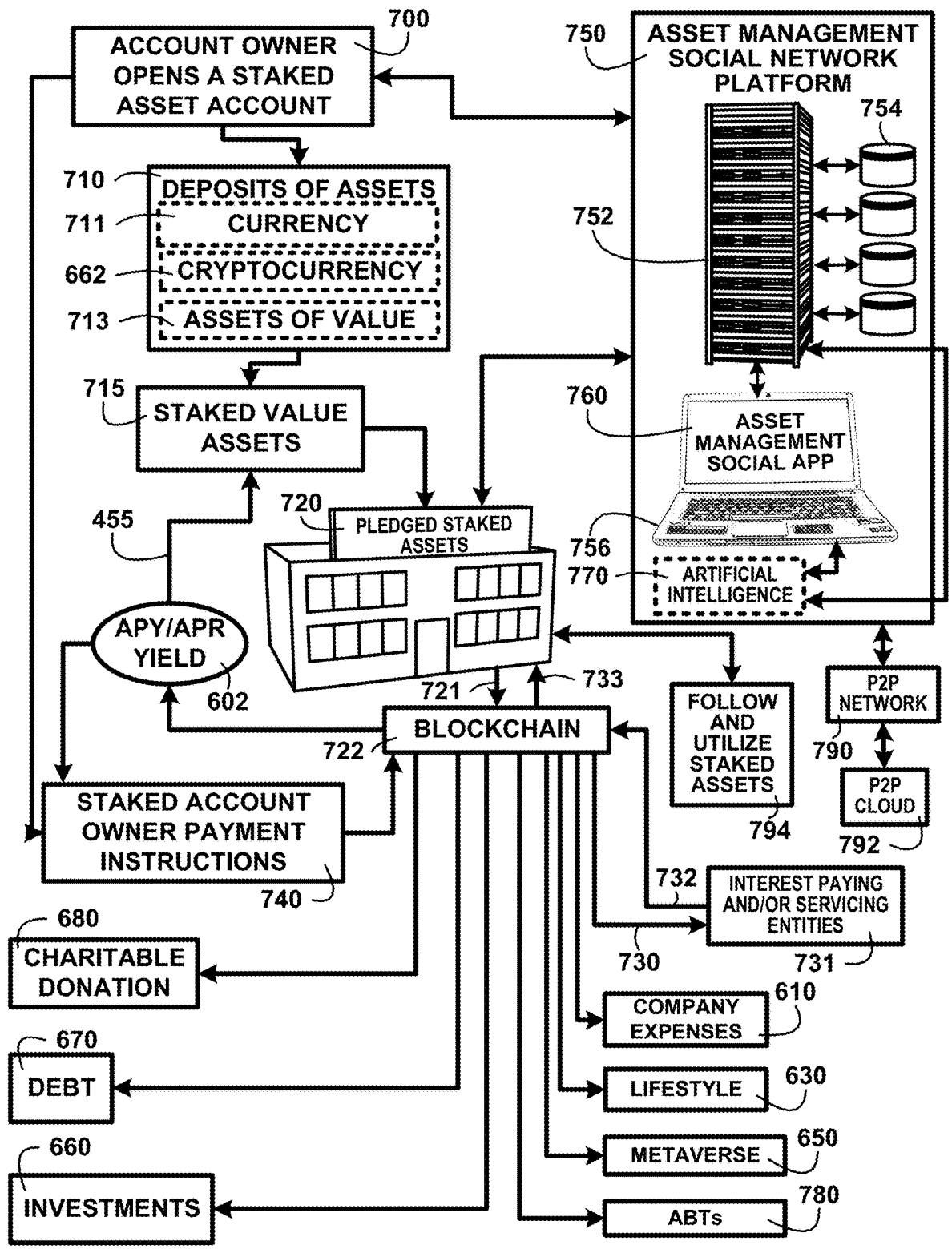
FIG. 7 shows for illustrative purposes only an example of an asset management social network platform of one embodiment.

FIG. 7 shows for illustrative purposes only an example of an asset management social network platform of one embodiment. FIG. 7 shows an account owner opening a staked asset account 700 with deposits of assets 710, for example, currency 711, cryptocurrency 662, and assets of value 713 in a blockchain staked account 410 of FIG. 4. Staked value assets 715 can be divided and pledged staked assets 720 with a transfer 721 on the blockchain 722 and deposited in 730 with interest paying and/or servicing entities 731, and follow and utilize staked assets 794. Interest paying entities 731 pay interest through blockchain 732 activities. Servicing entities receive a portion of their earnings from the blockchain of the utilized pledged staked assets they are servicing. Earnings are paid to users and provide users with the APY/APR yield 602.

A user wallet 400 of FIG. 4 deposits a portion of the APY/APR yield 602 into the pledged assets to earn an auto compound yield 455 and pledged staked assets ownership remains with account owner 733. The user wallet 400 of FIG. 4 may issue account owner payment instructions 740 for company expenses 610, lifestyle 630, metaverse 650, ABTs 780, investments 660, debt 670, and charitable donation 680.

The account owner payment instructions are transmitted to an asset management social network platform 750 having a plurality of servers 752, plurality of databases 754, platform computer 756 with a asset management social app 760, and artificial intelligence 770 and/or decentralized applications that run on a Peer 2 Peer (P2P) network of computers communicating with a blockchain network instead of a server and in the case of smart contract networks, also the smart contracts. In another embodiment, transactions are made on a P2P network 790 with a P2P cloud 792. The account owner payment instructions are converted into blockchain transactions. The recorded blockchain transactions provide the account owner with information of the account status and activities of one embodiment.

Figure 8:
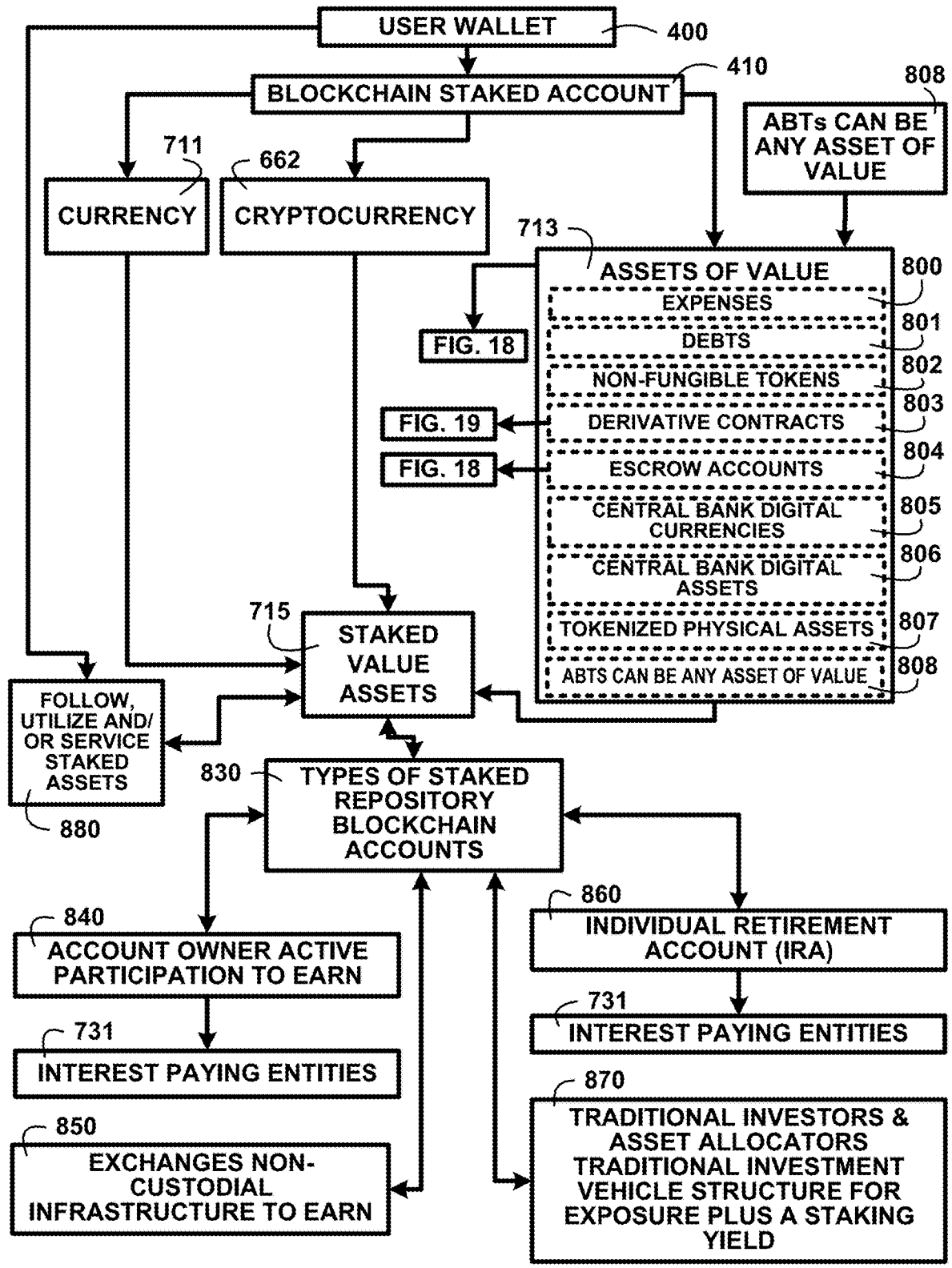
FIG. 8 shows a block diagram of an overview of a blockchain staked account of one embodiment.

FIG. 8 shows a block diagram of an overview of a blockchain stake account of one embodiment. FIG. 8 shows the user wallet 400 having a blockchain staked account 410. The user wallet 400 added staked assets including currency 711, cryptocurrency 662, and assets of value 713, ABTs can be any asset of value 808, expenses 800, debts 801, and non-fungible tokens (NFT) 802, derivative contracts 803, escrow accounts 804, treasury, Central Bank Digital Currencies 805 (CBDCs), and Central Bank Digital Assets 806 (CBDA), and tokenized physical assets 807 as Asset Bound Tokens (ABTs) contributing to staked value assets 715. Assets of value 713, derivative contracts 803, and escrow accounts 804 are further described in FIG. 26. The user wallet 400 may pledge a portion of the staked value assets 715 to earn interest. The user wallet 400 can also follow, utilize and/or service staked assets.

The pledged portion of the staked value assets 715 can be placed with entities for a number of types of staked repository blockchain accounts 830. The types of staked repository blockchain accounts 830 include an account owner active participation to earn 840, exchanges non-custodial infrastructure to earn 850 as interest paying entities 731. Other interest paying entities 731 include an individual retirement account (IRA) 860, treasury and traditional investors and asset allocator traditional investment vehicle structure for exposure plus a staking yield 870 of one embodiment.

Figure 9:
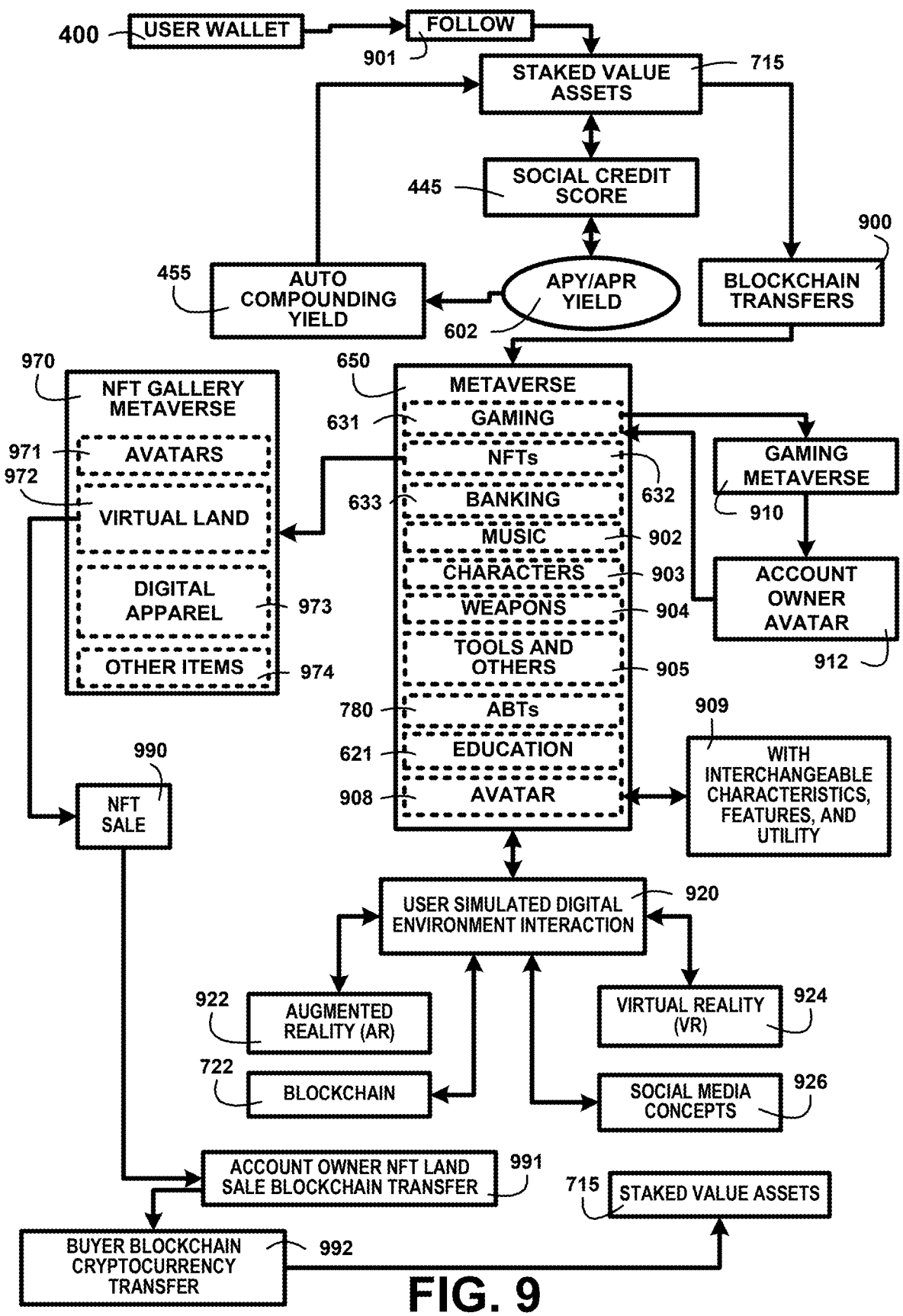
FIG. 9 shows a block diagram of an overview of metaverse staked value assets transactions of one embodiment.

FIG. 9 shows a block diagram of an overview of metaverse staked value assets transactions of one embodiment. FIG. 9 shows the user wallet 400 that can follow 901 staked value assets 715 and a social credit score 445 ABTs. The staked value assets 715 that earn an APY/APR yield 602 and auto compound yield 455. Followers can subscribe and follow metaverse staked assets and utilize the assets followed therefore increasing attention, yield, and social credit score for asset owners and creators. Blockchain transfers 900 can be made for metaverse 650 expenses including gaming 631, NFTs 632, banking 633, music 902, characters 903, weapons 904, tools and others 905, ABTs 780, education 621, and avatar 908 with interchangeable characteristics, features, and utility 909. Gaming metaverse 910 includes using an account owner avatar 912. User simulated digital environment interaction 920 includes using augmented reality (AR) 922, blockchain 722, virtual reality (VR) 924, and social media concepts 926. In metaverse the user can use land maps, characters, weapons, tools, etc. including music, transportation maps both physical and digital for direction reinforcement for manual/autonomous transportation, to reduce traffic, check mileage, NFTs (property, cars, and business) on maps. Also, emergency alerts, GPS, route quality, accuracy of data, and notify department of transportation to repair road/clear hazard.

A user may set up an NFT gallery metaverse 970 to offer for sale avatars 971, virtual land, 972, digital apparel 973, and other items 974. For example, an NFT sale 990 would produce an account owner NFT land sale blockchain transfer 991 and a buyer blockchain cryptocurrency transfer 992 to the user staked value assets 715 account of one embodiment.

Figure 10:
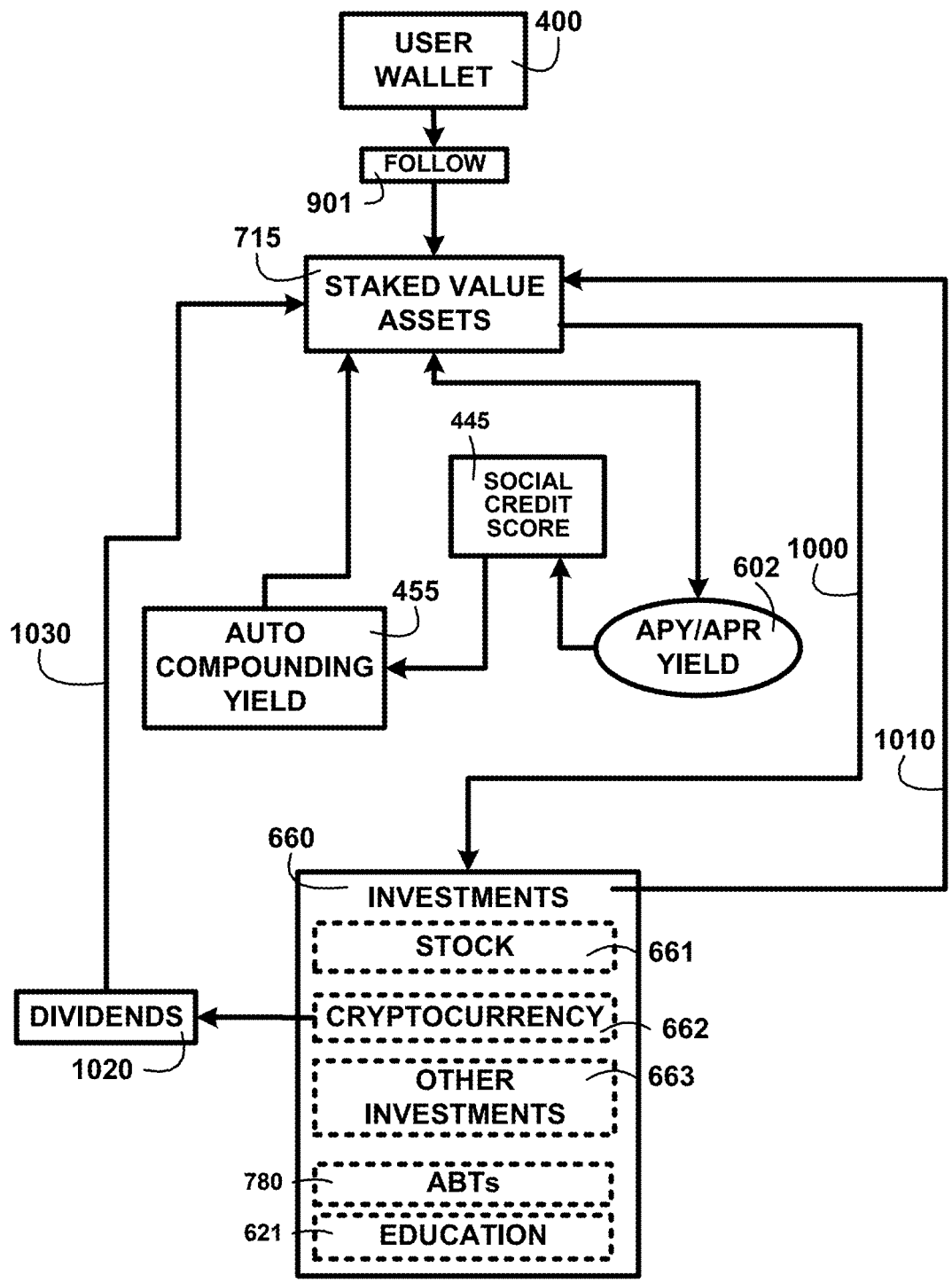
FIG. 10 shows a block diagram of an overview of staked value assets investments of one embodiment.

FIG. 10 shows a block diagram of an overview of staked value assets investments of one embodiment. FIG. 10 shows the user wallet 400 can follow 901 the staked value assets 715 account. To the staked value assets 715 account is added the APY/APR yield 602, social credit score 445 and auto compound yield 455. The social credit score 445 (SCS) will help to remove spam bots from the systems based on SCS. It will also help remove bad actors from the system. The SCS can also be used to increase/decrease yield. Followers can subscribe and follow staked assets and utilize the assets followed therefore increasing attention, yield, and social credit score for asset owners and creators.

A blockchain transfer 1000 can be made to purchase investments 660 with the yield new asset to add to the staked value assets 715 account. The investments 660, for example, can include cryptocurrency 662, stock 661 and other investments 663. Types of investments 660 can be appreciating investments that add value to the staked value assets 1010. This may include stock 661 which additionally may pay dividends 1020 paid into the staked value assets 1030 of one embodiment.

Figure 11:
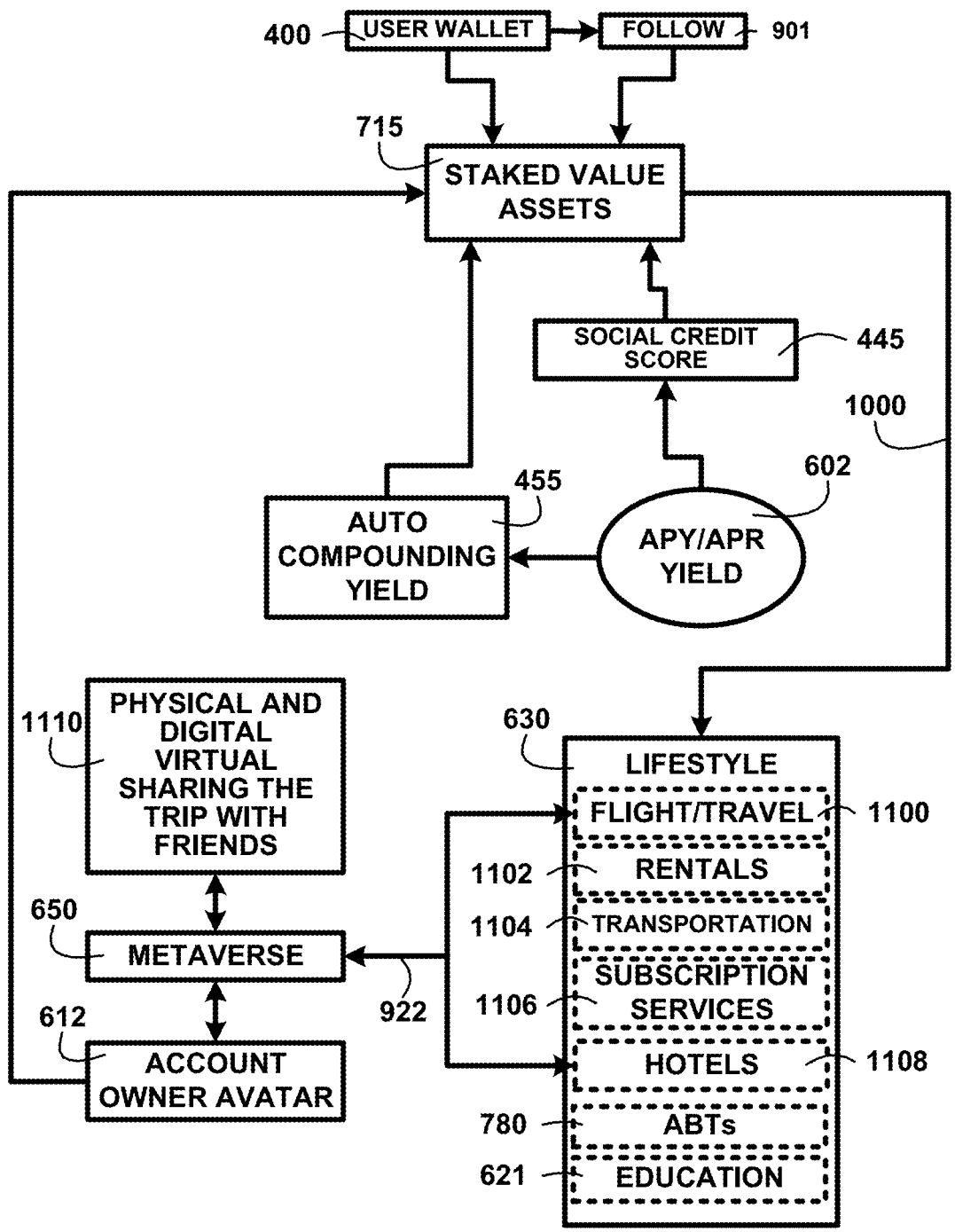
FIG. 11 shows a block diagram of an overview of lifestyle expenses of one embodiment.

FIG. 11 shows a block diagram of an overview of lifestyle expenses of one embodiment. FIG. 11 shows the user wallet 400 can follow 901 staked value assets 715 are APY/APR yield 602, social credit score 445 checked and auto compound yield 455. A blockchain transfer 1000 can be made to pay lifestyle 630 expenses including flight/travel 1100, rentals 1102, transportation 1104, subscription services 1106, hotels 1108, ABTs 780, and education 621. For example, the user wallet 400 of FIG. 4 can use augmented reality (AR) 922 and virtual reality in metaverse 650 to pay for flight/travel 1100 and hotels 1108 and enjoy virtual and physical sharing of the trip with friends 1110 using the account owner's avatar 612. Followers can subscribe and follow staked assets and utilize the assets followed therefore increasing attention, yield, and social credit score for asset owners and creators of one embodiment.

Figure 12:
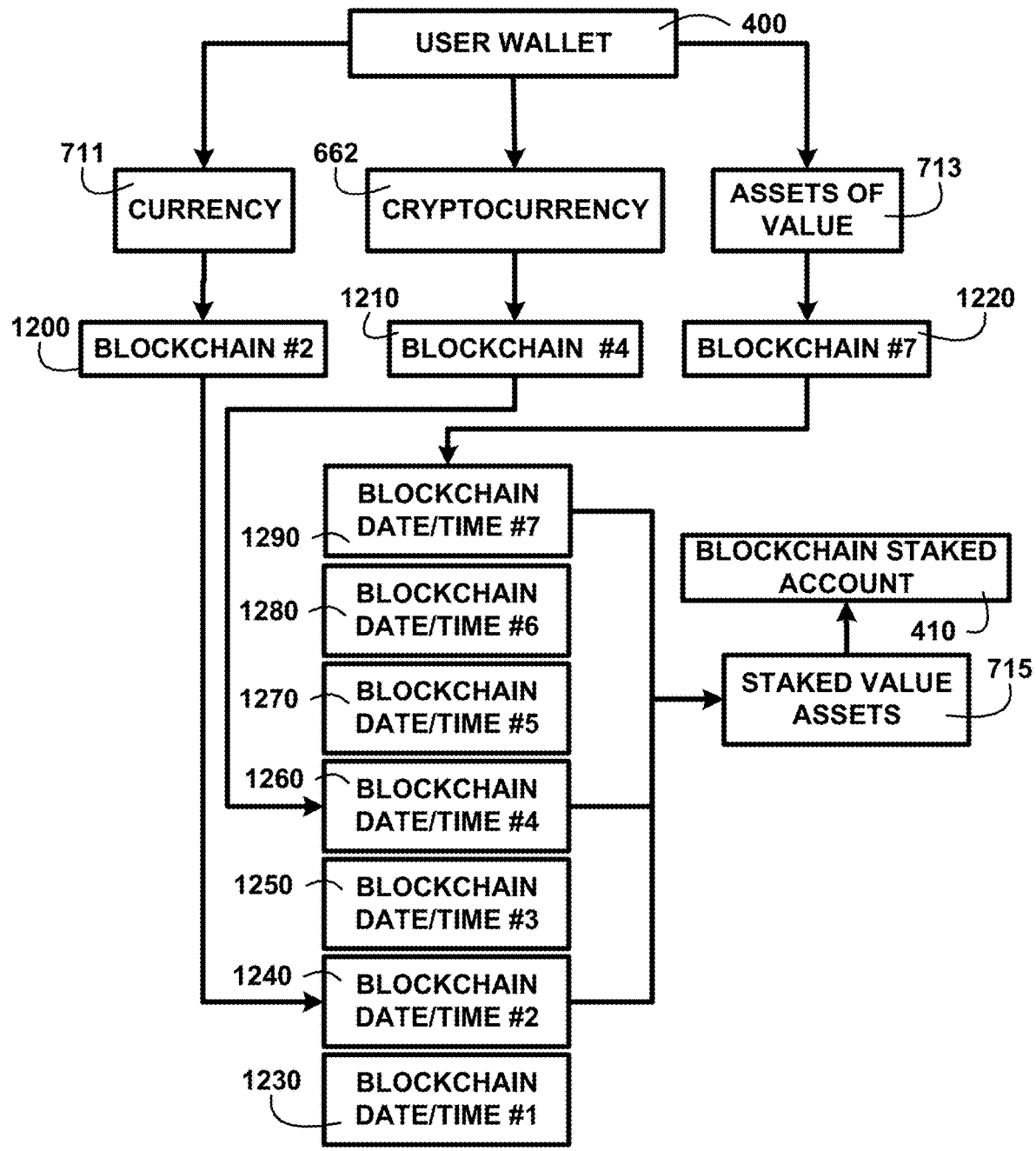
FIG. 12 shows a block diagram of an overview of blockchain transactions of one embodiment.

FIG. 12 shows a block diagram of an overview of blockchain transactions of one embodiment. FIG. 12 shows the user wallet 400 and the user's assets including currency 711, cryptocurrency 662 and assets of value 713. The user wallet 400 can make blockchain transactions to add the assets to the blockchain staked account 410. For example, the currency 711 can be transferred in a blockchain #2 1200 transaction. The cryptocurrency 662 in a blockchain #4 1210 transaction. The additional assets of value 713 transferred in a blockchain #7 1220 transaction.

The staked value assets 715 added to the blockchain staked account 410 of FIG. 4 with the three transactions. The blockchain transactions are made in a consecutive chain of transactions and can be identified in a block chain transaction history consisting of blockchain date/time #1 1230, blockchain date/time #2 1240, blockchain date/time #3 1250, blockchain date/time #4 1260, blockchain date/time #5 1270, blockchain date/time #6 1280, and blockchain date/time #7 1290. Each immutable blockchain transaction is identifiable with the user public code, date, and time of one embodiment.

Figure 13:
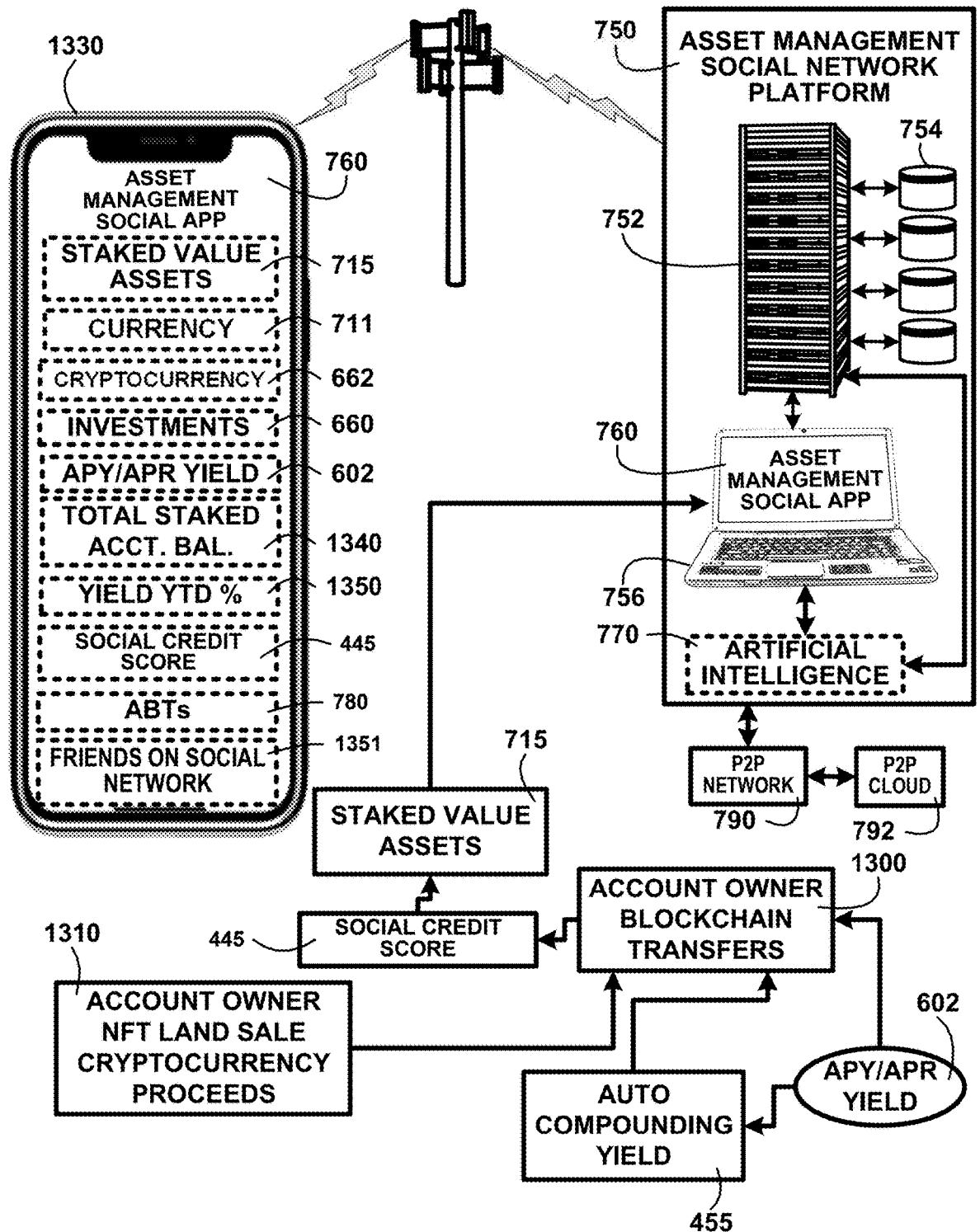
FIG. 13 shows for illustrative purposes only an example of account owner blockchain transfers of one embodiment.

FIG. 13 shows for illustrative purposes only an example of account owner blockchain transfers of one embodiment. FIG. 13 shows the APY/APR yield 602 and the auto compound yield 455 account owner blockchain transfers 1300. An account owner NFT land sale cryptocurrency proceeds 1310 is another account owner blockchain transfers 1300 is checked with the social credit score 445 before placed into the staked value assets 715.

The asset management social network platform 750, plurality of servers 752, plurality of databases 754, platform computer 756, asset management social app 760, and artificial intelligence 770, decentralized application P2P network receives the information of the transfers and update the current status of the user's account. In another embodiment, transactions are made on a P2P network 790 with a P2P cloud 792. The updated current status of the user's account can be reviewed on a user device. The user device 1330 having the asset management social app 760 displays the status and the user checks the account owner staked value assets 715. This allows the user wallet 400 of FIG. 4 to stay current on the amounts of the currency 711, cryptocurrency 662, investments 660, and other assets of value 713 of FIG. 7 in the user's blockchain staked account 410 of FIG. 4. Current status is transmitted through devices that communicate with other devices using the internet of things, a cell tower, satellites, etc.

The user is also kept current on the APY/APR yield 602 and social credit score 445 to assess the earnings and make any decisions to make a change on the interest paying and/or servicing entities 520 of FIG. 5. In one embodiment, the Asset Bound Tokens (ABTs) values and earnings and the friends associated in the social element activities affecting the social credit score 445 determine the APY/APR yield 602. Also displayed are a total staked acct. bal. 1340 and yield ytd % 1350, where acct. bal. means account balance and where ytd means year to date, ABTs 780, and friends on social network 1351. The total staked acct. bal. 1340 and yield ytd % 1350 provides financial data to make decisions on selling assets, buying other investments, and reapportioning the auto compound yield 455 of FIG. 4 reinvestment of one embodiment.

Figure 14:
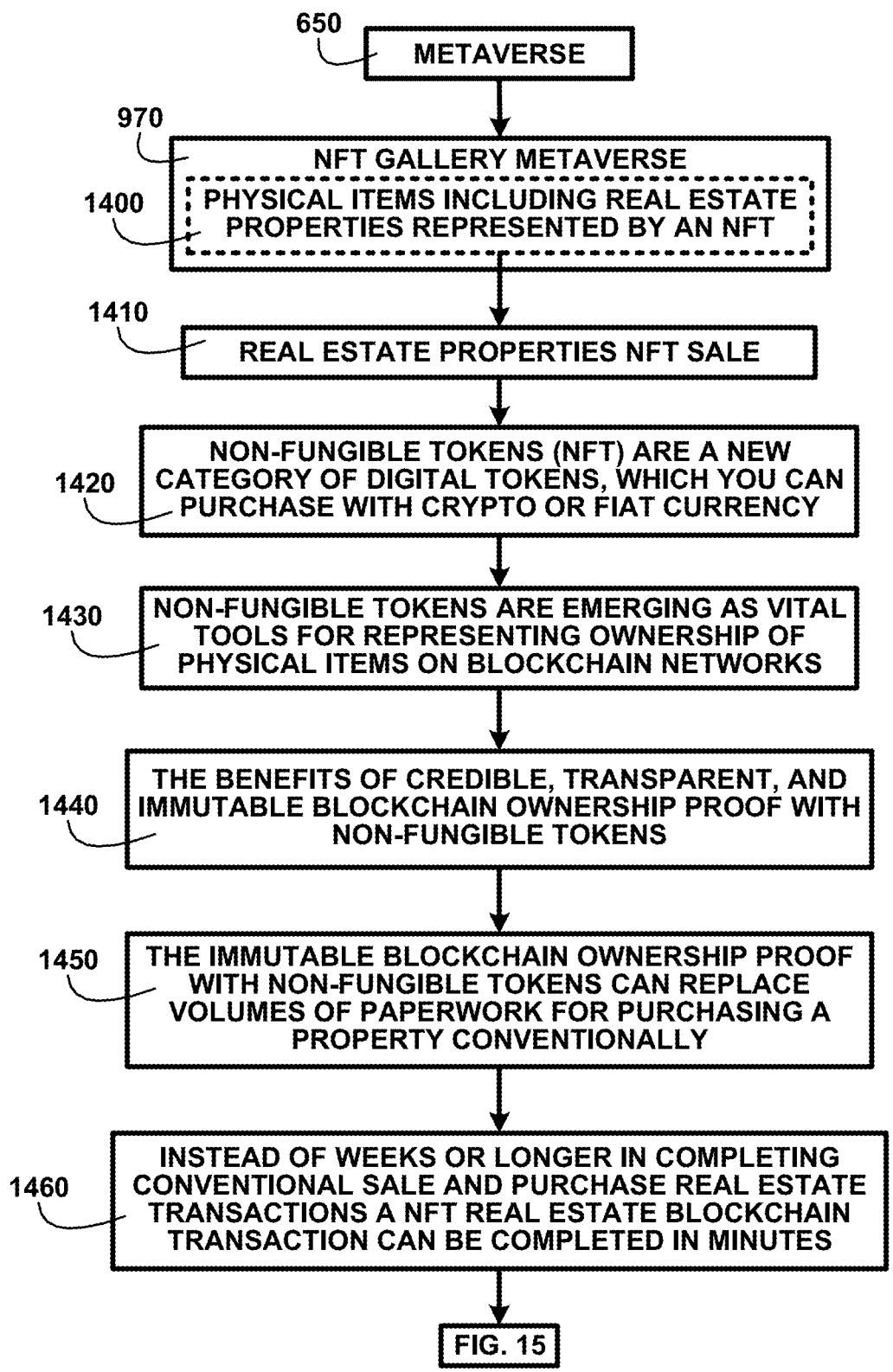
FIG. 14 shows a block diagram of an overview of an NFT gallery metaverse of one embodiment.

FIG. 14 shows a block diagram of an overview of an NFT gallery metaverse of one embodiment. FIG. 14 shows a metaverse 650 application of the NFT gallery metaverse 970. The NFT gallery metaverse 970 in addition to virtual NFT assets is also available to display physical items including real estate properties represented by an NFT 1400. An account owner can display a real estate properties NFT sale 1410 in the NFT gallery metaverse 970. Non-fungible tokens (NFT) are a new category of digital tokens, which you can purchase with crypto or fiat currency 1420. Non-fungible tokens are emerging as vital tools for representing ownership of physical items on blockchain networks 1430. The benefits of credible, transparent, and immutable blockchain ownership proof with non-fungible tokens 1440 can facilitate the purchase and sale of physical real estate properties. The immutable blockchain ownership proof with non-fungible tokens can replace volumes of paperwork for purchasing a property conventionally 1450. Instead of weeks or longer in completing a conventional sale and purchase real estate transactions an NFT real estate blockchain transaction can be completed in minutes 1460 of one embodiment. The descriptions continue in FIG. 15.

FIG. 15 shows a block diagram of an overview of a real estate NFT marketplace of one embodiment. FIG. 15 shows a continuation from FIG. 14 describing a real estate NFT marketplace that provides the assurance of improved security and data integrity 1500. Using real estate NFTs and yield incentives actions that increase the value and aesthetics of a place including land, communities, cities, neighborhoods, and natural habitats 1502.

The benefits of blockchain and NFT could provide the confidence buyers, and sellers need for transferring their assets 1510. Buyers can also find opportunities for borrowing against their real estate NFT with decentralized lending platforms or traditional finance solutions on blockchain 1520 that provide loans to businesses and the public with no intermediaries. On the other hand, decentralized lending platforms lending protocols enable everyone to earn interest on supplied stable coins and crypto currencies in part from interest earned on loans made.

NFTs can be bartered/swapped between users at an equivalent value or price adjustments made to equate value. NFTs can also be rented to other users who want access to play a game with certain characters, weapons, etc., real estate NFT rental asset etc. Any NFT can be rented to any user; NFTs that represent a physical asset or digital assets.

NFTs can also simplify the process of taking out loans on your property 1530. NFTs are unique digital assets or tokens for virtual or physical property stored on blockchain networks 1540 of one embodiment. The descriptions continue in FIG. 16.

FIG. 16 shows a block diagram of an overview of fractional ownership of one embodiment. FIG. 16 shows a continuation from FIG. 15. Owners of a property's NFT can prove that they own the property 1600 with the credible, transparent, and immutable blockchain ownership proof. Non-fungible tokens in real estate come in two distinct types of tokenization in the use of NFTs for real estate, such as entire asset tokenization and fractional ownership tokenization 1602. Fractional ownership (FO) tokenization offers a simple approach to the representation of real estate as NFTs 1604. Fractional ownership tokenization is a type of crowd funding platform, which helps investors in buying shares in NFT real estate also referred to in real estate as a real estate in investment trust (REIT) 1610. The fractional owners have a specific number of tokens representing their share in the asset 1620.

Entire asset (EA) tokenization is a conversion of the actual property deed into an NFT 1630. The first step of selling real estate in the form of NFTS, the seller needs to fulfill all the mandatory legal prerequisites for ensuring regulatory compliance in blockchain technology and its legal aspect 1640.

The next step is minting an NFT 1650. The account owner can mint an NFT with a description of the property and legal data associated with the same 1660. A real estate NFT marketplace offers a safe and flexible environment for creating NFTs 1670 of one embodiment. The descriptions continue in FIG. 17.

FIG. 17 shows a block diagram of an overview of selling the property's NFT of one embodiment. FIG. 17 shows a continuation from FIG. 16. The real estate NFT marketplace helps the account owner incorporate all the necessary paperwork, reports, and disclosures for legal authorities to offer proof of ownership 1700. The account owner can sell the property's NFT on an NFT marketplace to potential buyers 1710. Interested buyers would place their bids for the NFT in assets of the owner's choice and put into an escrow account 1720. The winner would pay or swap for the NFT in crypto or fiat currency or asset of owner's choice 1730. The bids for the NFT would be put into an escrow account to guarantee a sale if the bidder wins. Once the account owner receives an asset of value, the account owner can initiate a transfer of the NFT to the buyer's wallet 1740. Buyers would complete the paperwork for finalizing the transfer 1750. In the end, the buyer gains complete ownership over the property through the non-fungible token representing it 1760 of one embodiment.

Figure 18:
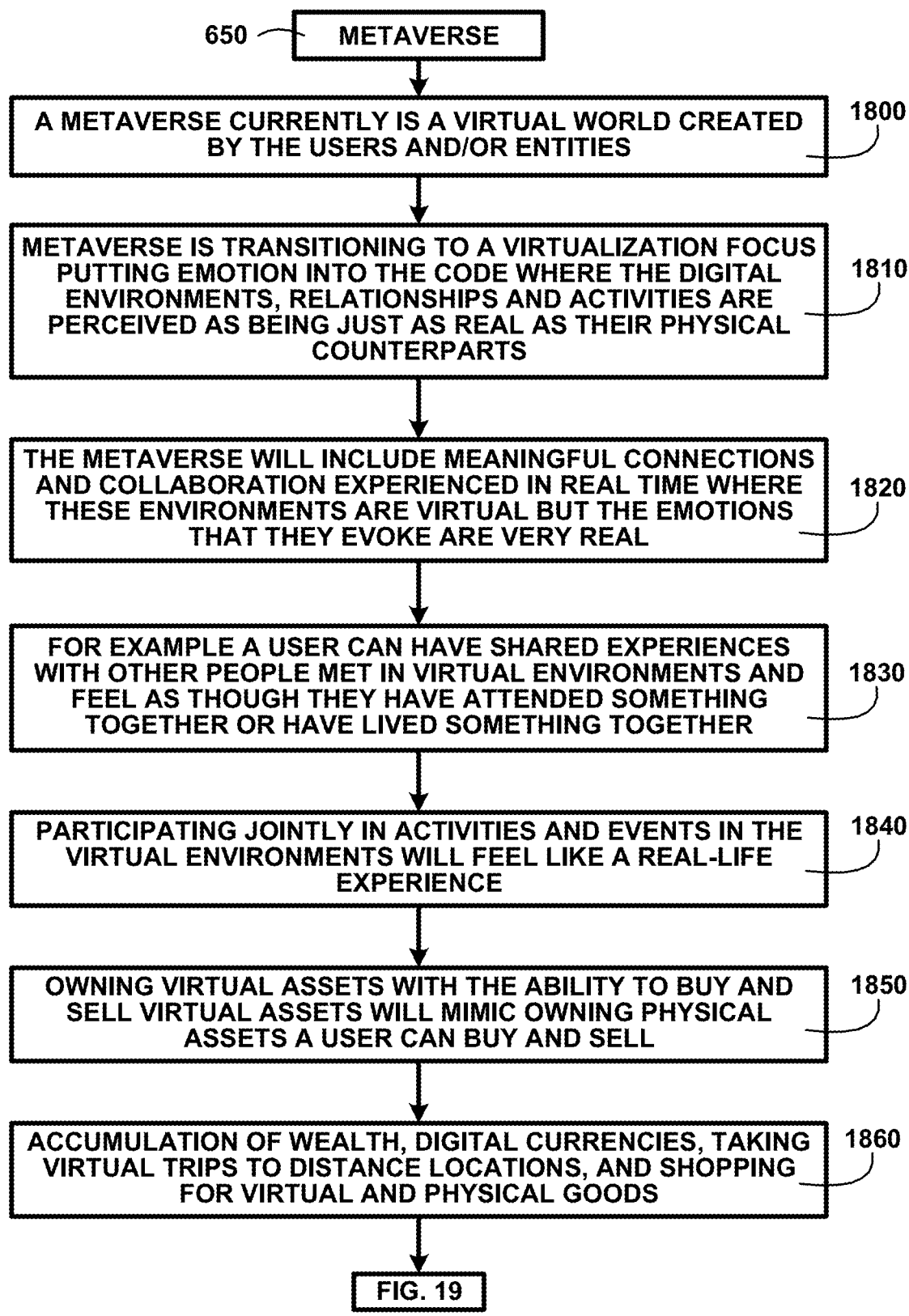
FIG. 18 shows a block diagram of an overview of a personal virtual world of one embodiment.

FIG. 18 shows a block diagram of an overview of a personal virtual world of one embodiment. FIG. 18 shows the metaverse 650 of the account owner. A metaverse currently is a virtual world created by the users and/or entities 1800. Metaverse is transitioning to a virtualization focus putting emotion into the code where the digital environments, relationships, and activities are perceived as being just as real as their physical counterparts 1810. The metaverse will include meaningful connections and collaboration experienced in real time where these environments are virtual but the emotions that they evoke are very real 1820. For example, a user can have shared experiences with other people met in virtual environments and feel as though they have attended something together or have lived something together 1830. Participating jointly in activities and events in the virtual environments will feel like a real-life experience 1840. Owning virtual assets with the ability to buy and sell virtual assets will mimic owning physical assets a user can buy and sell 1850. Accumulation of wealth, digital currencies, taking virtual trips to distance locations, shopping for virtual and physical goods 1860 of one embodiment. The descriptions continue in FIG. 19.

FIG. 19 shows a block diagram of an overview of attending virtual events of one embodiment. FIG. 19 shows a continuation from FIG. 18. The metaverse augmented reality provides the user with the ability to attend virtual events with friends, even though the friends may physically be very distant 1900. Yet virtually the user can sit next to those friends at a concert, hear the music, and look around at other participants 1901. The virtual experience will feel like physically sharing the same experience with tickets purchased with virtual digital currencies 1902.

The user can view and purchase brands of goods and services within an augmented reality 3D virtual environment, able to virtually sit on a sofa and see how it would look in their living room, manipulate tools, view and participate in cooking demonstrations, have verbal discussions with a salesperson face to face virtually, then visit, for example, a competing brand to make virtual hands-on comparisons 1910. The user can collect NFTs represented with a certificate of authenticity for a digital good for owning unique digital assets 1920. NFTs can include works of art, digital objects, and virtual and physical real estate 1930. NFTs can include unique virtual collectibles and have them digitally signed by a member of the movie cast, band member, athlete, or other celebrity 1940 of one embodiment. Descriptions continue in FIG. 20.

Figure 20:
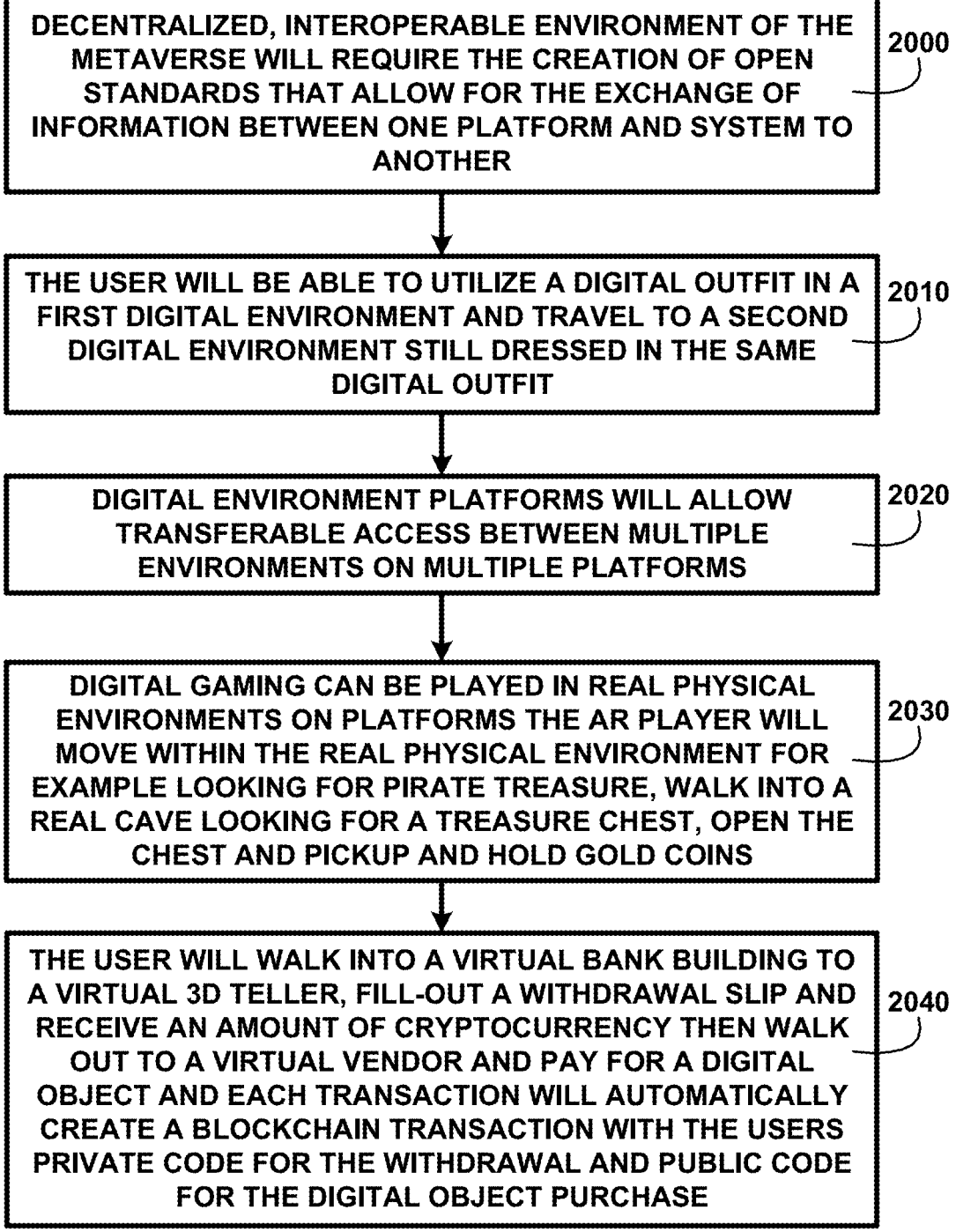
FIG. 20 shows a block diagram of an overview of the decentralized, interoperable environment of one embodiment.

FIG. 20 shows a block diagram of an overview of the decentralized, interoperable environment of one embodiment. FIG. 20 shows a continuation from FIG. 19. The decentralized, interoperable environment of the metaverse will require the creation of open standards that allow for the exchange of information between one platform and system to another 2000. The user will be able to utilize a digital outfit in a first digital environment and travel to a second digital environment still dressed in the same digital outfit 2010. Digital environment platforms will allow transferable access between multiple environments on multiple platforms 2020. Digital gaming can be played in real physical environments on platforms the AR player will move within the real physical environment, for example, looking for pirate treasure, walk into a real cave looking for a treasure chest, open the chest and pickup and hold gold coins 2030. The user will walk into a virtual bank building to a virtual 3D teller, fill-out a withdrawal slip and receive an amount of cryptocurrency then walk out to a virtual vendor and pay for a digital object and each transaction will automatically create a blockchain transaction with the users private code for the withdrawal and public code for the digital object purchase 2040 of one embodiment.

Figure 21:
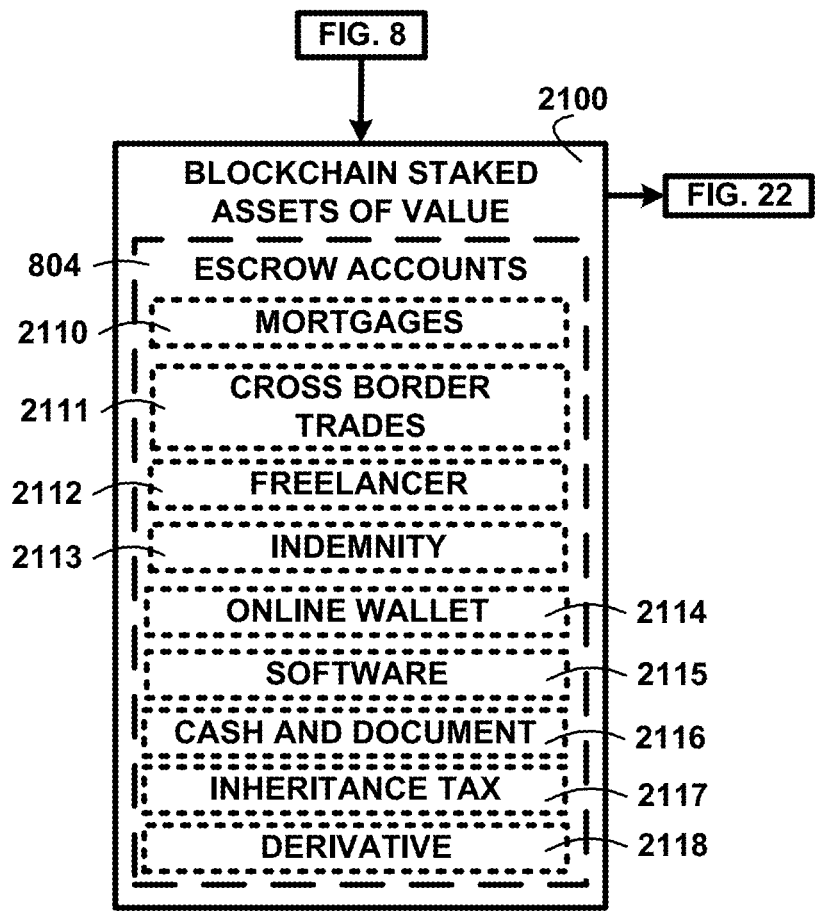
FIG. 21 shows a block diagram of an overview of blockchain staked assets of value escrow accounts of one embodiment.

FIG. 21 shows a block diagram of an overview of blockchain staked assets of value escrow accounts of one embodiment. FIG. 21 shows a continuation from FIG. 5 describing blockchain staked assets of value 2100. Blockchain staked assets of value 2100 include in a continuation from FIG. 8 escrow accounts 804. Escrow accounts 804 include mortgages 2110, cross border trades 2111, freelancer 2112, indemnity 2113, online wallet 2114, software 2115, cash and document 2116, inheritance tax 2117, and derivative 2118.

Escrow accounts serve as an arms-length mechanism wherein documentation and funds associated with a transaction are held by an independent third party. This neutral intermediary retains the materials in trust until all contractual obligations have been satisfactorily fulfilled by both parties involved in the transaction. For example, escrows can be used for real estate sales escrow, mortgage escrow, renter's escrow, and construction escrow of one embodiment.

Figure 22:
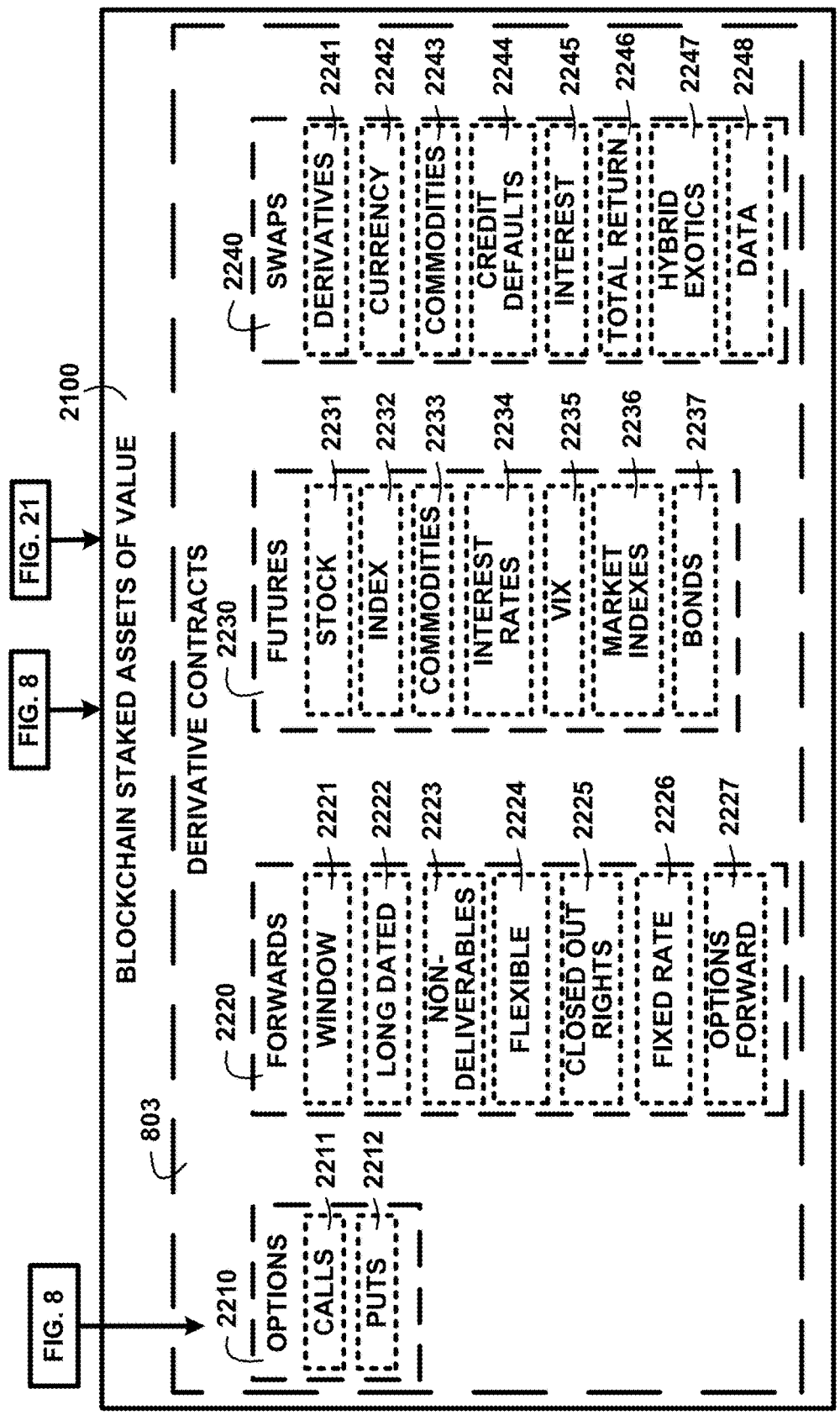
FIG. 22 shows a block diagram of an overview of blockchain staked assets of value derivative contracts of one embodiment.

FIG. 22 shows a block diagram of an overview of blockchain staked assets of value derivative contracts of one embodiment. FIG. 22 shows a continuation from FIG. 8 and FIG. 21 of blockchain staked assets of value 2100. The blockchain staked assets of value 2100 also shows a continuation from FIG. 5 of the derivative contracts 803. The derivative contracts 803 include at least one from a group consisting of options 2210, calls 2211 and puts 2212. An options contract is an agreement between two parties to facilitate a potential transaction on an underlying security at a preset price, referred to as the strike price, prior to or on the expiration date.

Another group of derivative contracts 803 includes forwards 2220. Forwards 2220 include window 2221, long dated 2222, non-deliverables 2223, flexible 2224, closed out rights 2225, fixed rate 2226, and options forward 2227. One example of a forwards contract is an informal agreement traded to buy and sell specified assets, typically currency, at a specified price at a certain future date.

In yet another group of derivative contracts 803 are futures 2230. Futures 2230 include stock 2231, index 2232, commodities 2233, interest rates 2234, VIX 2235, market indexes 2236, and bonds 2237. For example, a futures contract is a legal agreement to buy or sell a particular commodity asset, or security at a predetermined price at a specified time in the future. A fourth group of derivative contracts 803 is swaps 2240. Swaps 2240 include derivatives 2241, currency 2242, commodities 2243, credit default 2244, interest 2245, total return 2246, hybrid exotics 2247, and data 2248. In one example, a stock swap is the exchange of one equity-based asset for another of one embodiment.

Figure 23:
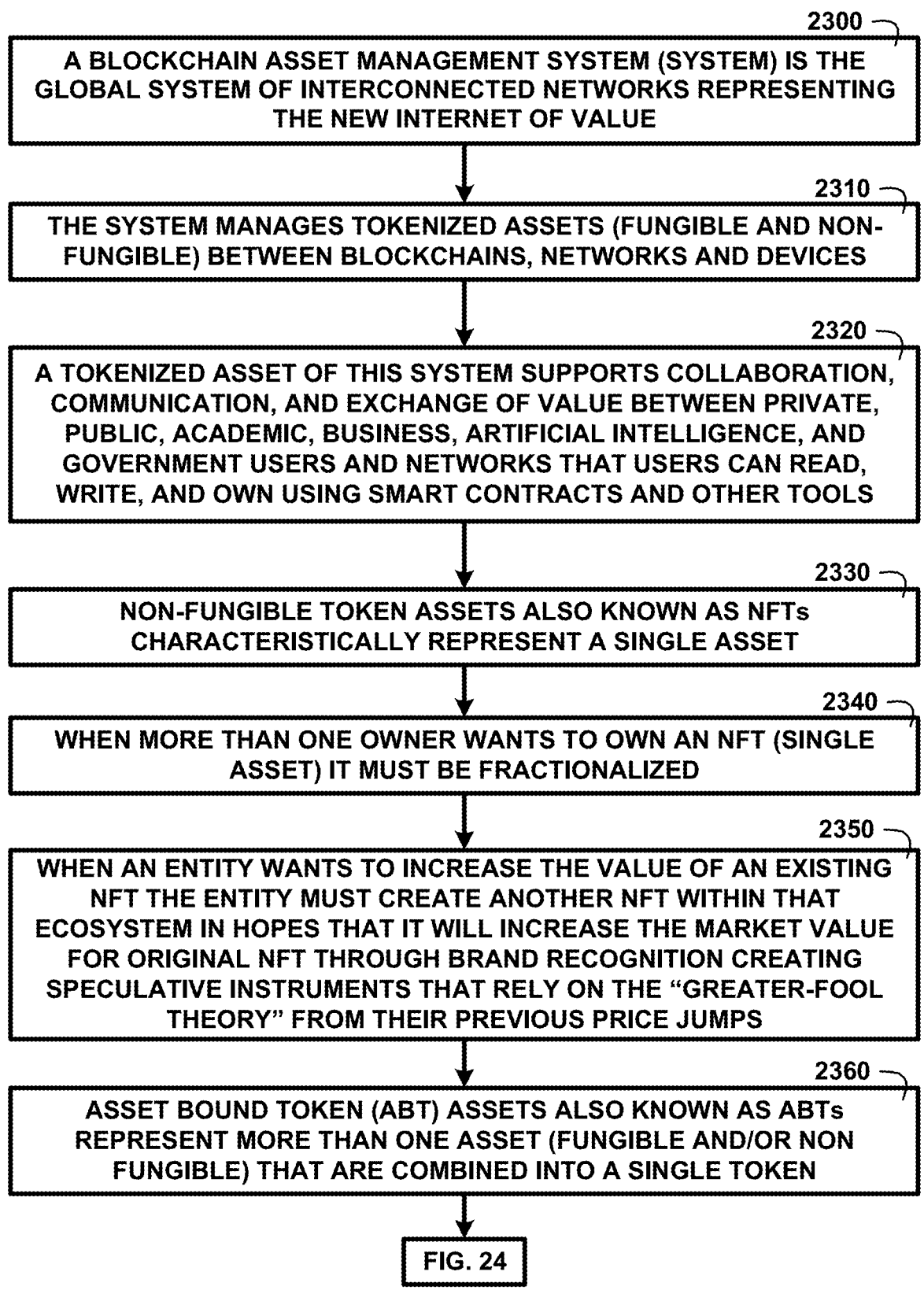
FIG. 23 shows a block diagram of an overview of a blockchain asset management system of one embodiment.

FIG. 23 shows a block diagram of an overview of a blockchain asset management system of one embodiment. FIG. 23 shows a Blockchain Asset Management System (system) that is the global system of interconnected networks representing the new internet of value 2300. The system manages tokenized assets (fungible and non-fungible) between blockchains, networks and devices 2310. A tokenized asset of this system supports collaboration, communication, and exchange of value between private, public, academic, business, artificial intelligence, and government users and networks that users can read, write, use, and own using smart contracts and other tools 2320.

Non-Fungible Token assets also known as NFTs characteristically represent a single asset 2330. When more than one owner wants to own an NFT (single asset) it must be fractionalized 2340. When an entity wants to increase the value of an existing NFT the entity must create another NFT within that ecosystem in hopes that it will increase the market value for original NFT through brand recognition creating speculative instruments that rely on the "greater-fool theory" from their previous price jumps 2350. Asset Bound Token (ABT) assets also known as ABTs represent more than one asset (fungible and/or non-fungible) that are combined into a single token 2360 of one embodiment. Descriptions continue in FIG. 24.

FIG. 24 shows a block diagram of an overview of ABT features of one embodiment. FIG. 24 shows a continuation from FIG. 23. Each asset within an ABT may have different attributes, characteristics, type, value, or utilities and can be fractionalized or combined by its features and/or each asset within the ABT 2400. Those assets can be a product, currency, service, specimen, entity, security, and/or anything of value 2410. An asset creator can increase the value of an ABT by adding additional assets to an Asset Bound Token 2420. Asset owners within an ecosystem may be able to exchange those individual assets in an asset bound token with each other allowing a user to recompose their owned assets such as art (Not limited to art) 2430. Some ABTs may expire depending on the asset to reflect wear and tear of product from time of purchase. An expired token can be used to receive a new product. They may also expire to reflect on a new product line, and phasing outdated products. Some verified expired products may be reclassified as collectibles. A user who is not a creator, owner, or servicing entity may have limited hold time of an ABT due to lack of staked asset activities on that asset causing their temporary asset to expire.

ABT creators, owners, servicing entities, and/or users receive yield from each transaction when asset is utilized 2440. Users who receive yield can select to have a portion of their yield donated to offset payments or transaction fees in a favorable manner for users using the asset management social payment tool 2450. Yield is provided via smart contracts 2460. Yield can go toward other services, utilities, products, or investments (not limited) within the asset management system 2470 of one embodiment. Descriptions continue in FIG. 25.

FIG. 25 shows a block diagram of an overview of asset bound tokens that facilitate market liquidity of one embodiment. FIG. 25 shows a continuation from FIG. 24. This blockchain asset management system represents the new internet of value and gives all users on the network a unique experience exchanging value and changing the way users of a social network communicate, collaborate, own, and share with each other 2500. Asset Bound Tokens facilitate market liquidity, better price valuations, democratization, increased inclusion, and market participation 2510.

ABTs gives the opportunity to the average person to purchase high value assets in fractionalized form and swap different features to increase rarity and value and/or change, modify and combine attributes 2520. An ABT with a low rank and rarity can become a 1 of 1 and/or high rank and rarity if users exchange assets within ABT accordingly 2530. Different parts of the fractionalized ABT have different rarities and attributes, allowing a user to trade or buy to increase their rarity and value 2540. (Buy, exchange, swap, and update data, attributes, and/or art layers) a verified creator can make an ABT with products from other ABT entities (companies with physical and digital assets and services) on the ABT platform without purchasing them and offer them for sale 2550. Using smart contracts when those ABTs (group of assets sold as a bundle) are sold then the smart contract will automatically purchase from ABT entities and sent to buyer 2560 of one embodiment.

Figure 26:
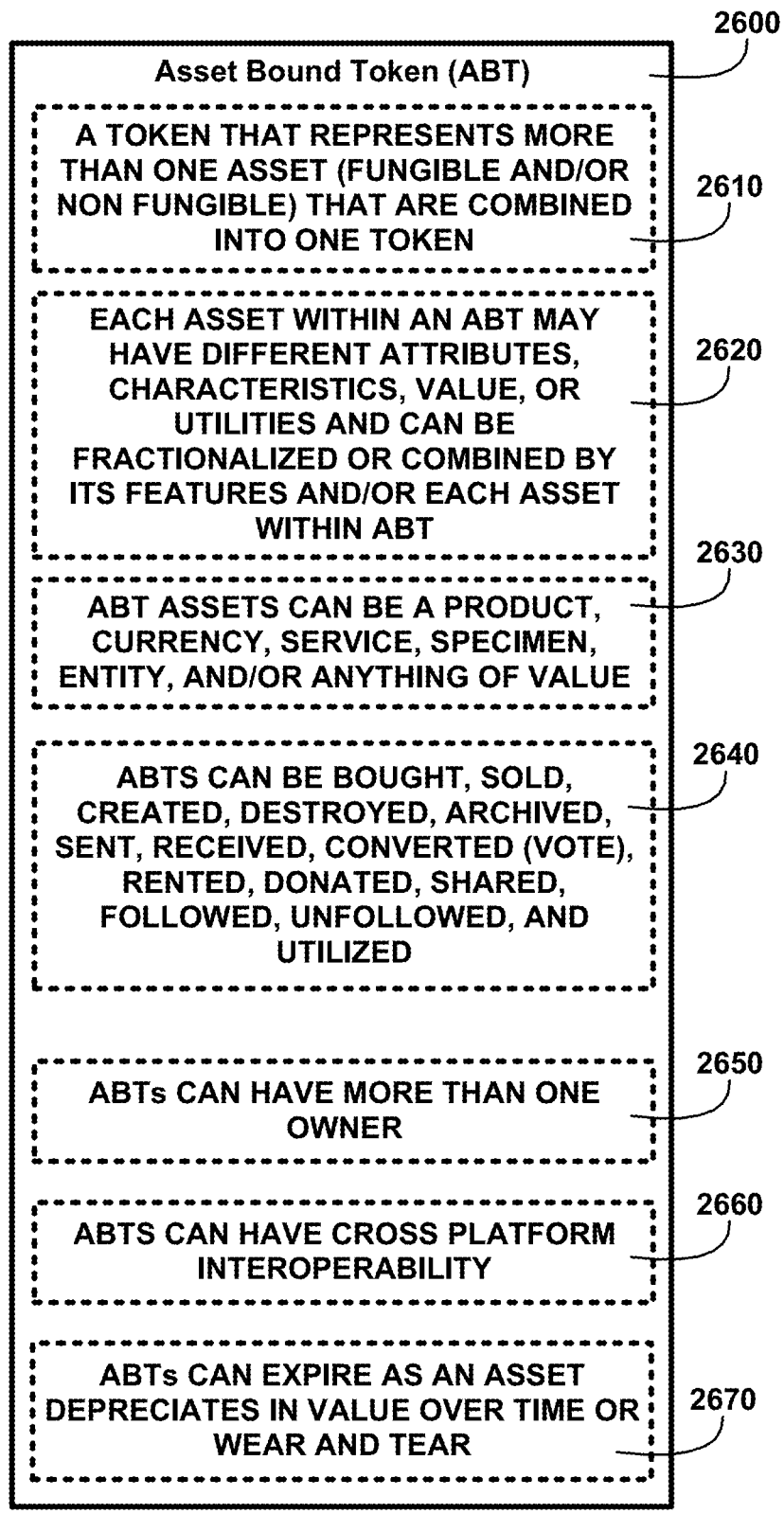
FIG. 26 shows a block diagram of an overview of asset bound tokens of one embodiment.

FIG. 26 shows a block diagram of an overview of asset bound tokens of one embodiment. FIG. 26 shows an Asset Bound Token (ABT) 2600. A token that represents more than one asset (fungible and/or non-fungible) that are combined into one token 2610. Each asset within an ABT may have different attributes, characteristics, value, or utilities and can be fractionalized or combined by its features and/or each asset within the ABT 2620. ABT assets can be a product, currency, service, specimen, entity, and/or anything of value 2630. ABTs can be bought, sold, created, destroyed, archived, sent, received, converted (vote), rented, donated, shared, followed, unfollowed, and utilized 2640. ABTs can have more than one owner 2650. ABTs can have cross platform interoperability 2660. ABTs can expire as an asset depreciates in value over time or wear and tear 2670 of one embodiment.

Figure 27:
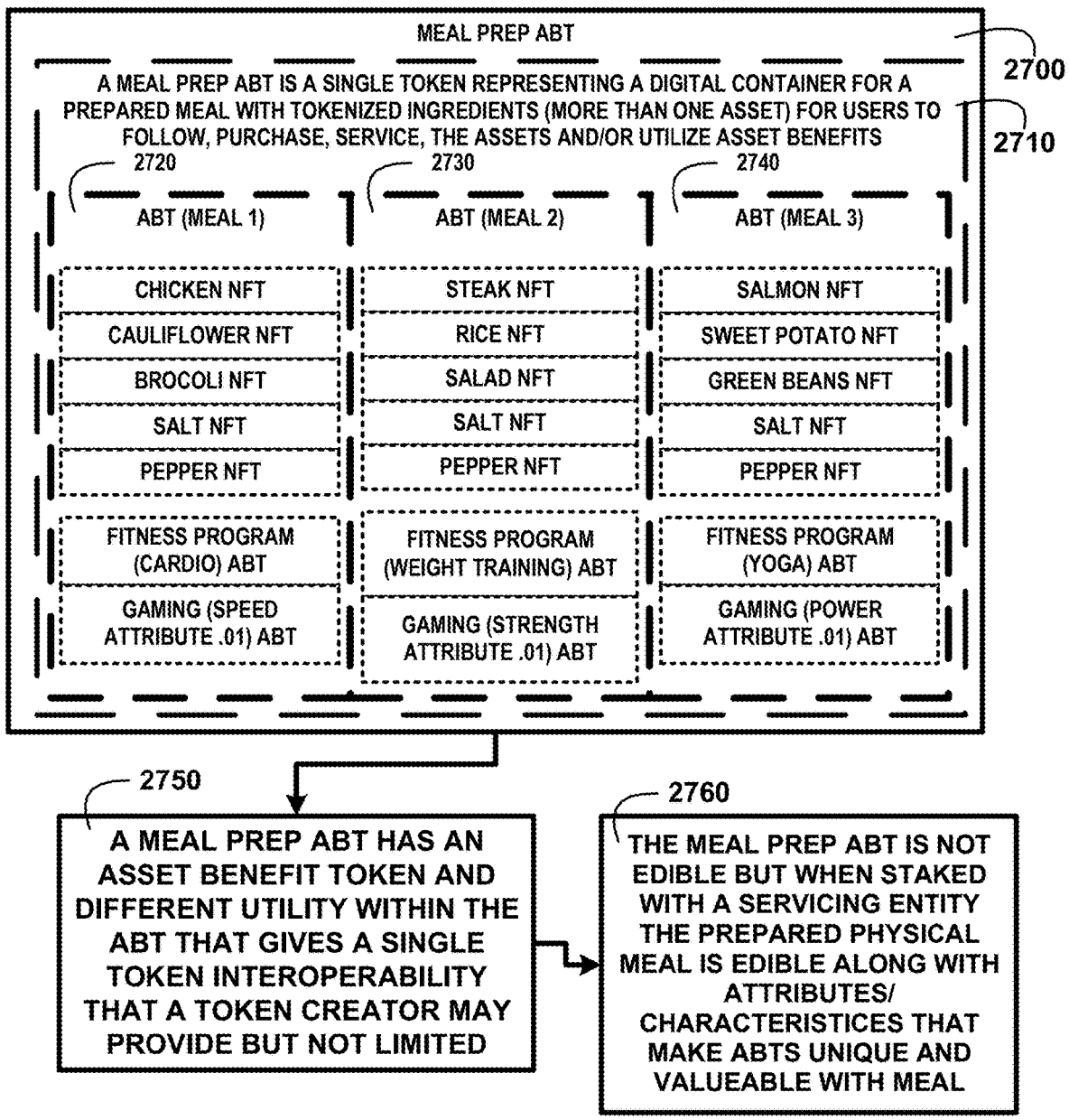
FIG. 27 shows a block diagram of an overview of a meal prep ABT of one embodiment.

FIG. 27 shows a block diagram of an overview of a meal prep ABT of one embodiment. FIG. 27 shows Meal Prep ABT 2700. A Meal Prep ABT is a single token representing a digital container for a prepared meal with tokenized ingredients (more than one asset) for users to follow, purchase, service, the assets and/or utilize asset benefits 2710. ABT (Meal 1) 2720 with Chicken NFT, Cauliflower NFT, Broccoli NFT, Salt NFT, Pepper NFT, Fitness Program (cardio) ABT, and Gaming (Speed Attribute .01) ABT. ABT (Meal 2) 2730 with Steak NFT, Rice NFT, Salad NFT, Salt NFT, Pepper NFT, Fitness Program (weight training) NFT, and Gaming (Strength Attribute .01) NFT ABT (Meal 3) 2740 with Salmon NFT, Sweet Potato NFT, Green Beans NFT, Salt NFT, Pepper NFT, Fitness Program (Yoga) ABT, and Gaming (Power Attribute .01) ABT. A Meal Prep ABT has an asset benefit token and different utility within the ABT that gives a single token interoperability that a token creator may provide but not limited 2750. The Meal Prep ABT is not edible but when staked with a servicing entity the prepared meal is very much edible along with other attributes/characteristics that make ABTs unique and valuable with meal 2760 of one embodiment.

Figure 28:
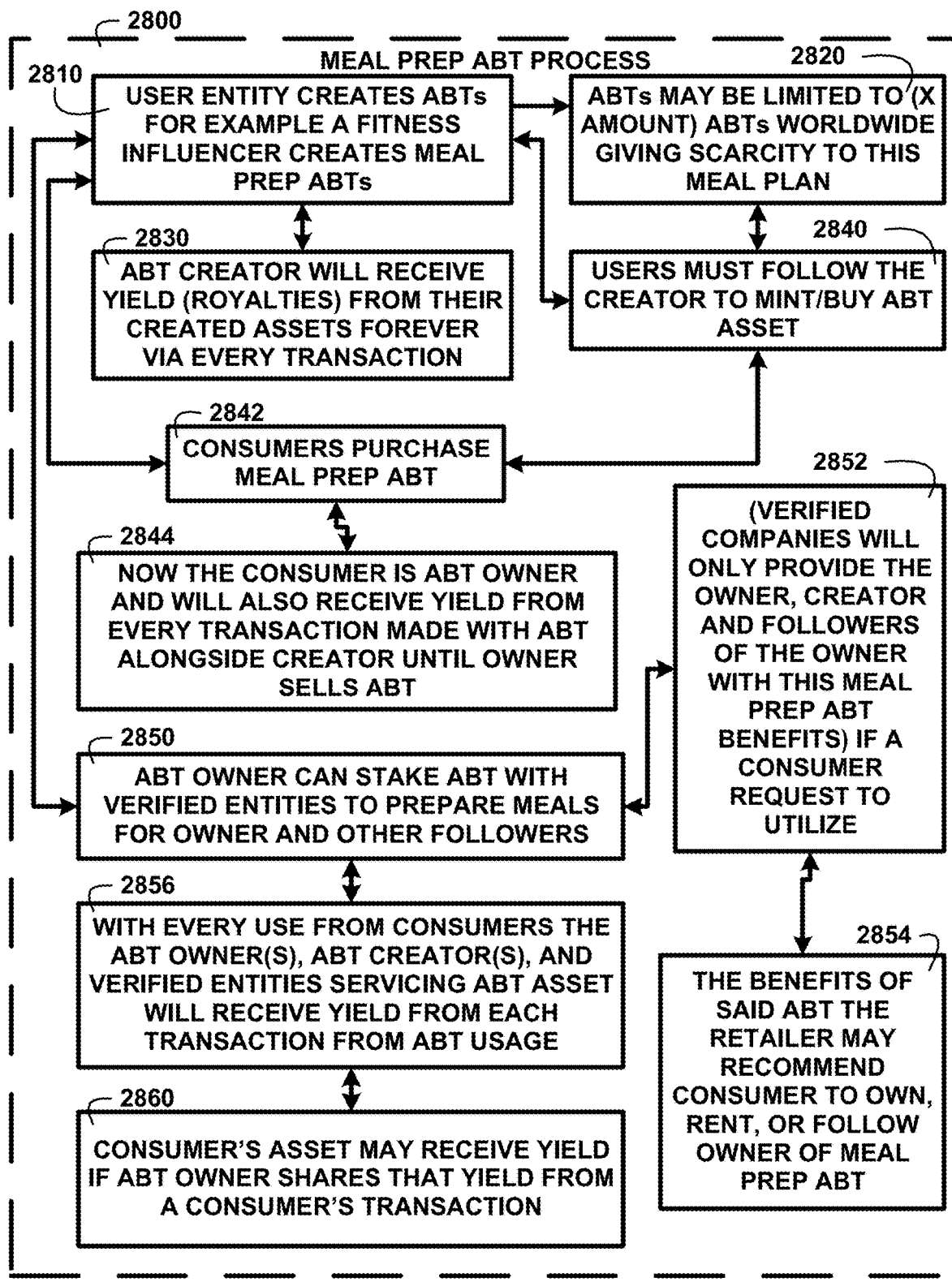
FIG. 28 shows a block diagram of an overview of a meal prep ABT process of one embodiment.

FIG. 28 shows a block diagram of an overview of a meal prep ABT process of one embodiment. FIG. 28 shows Meal Prep ABT Process 2800. User entity creates ABTs, for example a fitness influencer creates Meal Prep ABTs 2810. ABTs may be limited to (X amount) ABTs worldwide giving scarcity to this Meal Plan 2820. ABT creators will receive yield (royalties) from their created assets forever via every transaction 2830. Users must follow the creator to mint/buy ABT asset 2840. Consumers purchase Meal Prep ABT 2842. Now the consumer is ABT owner and will also receive yield from every transaction made with ABT alongside creator until owner sells ABT 2844.

ABT owner can stake ABT with verified entities to prepare meals for owner and other followers 2850. (Verified companies will only provide the owner, creator, and followers of the owner with this Meal Prep ABT benefits) If a consumer requests to utilize 2852. The benefits of said ABT the retailer may recommend consumer to own, rent, or follow owner of meal prep ABT 2854. With every use from consumers the ABT owner(s), ABT creator(s), and verified entities servicing ABT asset will receive yield from each transaction from ABT usage 2856. Consumer's utilizing asset may receive yield if ABT owner shares that yield from a consumer's transaction 2860 of one embodiment.

Figure 29:
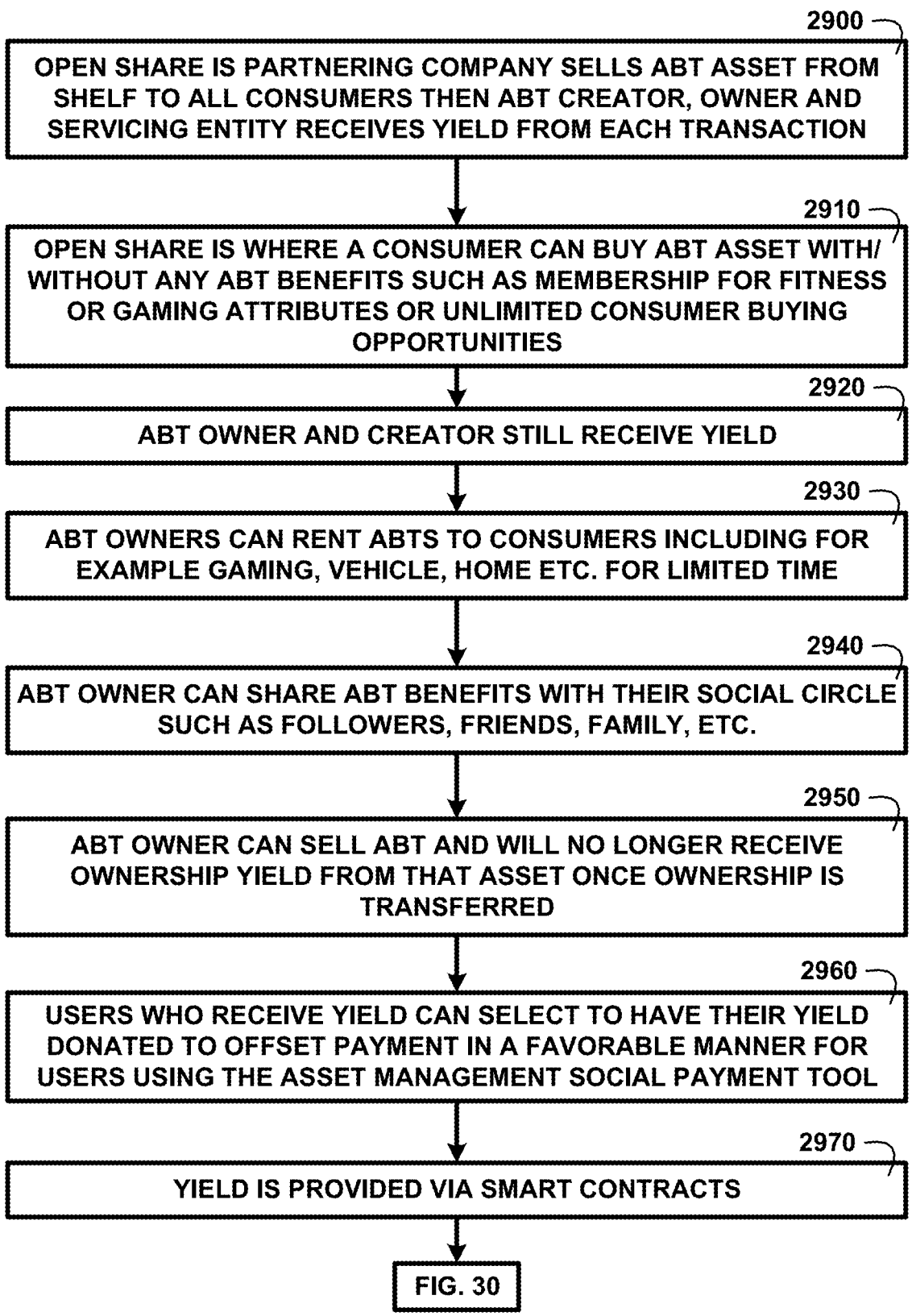
FIG. 29 shows a block diagram of an overview of open share of one embodiment.

FIG. 29 shows a block diagram of an overview of open share of one embodiment. FIG. 29 shows an open share is partnering company sells ABT assets to all consumers then ABT creator, owner and servicing entity receives yield from each transaction 2900. Open share is where a consumer can buy an ABT asset with/without any ABT benefits such as membership for fitness or gaming attributes or unlimited consumer buying opportunities 2910. ABT owner, creator, and servicing entity still receive yield 2920.

ABT owners can rent ABTs to consumers including, for example, gaming, vehicle, home etc., for a limited time 2930. The ABT owner can share ABT benefits with their social circles such as followers, friends, family, etc. 2940. The ABT owner can sell the ABT and will no longer receive an ownership yield from that asset once ownership is transferred 2950. Users who receive yield can select to have their yield donated to offset payment in a favorable manner for users using asset management social payment tool 2960. Yield is provided via smart contracts 2970 of one embodiment. Descriptions continue in FIG. 30.

Figure 30:
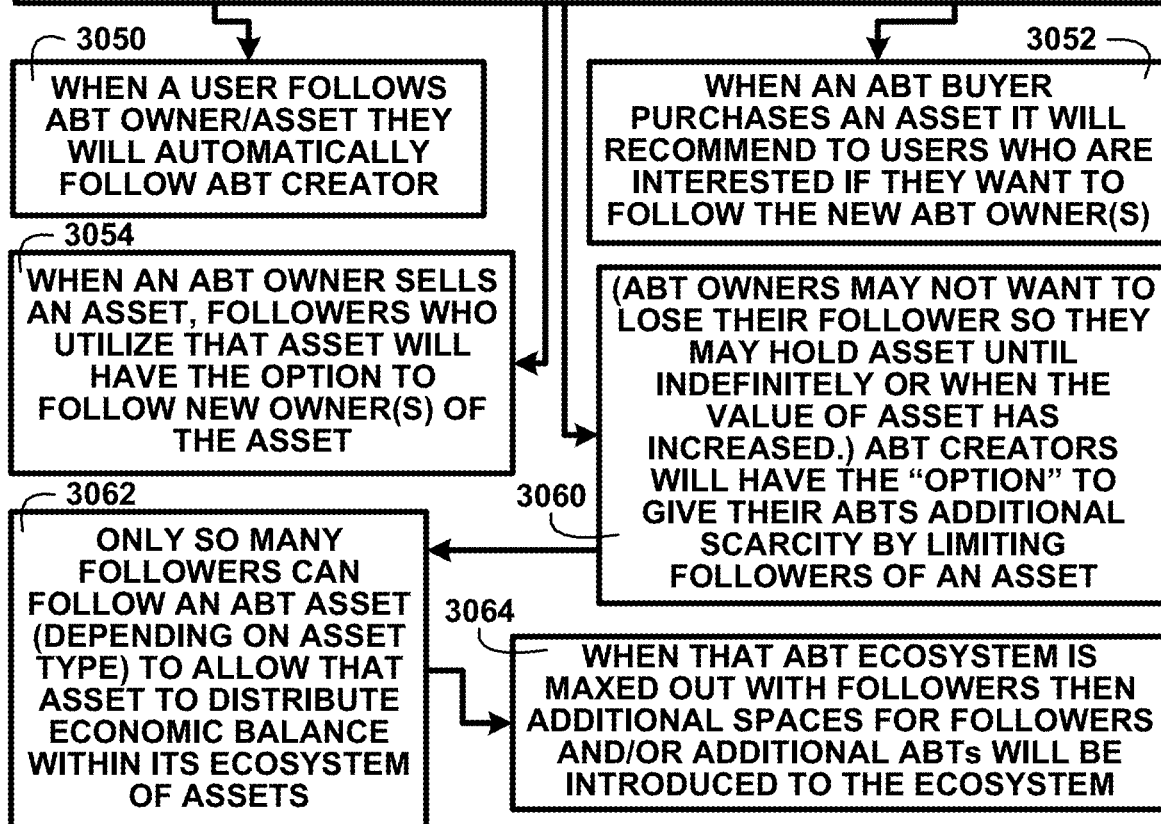
FIG. 30 shows a block diagram of an overview of verified retail entities of one embodiment.

FIG. 30 shows a block diagram of an overview of verified retail entities of one embodiment. FIG. 30 shows a continuation from FIG. 29. Yield can go toward other services, utilities, or products within the asset management system 3000. Verified retail/servicing entities can link to ABT assets or follow ABT owner to provide asset benefits to asset followers and the transaction will provide yield via smart contract to retailer, owner, and creator 3010. ABTs are limited and unique generating scarcity 3020. This is why ABTs are a valuable asset to own 3022. Followers will be able to utilize the benefits of an asset bound token of whom they are following 3030. The ABT creator and owners and servicing entities will be able to receive yield for providing benefits to followers with the option to share yield with followers 3040.

When a user follows ABT owner/asset they will automatically follow ABT creator 3050. When an ABT buyer purchases an asset, it will recommend to users who are interested if they want to follow the new ABT owner(s) 3052. When an ABT owner sells an asset, followers who utilize that asset will have the option to follow the new owner(s) of the asset 3054. ABT owners may not want to lose their followers so they may hold assets indefinitely or when the value of asset has increased. ABT creators will have the "option" to give their ABTs additional scarcity by limiting followers of an asset 3060. Only so many followers can follow an ABT asset (depending on asset type) to allow that asset to distribute economic balance within its ecosystem of assets 3062. When that ABT ecosystem is maxed out with followers then additional spaces for followers and/or additional ABTs will be introduced to the ecosystem 3064 of one embodiment.

Figure 31:
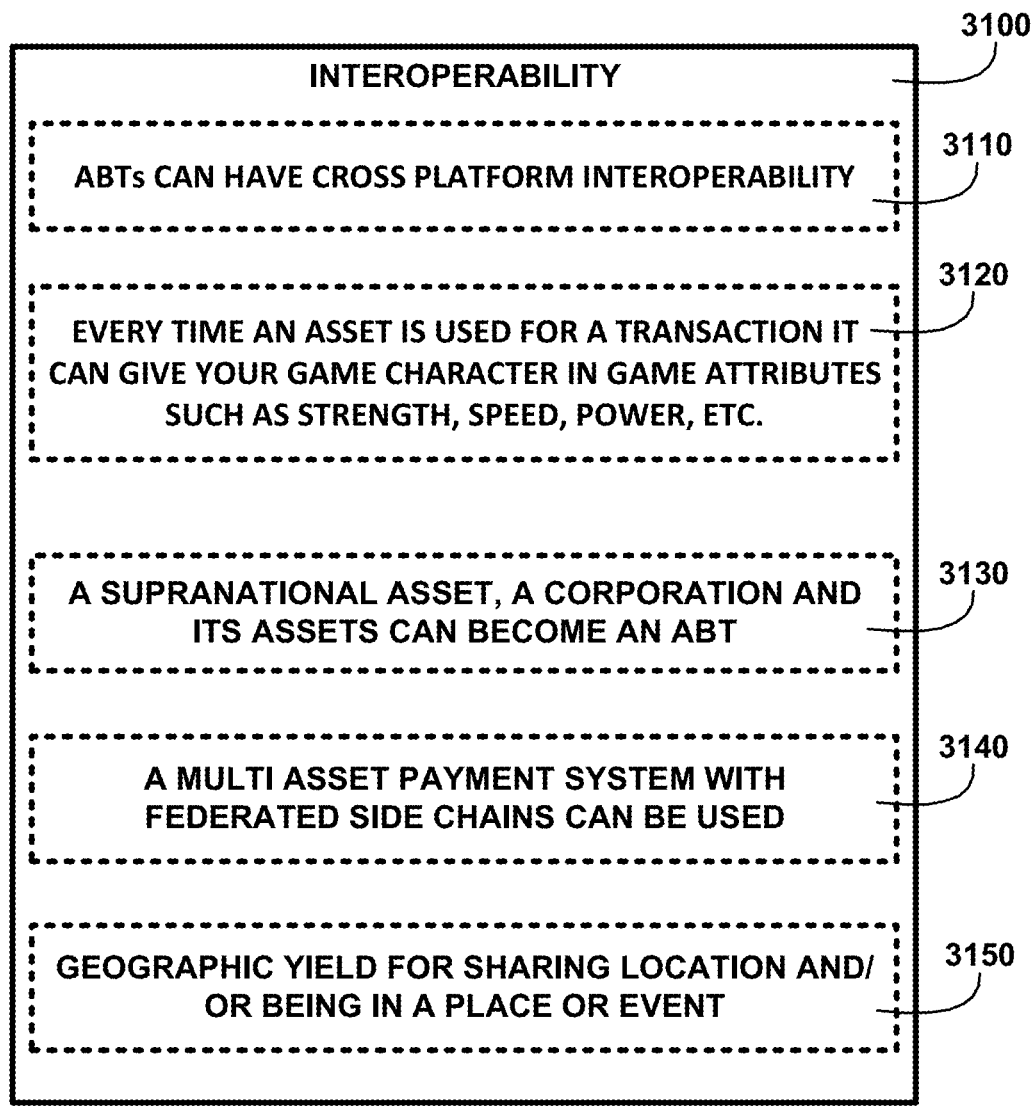
FIG. 31 shows a block diagram of an overview of Interoperability of one embodiment.

FIG. 31 shows a block diagram of an overview of Interoperability of one embodiment. FIG. 31 shows Interoperability 3100. ABTs can have cross platform interoperability 3110. Every time an asset is used for a transaction it can give your game character in game attributes such as strength, speed, power, etc. 3120. A Supranational Asset, a corporation and its assets can become an ABT 3130. A multi asset payment system with federated side chains can be used 3140. Geographic yield for sharing location and/or being in a place or event 3150 of one embodiment.

Figure 32:
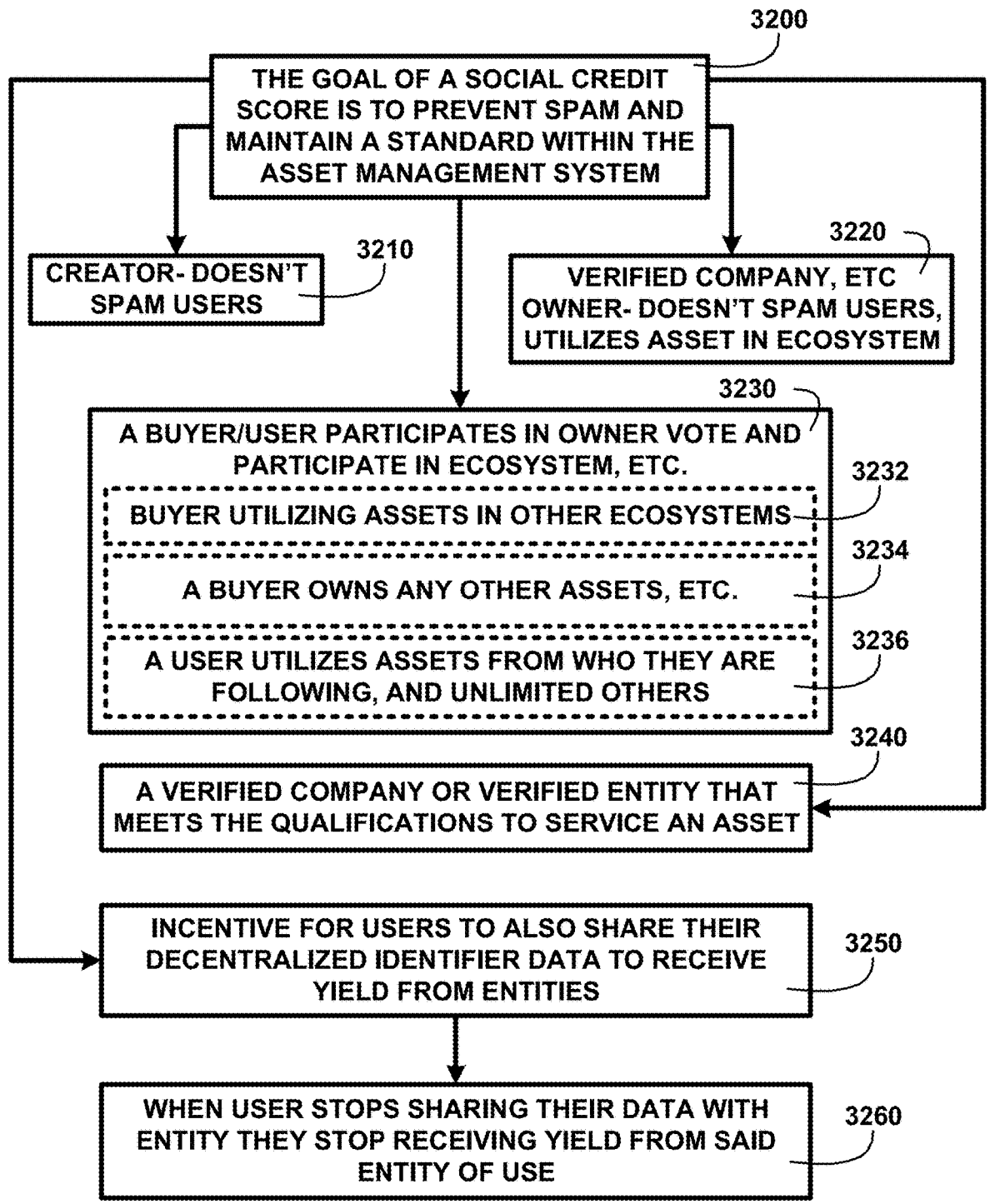
FIG. 32 shows a block diagram of an overview of a social credit score of one embodiment.

FIG. 32 shows a block diagram of an overview of a social credit score of one embodiment. FIG. 32 shows the goal of a social credit score is to prevent spam and maintain a standard within the asset management system 3200. Creator-Does not Spam users 3210. Verified Company, etc. Owner-Does not spam users, utilizes asset in ecosystem 3220. A buyer/user Participates in owner vote and participates in ecosystem, etc. 3230. Buyer utilizing assets in other ecosystems 3232. A buyer owns any other assets, etc. 3234. A user utilizes assets from whom they are following, and unlimited others 3236.

A verified company or verified entity that meets the qualifications to service an asset 3240. Incentive for users to also share their decentralized identifier data to receive yield from entities 3250. When user stops sharing their data with an entity, they stop receiving yield from said entity of use 3260 of one embodiment.

Figure 33:
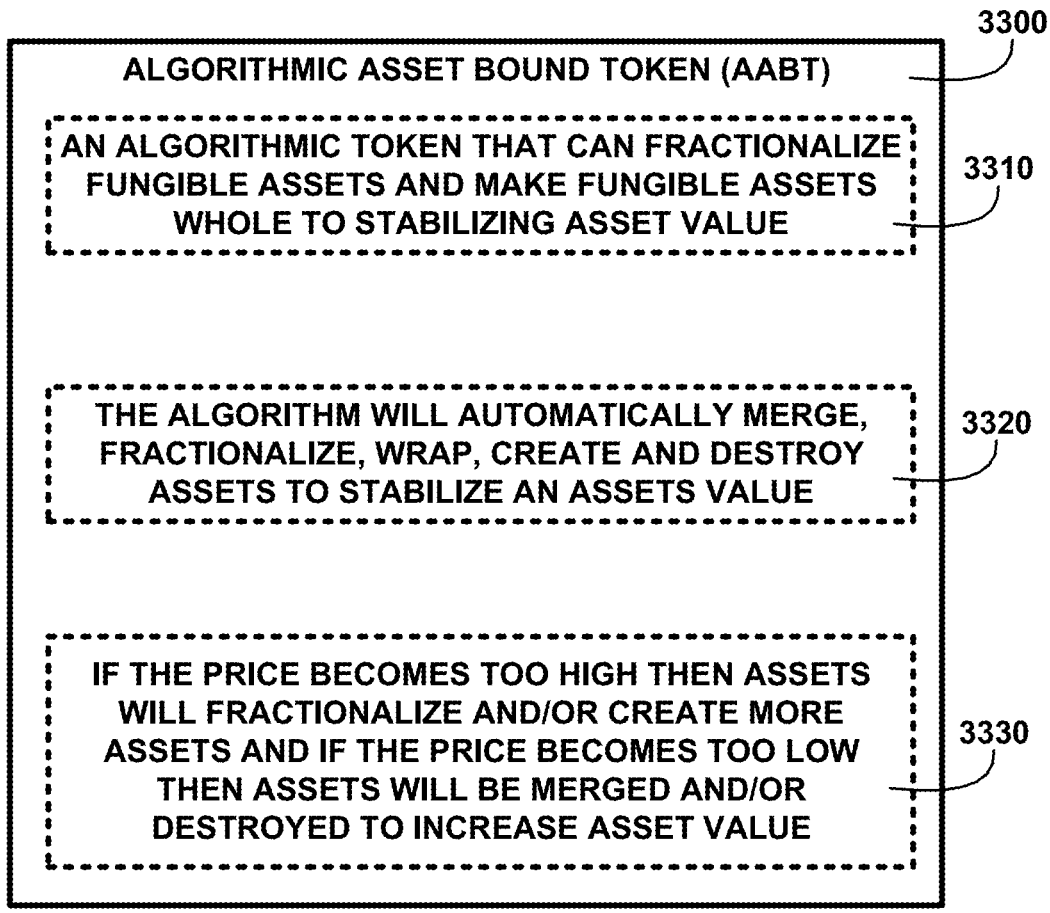
FIG. 33 shows a block diagram of an overview of an algorithmic asset bound token of one embodiment.

FIG. 33 shows a block diagram of an overview of an algorithmic asset bound token of one embodiment. FIG. 33 shows an Algorithmic Asset Bound Token (AABT) 3300. An algorithmic token that can fractionalize fungible assets and make fungible assets whole to stabilize asset value 3310. The algorithm will automatically merge, fractionalize, wrap, create and destroy assets to stabilize an assets value 3320. If the price becomes too high, then assets will fractionalize and/or create more assets and if the price becomes too low then assets will be merged and/or destroyed to increase asset value 3330 of one embodiment.

Figure 34:
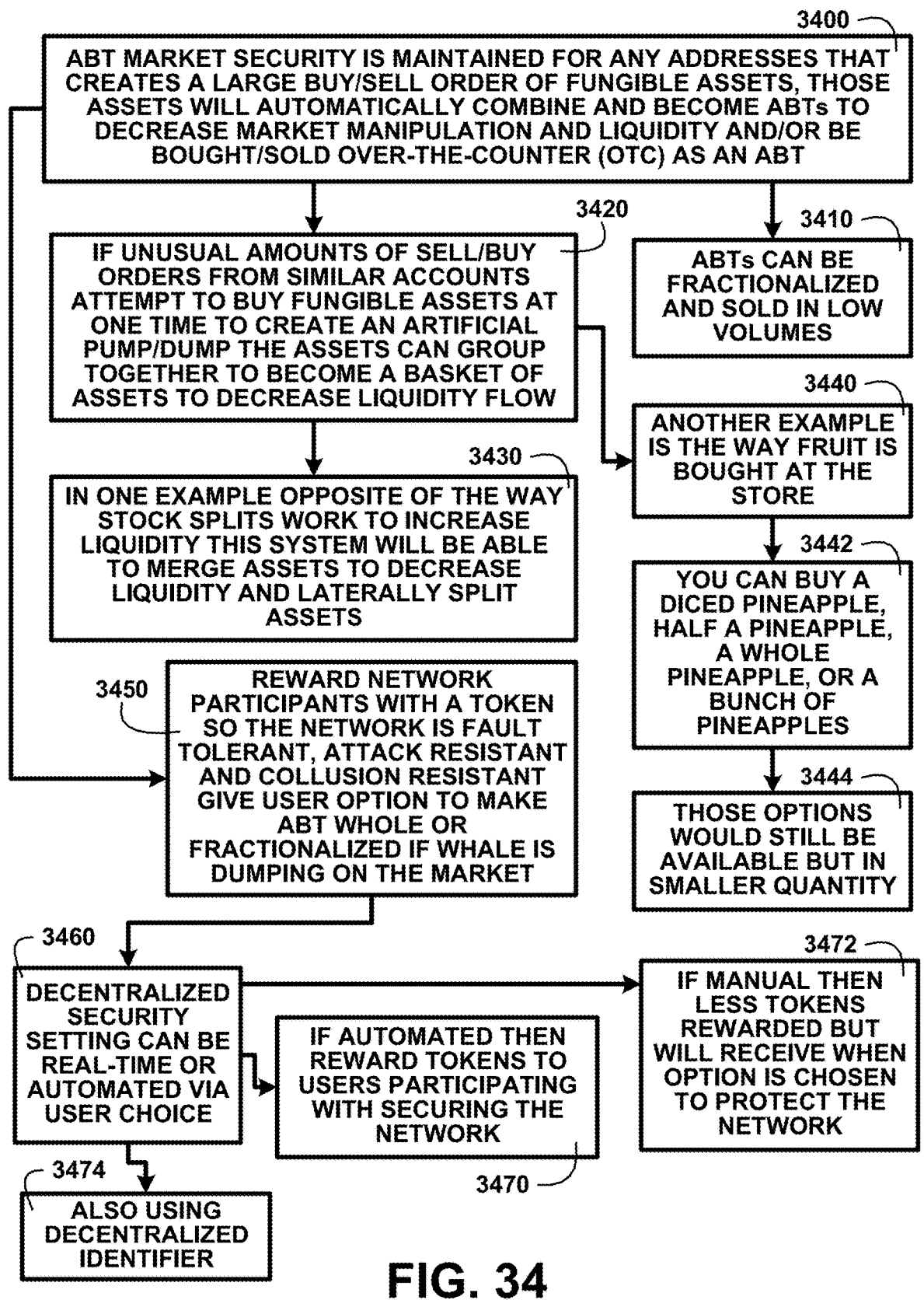
FIG. 34 shows a block diagram of an overview of ABT market security of one embodiment.

FIG. 34 shows a block diagram of an overview of ABT market security of one embodiment. FIG. 34 shows ABT market security is maintained for any addresses that create a large buy/sell order of fungible assets; those assets will automatically combine and become ABTs to decrease market manipulation and liquidity and/or be bought/sold Over-The-Counter (OTC) as an ABT 3400. ABTs can be fractionalized and sold at low volumes 3410. If unusual amounts of sell/buy orders from similar accounts attempt to buy fungible assets at one time to create an artificial pump/dump the assets can group together to become a basket of assets to decrease liquidity flow 3420.

In one example, the opposite of the way stock splits work to increase liquidity, this system will be able to merge assets to decrease liquidity and laterally split assets 3430. Another example is the way fruit is bought at the store 3440. You can buy a diced pineapple, half a pineapple, a whole pineapple, or a bunch of pineapples 3442. Those options would still be available but in smaller quantity 3444. Reward network participants with a token so the network is fault tolerant, attack resistant and collusion resistant and giving the user an option to make ABT whole or fractionalized if whale is dumping on the market 3450. Decentralized security setting can be real-time or automated via user choice 3460. If automated, then reward tokens to users participating with securing the network 3470. If manual, then fewer tokens rewarded but will receive when option is chosen to protect the network 3472. Also using decentralized Identifier 3474 of one embodiment.

Figure 35:
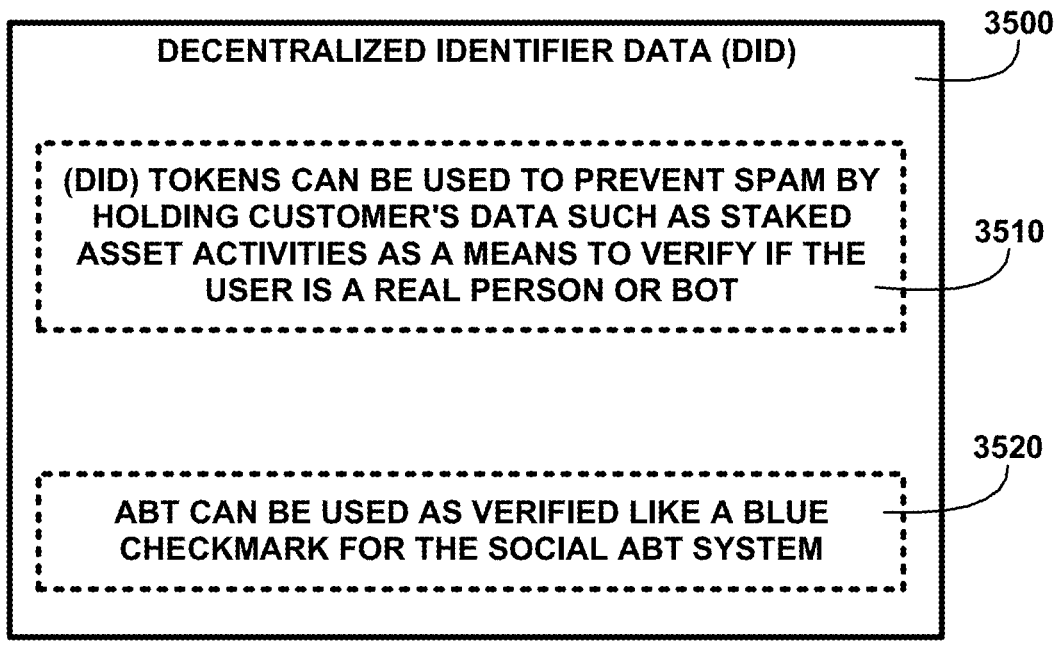
FIG. 35 shows a block diagram of an overview of decentralized identifier data of one embodiment.

FIG. 35 shows a block diagram of an overview of decentralized identifier data of one embodiment. FIG. 35 shows Decentralized Identifier Data (DID) 3500. (DID) tokens can be used to prevent spam by holding customer's data such as staked asset activities as a means to verify if the user is a real person or bot 3510. ABT can be used as verified assets like a blue checkmark for the social ABT system 3520 of one embodiment.

Figure 36:
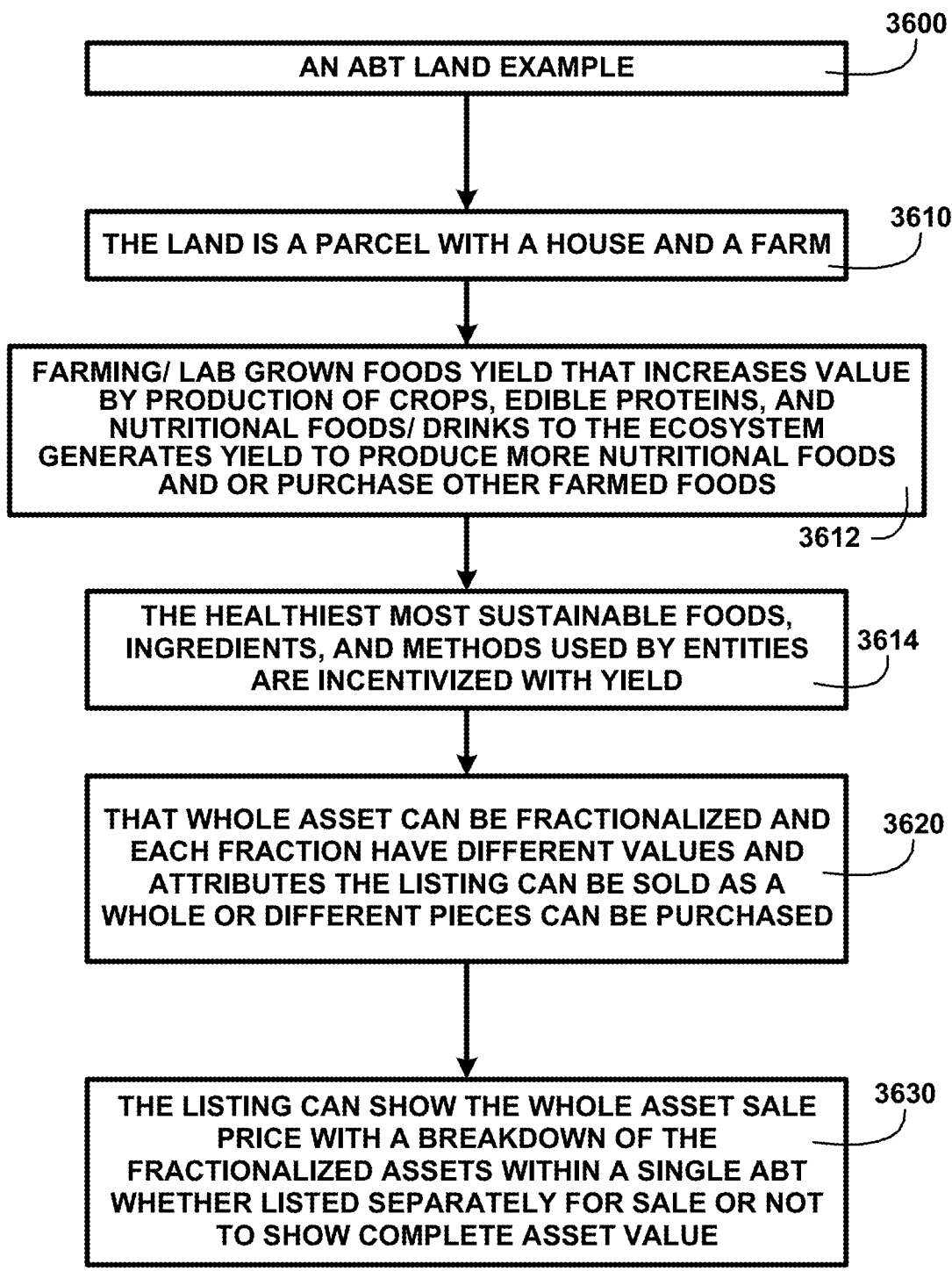
FIG. 36 shows a block diagram of an overview of an ABT land example of one embodiment.

FIG. 36 shows a block diagram of an overview of an ABT land example of one embodiment. FIG. 36 shows an ABT land example 3600. The land is a parcel with a house and a farm 3610. Farming/lab grown foods yield that increases value by production of crops, edible proteins, and nutritional foods/drinks to the ecosystem generates yield to produce more nutritional foods and or purchase other farmed foods 3612. The healthiest most sustainable foods, ingredients, and methods used by entities are incentivized with yield 3614.

That whole asset can be fractionalized, and each fraction has different values and attributes the listing can be sold as whole or different pieces can be purchased 3620. The listing can show the whole asset sale price with a breakdown of the fractionalized assets within a single ABT whether listed separately for sale or not to show complete asset value 3630 of one embodiment.

Figure 37:
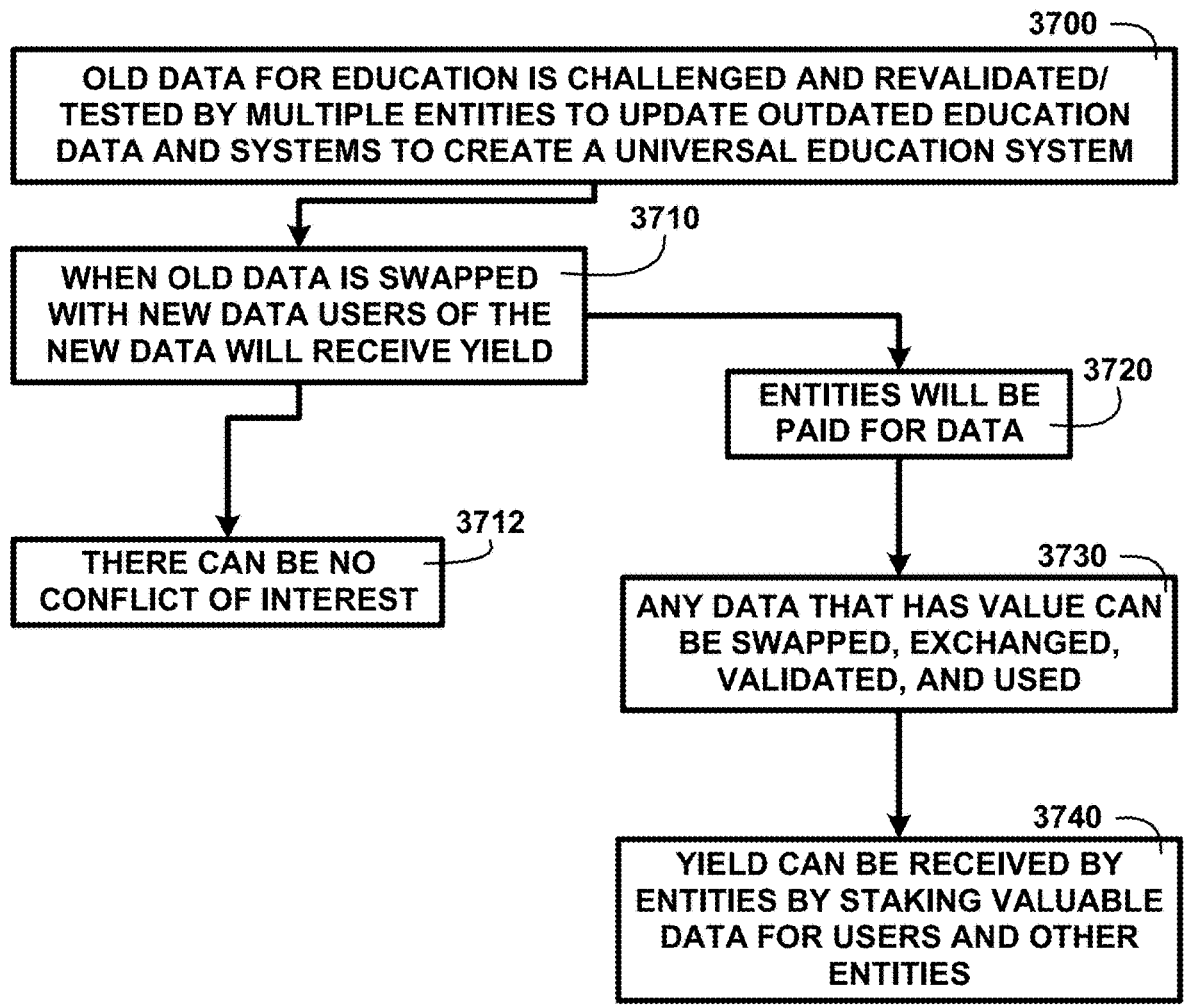
FIG. 37 shows a block diagram of an overview of data for education of one embodiment.

FIG. 37 shows a block diagram of an overview of data for education of one embodiment. FIG. 37 shows old data for education is challenged and revalidated/tested by multiple entities to update outdated education data and systems to create a universal education system 3700. When old data is swapped with new data users of the new data will receive yield 3710. There can be no conflict of interest 3712. Entities will be paid for data 3720. Any data that has value can be swapped, exchanged, validated, and used 3730. Yield can be received by entities by staking valuable data for users and other entities 3740 of one embodiment.

Figure 38:
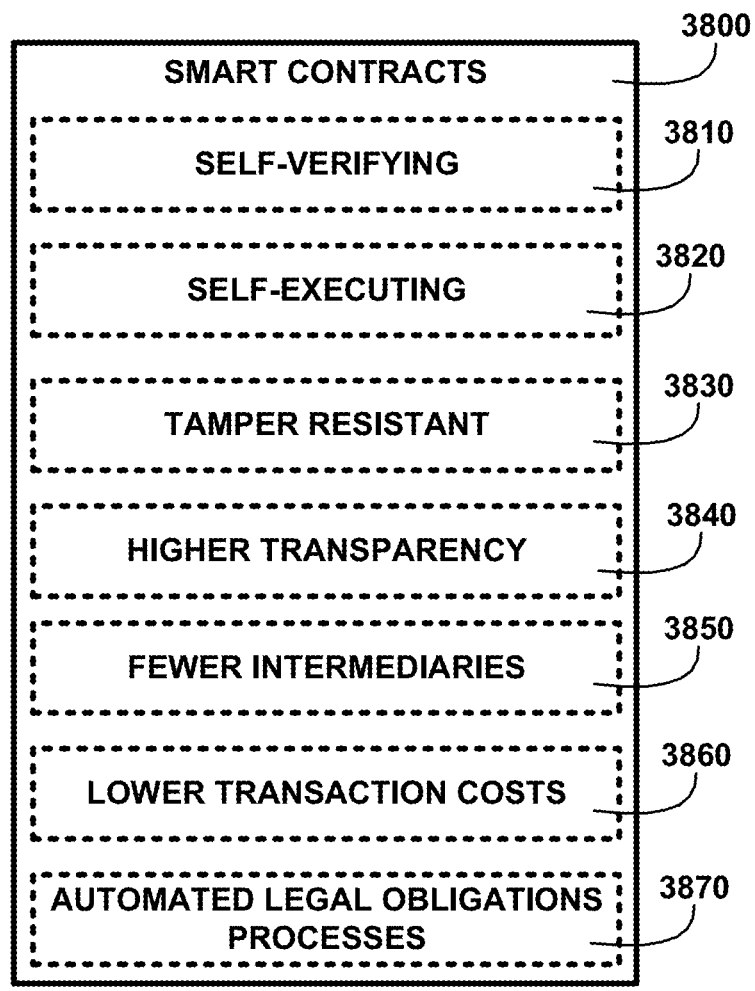
FIG. 38 shows a block diagram of an overview of smart contracts of one embodiment.

FIG. 38 shows a block diagram of an overview of smart contracts of one embodiment. FIG. 38 shows smart contracts 3800. Smart contracts 3800 incorporate features including self-verifying 3810, self-executing 3820, tamper resistant 3830, higher transparency 3840, fewer intermediaries 3850, lower transaction costs 3860, and automated legal obligations processes 3870 of one embodiment.

Figure 39:
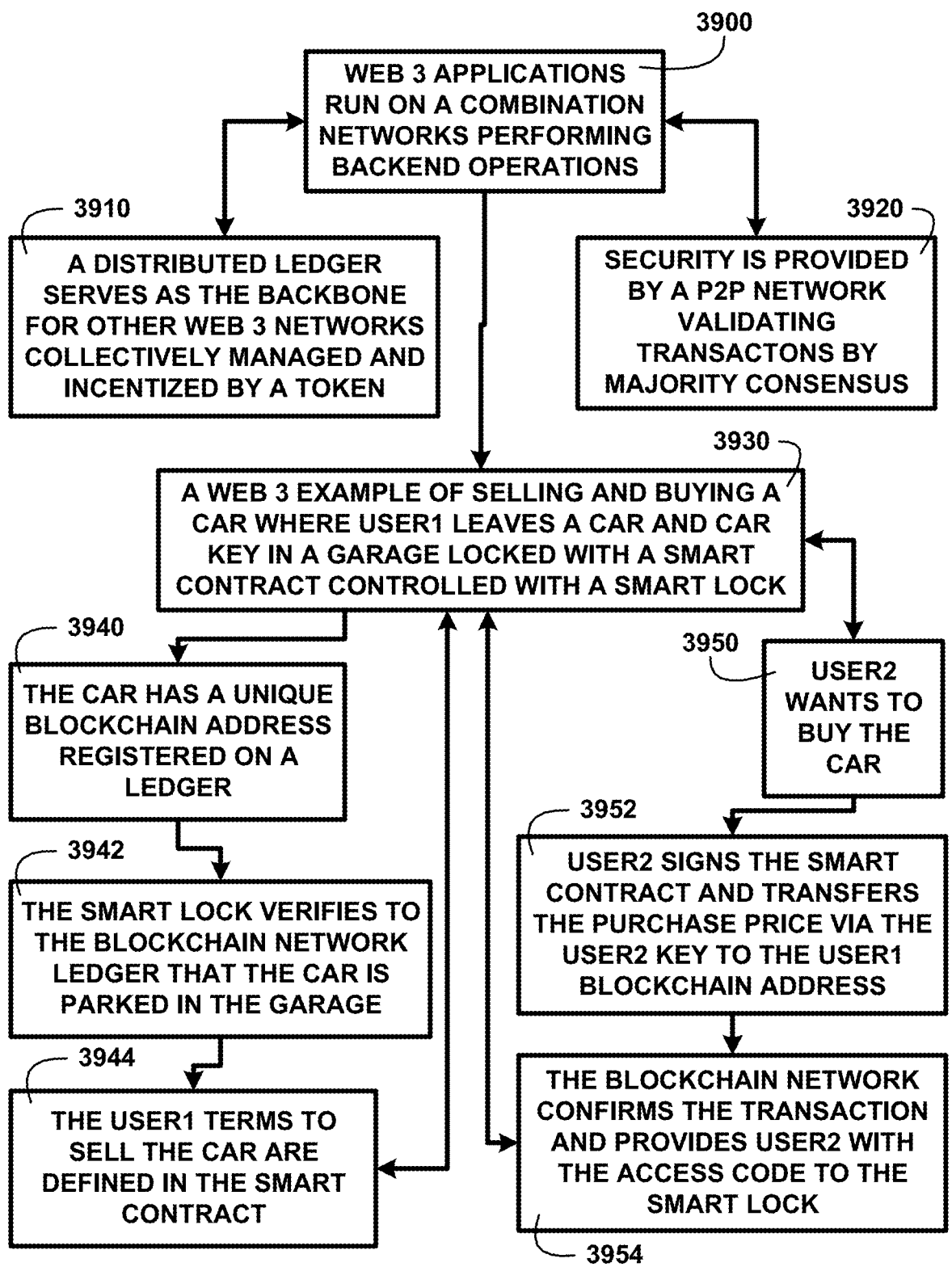
FIG. 39 shows a block diagram of an overview of web 3 applications of one embodiment.

FIG. 39 shows a block diagram of an overview of web 3 applications of one embodiment. FIG. 39 shows web 3 applications run on a combination of networks performing backend operations 3900. A distributed ledger serves as the backbone for other web 3 networks collectively managed and incentivized by a token 3910. Security is provided by a P2P network validating transactions by majority consensus 3920. A web 3 example of selling and buying a car where User1 leaves a car and car key in a garage locked with a smart contract controlled with a smart lock 3930. The car has a unique blockchain address registered on a ledger 3940.

The smart lock verifies to the blockchain network ledger that the car is parked in the garage 3942. The User1 terms to sell the car are defined in the smart contract 3944. User2 wants to buy the car 3950. User2 signs the smart contract and transfers the purchase price via the User2 key to the User1 blockchain address 3952. The blockchain network confirms the transaction and provides User2 with the access code to the smart lock 3954 of one embodiment.

Figure 40:
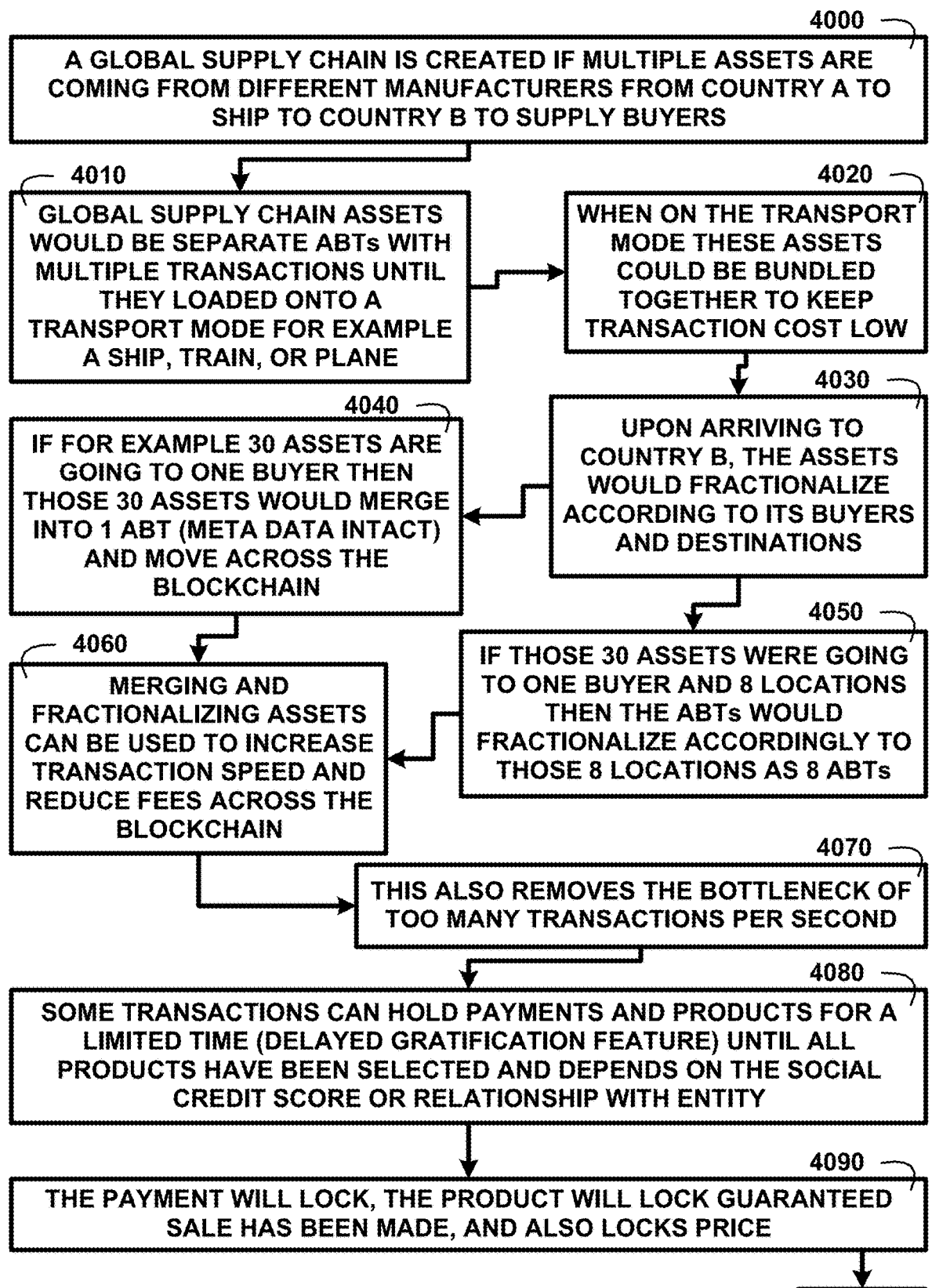
FIG. 40 shows a block diagram of an overview of a global supply chain of one embodiment.

FIG. 40 shows a block diagram of an overview of a global supply chain of one embodiment. FIG. 40 shows a global supply chain is created if multiple assets are shipped from different manufacturers from country A to ship to country B to supply buyers 4000. Global supply chain assets would be separate ABTs with multiple transactions until they are loaded onto a transport mode, for example, a ship, train, or plane 4010. When in the transport mode these assets could be bundled together to keep shipping transaction costs low 4020. Upon arriving in country B, the assets would fractionalize according to its buyers and destinations 4030.

If for example 30 assets are going to one buyer, then those 30 assets would merge into 1 ABT (Meta data intact) and move across the blockchain 4040. If those 30 assets were going to one buyer and 8 locations, then the ABTs would fractionalize accordingly to those 8 locations as 8 ABTs 4050. Also, an individual buyer can have their single asset co-packaged with a bulk shipment from a bulk buyer to reduce the cost for a single shipment of the individual asset. For example, if 100 bulk assets were packaged for shipping from somewhere (such as an overseas shipment) for a bulk buyer, a single asset from individual buyers could be co-packaged with the 100 assets. This arrangement would lower the shipping costs for the individual buyers of their respective single assets while decreasing the total costs for bulk buyer of 100 assets. Merging and fractionalizing assets can be used to increase transaction speed and reduce fees across the blockchain 4060. This also removes the bottleneck of too many transactions per second 4070. Some transactions can hold payments and products for a limited time (delayed gratification feature) until all products have been selected and depends on the social credit score or relationship with entity 4080. The payment will lock, the product will lock guaranteed sale has been made, and locks price 4090 of one embodiment. Descriptions continue in FIG. 41.

Figure 41:
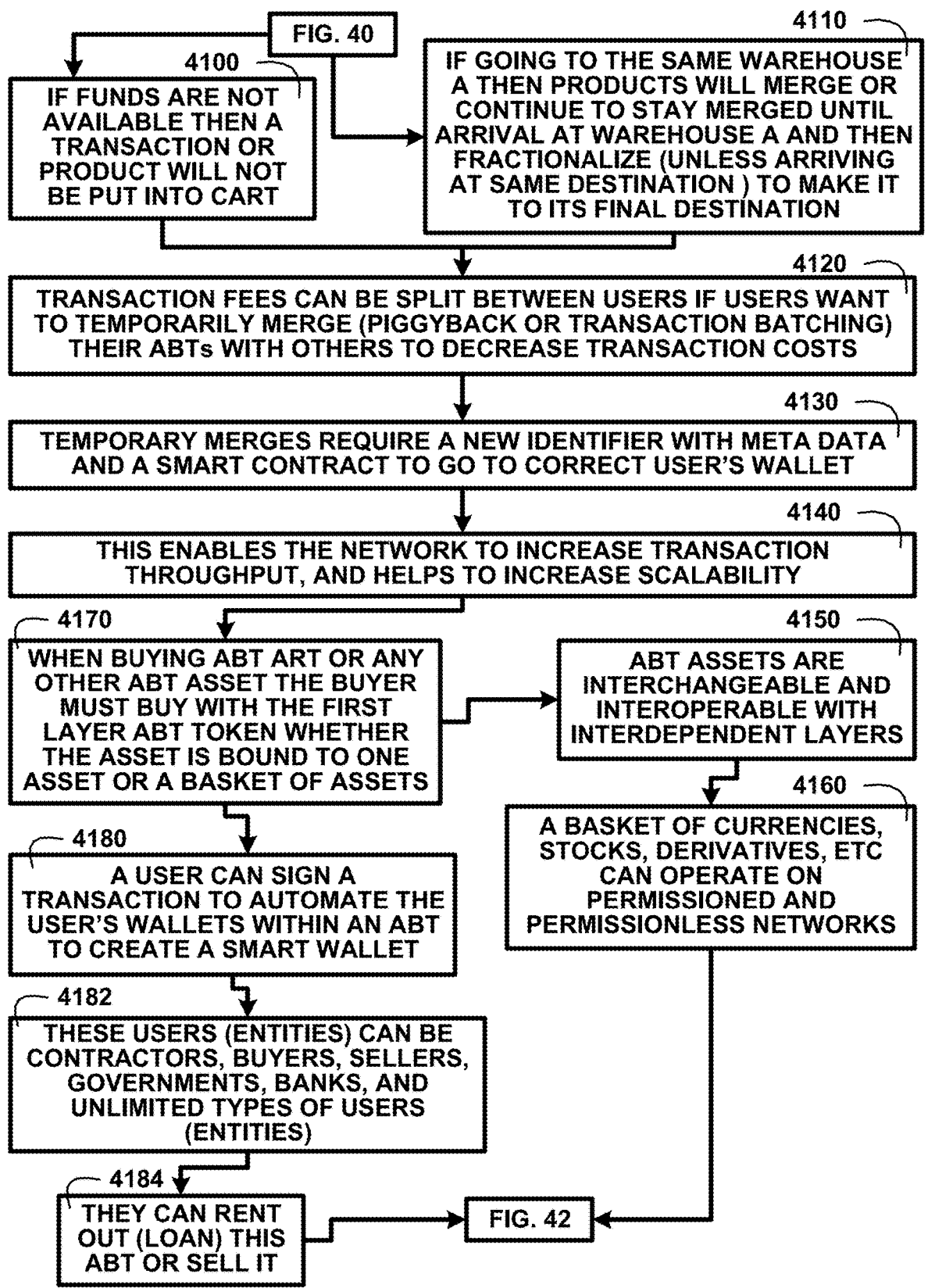
FIG. 41 shows a block diagram of an overview of transaction fees of one embodiment.

FIG. 41 shows a block diagram of an overview of transaction fees of one embodiment. FIG. 41 shows a continuation from FIG. 40. If funds are not available, then a transaction or product will not be put into cart 4100. If going to the same warehouse A then the products will merge or continue to stay merged until arrival at warehouse A and then fractionalize (unless arriving at same destination) to make it to its final destination 4110. Transaction and/or shipping fees can be split between users if users want to temporarily merge (piggyback or transaction batching) their ABTs with others to decrease transaction or shipping costs 4120. Temporary mergers require a new identifier with Meta data and a smart contract to go to correct user's wallet 4130 or shipping address. This enables the network to increase transaction throughput and helps to increase scalability 4140.

ABT assets are interchangeable and interoperable with interdependent layers 4150. A basket of currencies, stocks, derivatives, etc. can operate on permissioned and permission less networks 4160. When buying ABT art or any other ABT asset the buyer must buy with the first layer ABT token whether the asset is bound to one asset or a basket of assets 4170. A user can sign a transaction to automate the user's wallets within an ABT to create a smart wallet 4180. These users (entities) can be contractors, buyers, sellers, governments, banks, and unlimited types of users (entities) 4182. They can rent out (loan) this ABT or sell it 4184 of one embodiment. Descriptions continue in FIG. 42.

Figure 42:
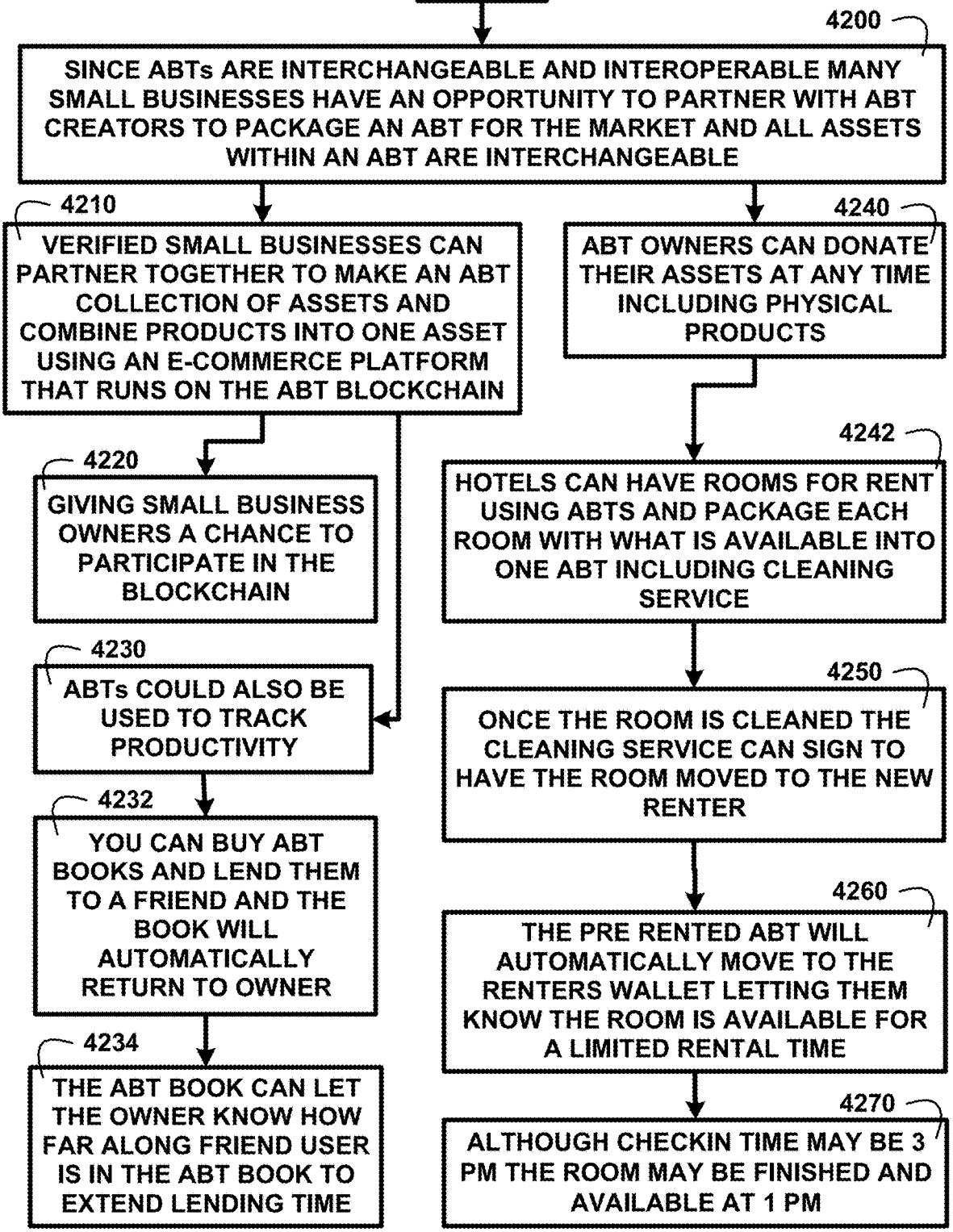
FIG. 42 shows a block diagram of an overview of ABT creators of one embodiment.

FIG. 42 shows a block diagram of an overview of ABT creators of one embodiment. FIG. 42 shows a continuation from FIG. 41. Since ABTs are interchangeable and interoperable many small businesses have an opportunity to partner with ABT creators to package an ABT for the market and all assets within an ABT are interchangeable 4200. Verified small businesses can partner together to make an ABT collection of assets and combine products into one asset using an e-commerce platform that runs on the ABT blockchain 4210. Giving small business owners a chance to participate in the blockchain 4220.

ABTs could also be used to track productivity 4230. You can buy ABT books and lend them to a friend and the book will automatically be returned to the owner 4232. The ABT book can let the owner know how far along a friend user is in the ABT book to extend lending time 4234. ABT owners can donate their assets at any time including physical products 4240.

Hotels can have rooms for rent using ABTs and package each room with what is available into one ABT including cleaning service 4242. Once the room is cleaned the cleaning service can sign to have the room moved to the new renter 4250. The pre-rented ABT will automatically move to the renter's wallet letting them know the room is available for a limited rental time 4260. Although check-in time may be 3 PM the room may be finished and available at 1 μm 4270 of one embodiment.

Figure 43:
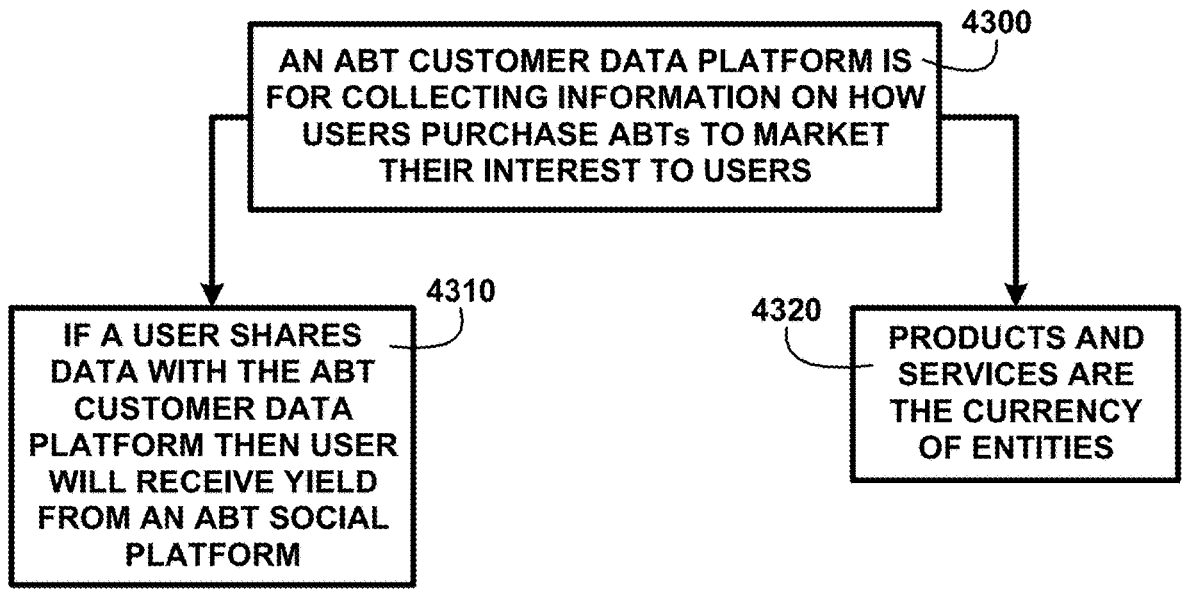
FIG. 43 shows a block diagram of an overview of an ABT customer data platform of one embodiment.

FIG. 43 shows a block diagram of an overview of an ABT customer data platform of one embodiment. FIG. 43 shows an ABT customer data platform for collecting information on how users purchase ABTs to market their interest to users 4300. If a user shares data with the ABT customer data platform, then user can receive yield from an ABT social platform 4310. Attention, products, and services are the currency of entities 4320 of one embodiment.

Figure 44:
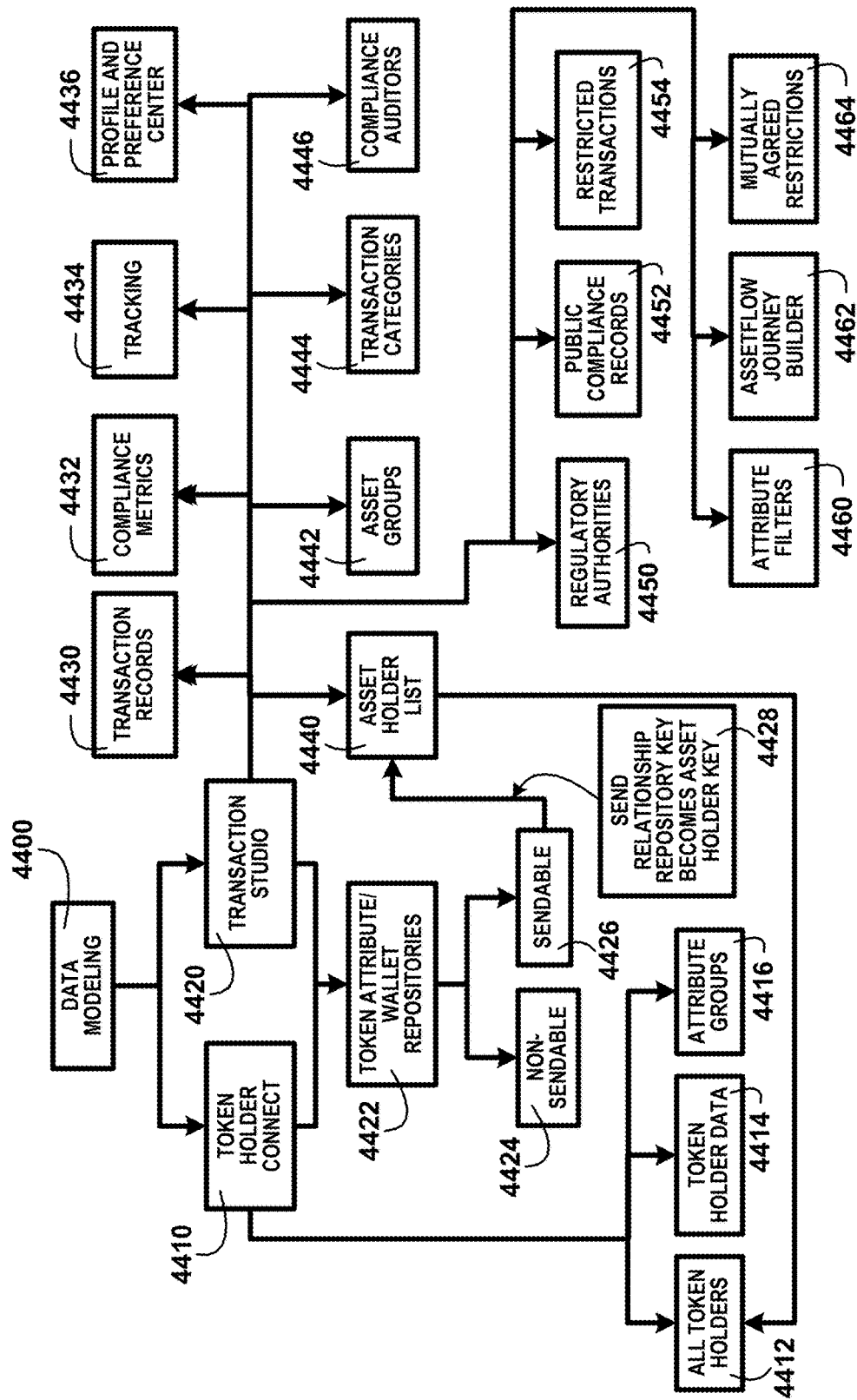
FIG. 44 shows a block diagram of an overview of data modeling of one embodiment.

FIG. 44 shows a block diagram of an overview of data modeling of one embodiment. FIG. 44 shows the database system employs a well-structured data model, comprising of four fundamental components that collectively manage and interlink data seamlessly. Token holder records form an integral part of the data model. Each token holder record is uniquely identified by a token holder connect key and/or token holder connect ID. These identifiers play a crucial role in the precise identification and management of individual token holders within the system.

The database system includes data modeling 4400 that provides a token holder connect 4410 to all token holders 4412. The data modeling 4400 stores token holder data 4414. The database system efficiently manages digital tokens known as Asset Bound Tokens (ABTs). These tokens represent a wide array of assets, including securities, derivatives, commodities, and other fungible and non-fungible instruments. The data modeling 4400 records attribute groups 4416 of the ABTs in a transaction studio 4420.

The information is recorded in token attribute/wallet repositories 4422 that include non-sendable 4424 and sendable 4426 information and data. Linkage Between Repositories allows in specific scenarios where a sendable repository communicates with an asset holder, the Repository Key can also function as an Asset Holder Key. Consequently, the Asset Holder Key becomes equivalent to the Token Holder Connect ID. This linkage ensures that the asset holder's information is appropriately connected to the token data, enabling smooth and secure transaction processing. The asset holder controls a login for the database system 100 of FIG. 1 to send relationship repository key which then become an asset holder key 4428 allowing the asset holder to track and monitor transaction records 4430, compliance metrics 4432, and observe tracking 4434 of the transactions.

A profile and preference center 4436 stores an asset holder list 4440 and asset groups 4442. Transaction categories 4444 include automated compliance auditors 4446. The automated compliance auditors 4446 check public compliance records 4452 for any restricted transactions 4454 not in compliance with regulatory authorities 4450 mutually agreed restrictions 4464.

Restricted Transactions pertain to transactions that are subject to specific limitations or restrictions imposed by regulatory authorities or compliance auditors. These restrictions enhance transparency by clearly defining the constraints and obligations associated with a transaction. All parties are aware of and consent to the limitations, reducing the risk of disputes or misunderstandings. Transaction attribute filters 4460 in an assetflow journey builder 4462 identify any detected restricted transactions 4454 of one embodiment.

Figure 45:
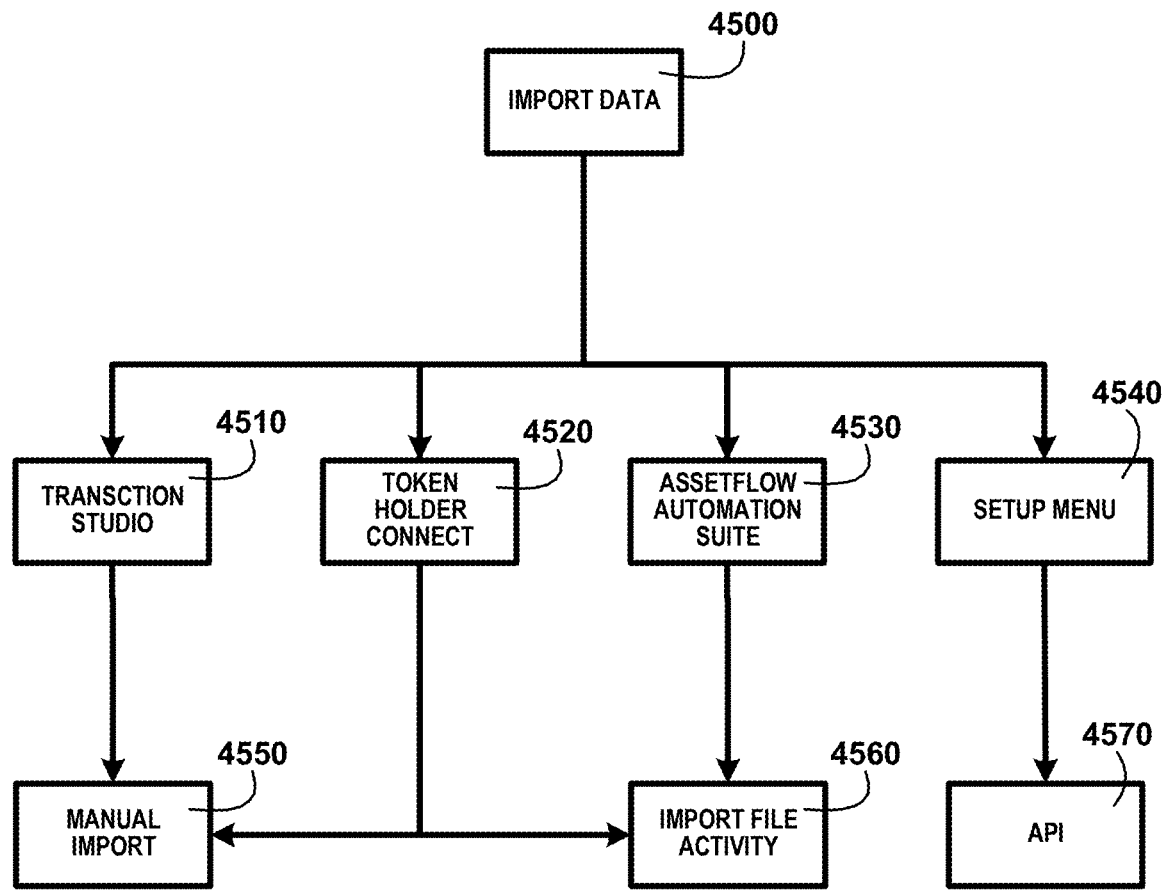
FIG. 45 shows a block diagram of an overview of the transaction studio of one embodiment.

FIG. 45 shows a block diagram of an overview of the transaction studio of one embodiment. FIG. 45 shows import data 4500 for storing in a transaction studio 4510 to create a token holder connect 4520. An assetflow automation suite 4530 includes a setup menu 4540, manual import 4550, import file activity 4560, and API 4570. The application programming interface (API) is used to connect multiple computers to communicate data between them. The assetflow automation suite 4530 is configured to cater to the specific requirements of large entities engaged in the utility of asset bound tokens (ABTs) and the management of digital assets and financial instruments. The assetflow automation suite 4530 provides a comprehensive set of automation tools:

1. Scheduled Workflows: Configure scheduled workflows to automate routine tasks, for example, data imports, token issuance, or compliance checks. Ensure precise data management and timely operations by scheduling workflows at predefined intervals.
2. File Integration Automations: Deploy File Integration Automations to seamlessly receive and process external data files. This feature streamlines data imports when a file is dropped, making it efficient, even when dealing with substantial transaction volumes or asset updates.
3. Event Driven Automations: Set up Event Driven Automations to respond swiftly to specific occurrences within the database. For instance, when a user initiates a token transfer or requests compliance verification, Event Driven Automations executes the necessary actions automatically.
4. SQL Data Query: Harness SQL Data Query such as action query, a select query, or a combination of both to retrieve and segment data within the database. This functionality is particularly valuable for creating targeted asset or user groups based on attributes, for example, asset ownership, compliance status, or transaction history.
5. Data Integration Automations: Automate the importing process of Asset Groups or Repositories with external files using the Data Integration Automations. This feature facilitates the efficient management of user data and asset information, ensuring the database remains current.
6. Custom Workflow: Create customized Workflows to execute intricate operations within the database. These tailored workflows align with specific business rules and requirements, providing flexibility and precision.
7. Data Filtering: Implement Data Filtering to refine and segment data based on predefined criteria. This capability proves beneficial when you need to isolate specific attributes or assets for targeted actions.
8. Data Extraction: Automate data extraction from the database using Data Extraction. This functionality generates reports, compliance documentation, or data backups, ensuring crucial information is readily accessible.
9. Workflow Orchestration: Strategically introduce delays in the automated processes with Workflow Orchestration. For example, you can include wait periods for compliance verifications or synchronize asset updates.
10. Workflow Control: Retain complete control over running workflows by pausing, skipping, or stopping them as needed with Workflow Control. This flexibility enables efficient operations and real-time adjustments.
11. Workflow Duplication and Management: Empower administrators to duplicate and customize workflows to address various scenarios effectively. Additionally, provide the option to manage and remove workflows that are no longer relevant, ensuring a streamlined interface.
12. Workflow Monitoring and Performance: Implement tools to monitor workflow history and performance. Track successful runs, error tracking, and performance metrics, enabling continuous optimization of the automated processes.
13. Transaction Management: Assetflow Automation Suite incorporates Transaction Management features from the Transaction Studio to automate various financial processes. For example, automated routines can be configured to initiate buy or sell transactions based on predefined criteria, such as specific asset performance metrics or market conditions. This streamlines asset management processes and reduces manual intervention.
14. Transaction Approval Workflow: The Assetflow Automation Suite integrates seamlessly with the Transaction Approval within the Transaction Studio. Automated routines can be designed to follow approval processes when necessary. If a transaction meets specific criteria that require approval, the automation triggers the workflow, and Administrators can review and approve transactions through the suite.
15. Transaction Notifications: Assetflow Automation Suite provides notification capabilities to alert users about automated transaction activities. When an automated transaction is executed or requires attention, notifications are sent to designated users, ensuring they are informed and can take appropriate actions.
16. Reports: Empowers users to track and analyze the performance of their marketing campaigns and customer journeys. The suite offers robust reporting capabilities that provide valuable insights into customer behavior, campaign effectiveness, and journey outcomes, including transactions and transfers of ABTs and other digital assets.

Figure 46:
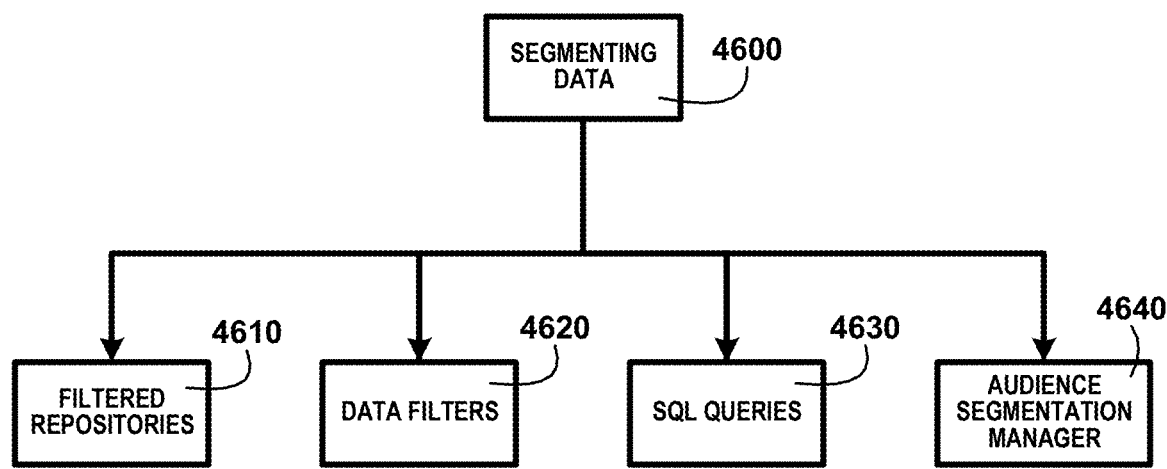
FIG. 46 shows a block diagram of an overview of segmenting data of one embodiment.

FIG. 46 shows a block diagram of an overview of segmenting data of one embodiment. FIG. 46 shows segmenting data 4600 using filtered repositories 4610, data filters 4620, and SQL queries 4630 using an audience segmentation manager 4640. The database for asset bound tokens system is not only to manage ABTs comprehensively but also serves as a powerful platform for processing and facilitating a wide range of transactions involving these digital tokens. It incorporates precise identification, efficient data management, and secure linkage mechanisms to ensure the smooth operation of the financial ecosystem it supports.

The Wallet Repositories are categorized into different types, such as Standard, Filtered, or Random, depending on their intended usage. These Wallet Repositories can be designated as Sendable or Non-Sendable. Standard Wallet Repositories are used for typical wallet management and storage of Wallet related data. They serve as the default storage for wallet information and are suitable for most use cases. Filtered Wallet Repositories are used to create subsets or segments of wallet data from existing repositories. They allow the administrator to define specific criteria or filters to select a subset of wallet records. This type is useful when the administrator needs to work with a specific group of wallets within the system. Random Wallet Repositories enable the administrator to randomly select wallets from a source repository. This can be beneficial when the administrator needs to perform random sampling or select wallets for specific purposes.

The Token Attribute Repositories (TARs) are pivotal components of the system, facilitating granular compliance enforcement and transaction tracking. TARs enable one-to-one, one-to-many, and many-to-many relationships between ABTs and underlying assets. They store attribute-based transaction histories, allowing for a comprehensive view of compliance adherence. The database system also provides robust data integration capabilities, enabling data import and export via secure SFTP connections. Data can be encrypted or decrypted as needed to protect sensitive information, particularly wallet keys and transaction records. For optimal performance and scalability, the system adheres to data management guidelines. These guidelines recommend limiting the number of fields and characters within Wallet Repositories to ensure efficient data storage and retrieval. This design approach ensures that the system can accommodate a high volume of ABTs, supporting the needs of corporations, governments, holding companies, and other entities. In this case they will be known as administrators. Furthermore, the system is designed to facilitate user hierarchies, enabling companies and governments to gain insights into how customers utilize their assets.

Figure 47:
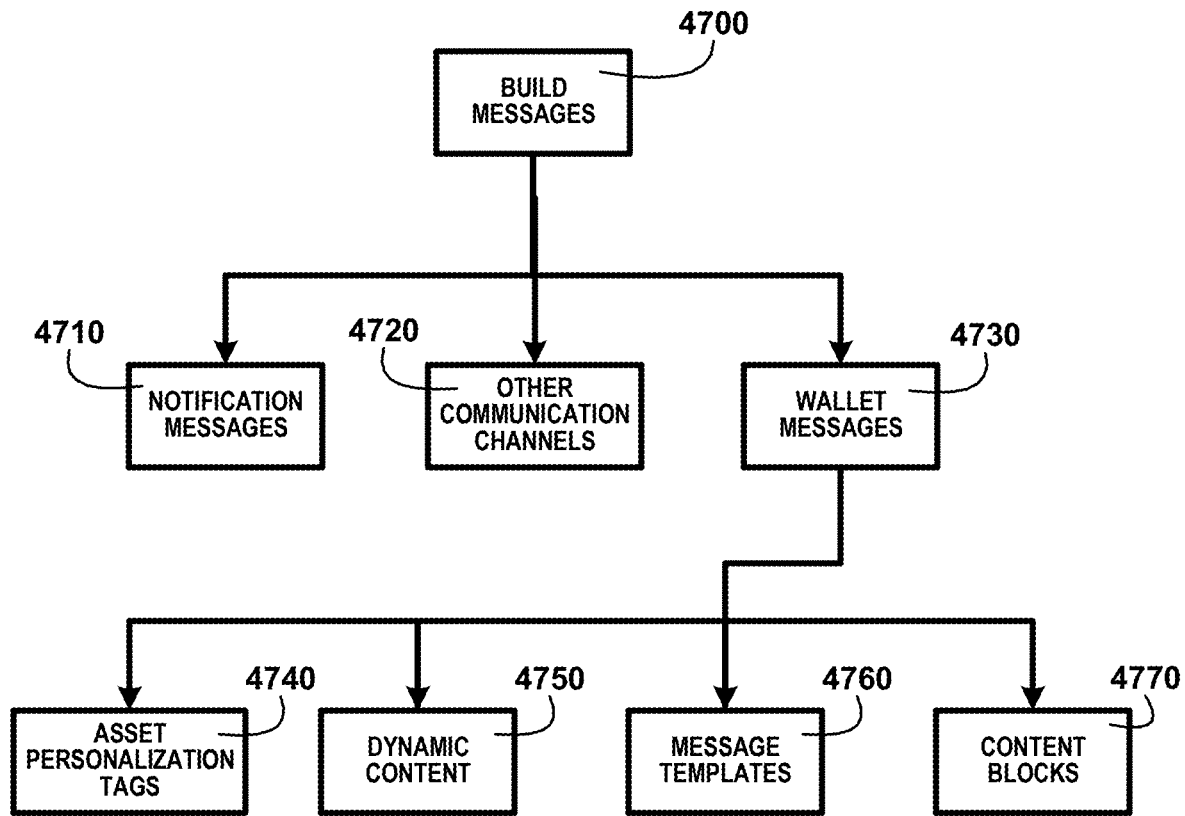
FIG. 47 shows a block diagram of an overview of wallet messages of one embodiment.

FIG. 47 shows a block diagram of an overview of wallet messages of one embodiment. FIG. 47 shows a build messages 4700 feature of the database system server 100 of FIG. 1. The build messages 4700 feature creates notification messages 4710 sent to wallet owners directly and through other communication channels 4720. The build messages 4700 features includes wallet messages 4730, asset personalization tags 4740, dynamic content 4750, use of message templates 4760, and content blocks 4770 of one embodiment.

Message building creates messages for communication with wallets in the database involving various elements, including Asset Personalization Tag, Dynamic Content, Message Templates, Content Blocks, and AssetScript (scripting capabilities). These features are further described as follows:

1. Asset Personalization Tags: asset personalization tags are personalized strings that allow you to insert dynamic information into the messages. These tags function as placeholders that get replaced with specific wallet-related data when the message is sent. For example, you can use an Asset Personalization Tag like %WalletBalance%% to personalize messages with the recipient's current wallet balance.
2. Dynamic Content: Dynamic Content are dynamic content elements that enable you to create message variations that are automatically selected based on specific conditions or recipient attributes. For instance, you can use Dynamic Content to display different content to wallet holders based on their asset type, transaction history, or compliance status.
3. Message Templates: Message Templates are pre-designed message layouts tailored for wallet-related communication. These templates provide a consistent and visually appealing format for the messages. A user can choose from a library of Message Templates or create custom ones to suit various communication needs, such as transaction notifications, compliance updates, or asset statements.
4. Content Blocks: Content Blocks are modular components that you can use to assemble the messages. These blocks can contain text, images, links, and other content elements. When building a message, a user can arrange Content Blocks to create a message structure that conveys information effectively to wallet holders.

Testing content within this database, particularly for communication purposes, involves ensuring that messages sent to wallet holders are accurate, compliant with regulations, and successfully connect to the intended wallet addresses. Testing content operates as follows:

1. Token Holder Preview: Before sending any messages to wallet holders, administrators have the option to utilize a "Token Holder Preview" feature within the database. Token Holder Preview allows administrators to review how the message content will appear to wallet holders before it is sent. This ensures that the message is formatted correctly, and any personalized information, such as token balances or transaction details, is accurate. Administrators can select specific wallet holders or groups to preview the message and verify that the content is tailored appropriately to the recipients.
2. Message Compliance (CAN-SPAM and GDPR Regulations): Compliance checks within the database now encompass both CAN-SPAM and GDPR regulations. Before sending any messages to wallet holders, administrators can run compliance checks on their message content to ensure it adheres to these regulations. The database verifies that messages include essential elements for both regulations, such as an opt-out mechanism, a valid physical address, accurate sender identification, and explicit consent for data processing when applicable. Administrators receive guidance and recommendations to maintain compliance with both CAN-SPAM and GDPR when creating message content.
3. Connects to Wallet Address: To evaluate whether a message successfully connects to the intended wallet address, administrators can use a "Connectivity Test" feature. This feature allows administrators to simulate the message delivery process. Administrators can select specific wallet addresses or groups and send test messages. The database monitors the delivery process and provides real-time feedback on whether the message was successfully delivered to the wallet address or if any issues occurred.
4. Message Personalization and Dynamic Content: Testing content also involves verifying that dynamic content and personalization are functioning correctly within the messages. Administrators can use placeholders and dynamic content tags in their message templates. During testing, the database ensures that these placeholders are replaced with the accurate and up-to-date information for each wallet holder. Administrators can preview how dynamic content will appear for specific wallet holders to confirm that personalization is working as intended.
5. Testing Variations: Administrators have the flexibility to evaluate different variations of message content. For instance, they can create A/B tests to assess which message content or format performs better in terms of engagement or compliance. The database tracks the performance of these variations and provides insights into which content resonates most with wallet holders.
6. Delivery and Read Receipts: As part of the testing process, the database tracks delivery and read receipts. Administrators can monitor whether wallet holders have received and opened the messages. This information is valuable for assessing the effectiveness of communication and making necessary adjustments to message content. Testing content within this database for communication involves a multi-faceted approach.

Administrators can preview message content, ensure compliance with regulations like CAN-SPAM, verify successful delivery to wallet addresses, test dynamic content and personalization, and assess message variations. By conducting comprehensive testing, administrators can optimize their communication strategies, maintain compliance, and deliver accurate and engaging messages to wallet holders.

Sendable vs. Non-Sendable Wallet Repositories: The designation of a Wallet Repository as Sendable or Non-Sendable pertains to its relationship with communication channels and the ability to send messages or notifications to the wallet owners. Each designation means the following: Sendable Wallet Repositories: Sendable Wallet Repositories are those that have a send relationship with communication channels.

In the context of this system, this means that wallet owners associated with sendable wallet repositories can receive messages or notifications through various communication channels, such as email, SMS, or other methods. These repositories are typically used for engaging with wallet owners and facilitating communication.

Non-Sendable Wallet Repositories: Non-Sendable Wallet Repositories, on the other hand, do not have a direct send relationship with communication channels. Non-Sendable Wallet Repositories are used for reference and data storage purposes but are not intended for sending messages or notifications to wallet owners. Non-Sendable Wallet Repositories may contain important wallet-related information, but they are not actively used for communication.

The categorization of Wallet Repositories into standard, filtered, or random types allows the administrator to organize and manage wallet data efficiently based on different use cases and requirements. Additionally, the designation as Sendable or Non-Sendable determines whether the wallet data in a particular repository can be used for communication purposes or if it is strictly for data reference and storage. This flexibility ensures that the system can adapt to a wide range of scenarios and administrator needs while maintaining clarity in data management.

1. Sendable Wallet Repositories: Using Sendable Wallet Repositories for communication with wallet owners is a practical way to facilitate two-way communication. This allows the administrator to send transaction notifications, important updates, or other relevant information directly to wallet users. It is important to ensure that communication through Sendable Wallet Repositories is secure and complies with privacy regulations, as cryptocurrency-related communications involve sensitive data.
2. Non-Sendable Wallet Repositories: Designating certain Wallet Repositories as Non-Sendable for storing data not intended for direct communication but essential for wallet management and analytics is a good practice. This clear separation between data used for communication and internal data can help maintain data integrity and streamline the database.
3. Data Retention: Implementing data retention policies within Wallet Repositories is crucial, especially for regulatory compliance. Ensuring that transaction history and related data are retained for a predetermined period while adhering to data protection regulations is essential. This ensures that the administrator maintains a compliant and well-managed database.
4. Data Storage and Scalability: Storing data in an external SFTP storehouse and only calling data into the database when needed for analytics is a sound approach for scalability. It minimizes the storage burden on the primary database and allows the administrator to manage large volumes of data efficiently. This balances the need for communication, data management, and scalability. To ensure a robust and scalable system.

Figure 48:
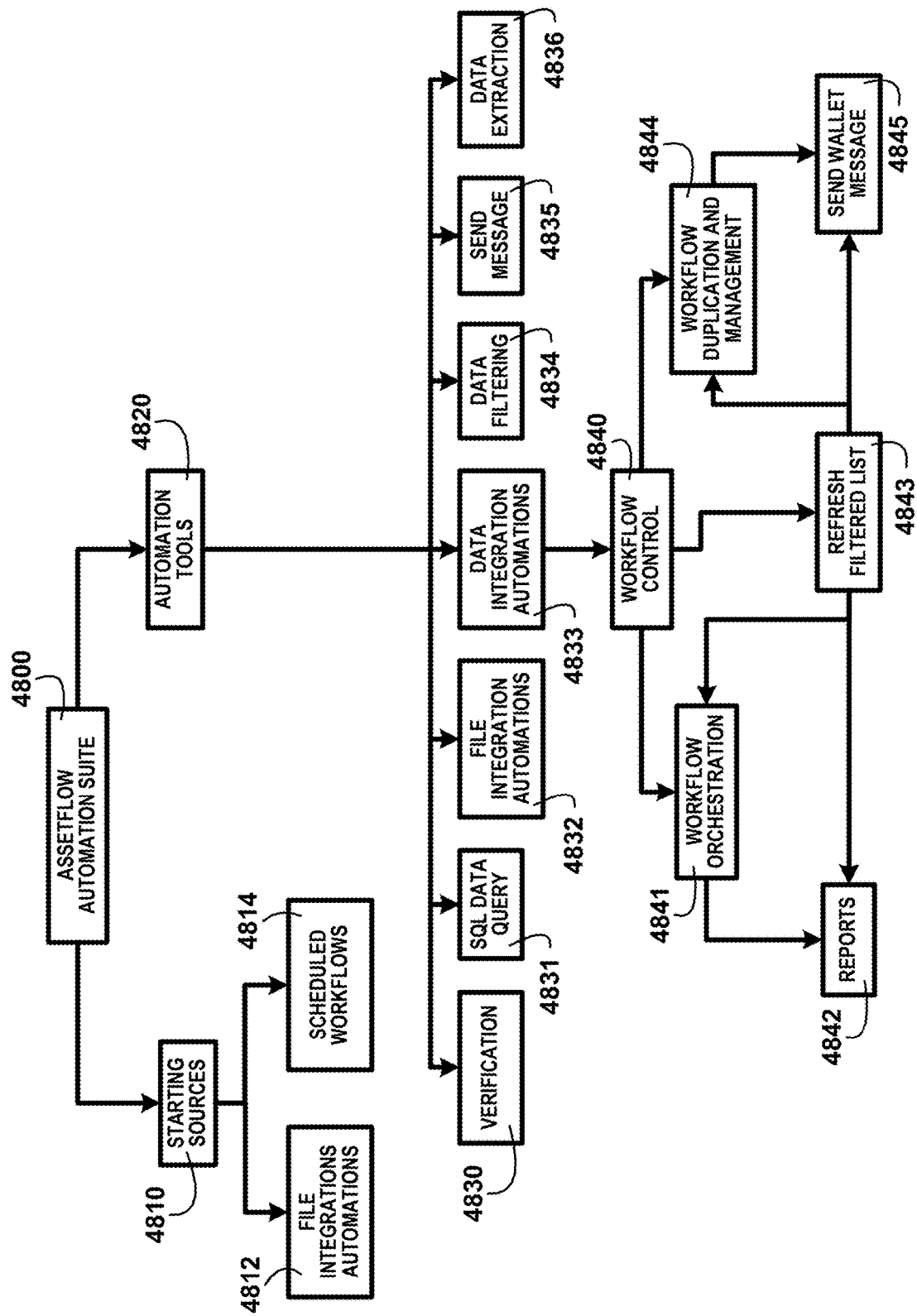
FIG. 48 shows a block diagram of an overview of file integrations automations of one embodiment.

FIG. 48 shows a block diagram of an overview of file integrations automations of one embodiment. FIG. 48 shows an assetflow automation suite 4800 including starting sources 4810 for the file integrations automations 4812. File integrations automations 4812 include scheduled workflows 4814, automation tools 4820, verification 4830, and SQL data query 4831. File integration automations 4832 also include data integration automations 4833, data filtering 4834, send message 4835, and data extraction 4836. File integrations automations 4812 uses include workflow control 4840, workflow orchestration 4841, reports 4842, refresh filtered list 4843, workflow duplication and management 4844, and send wallet message 4845 of one embodiment.

Figure 49:
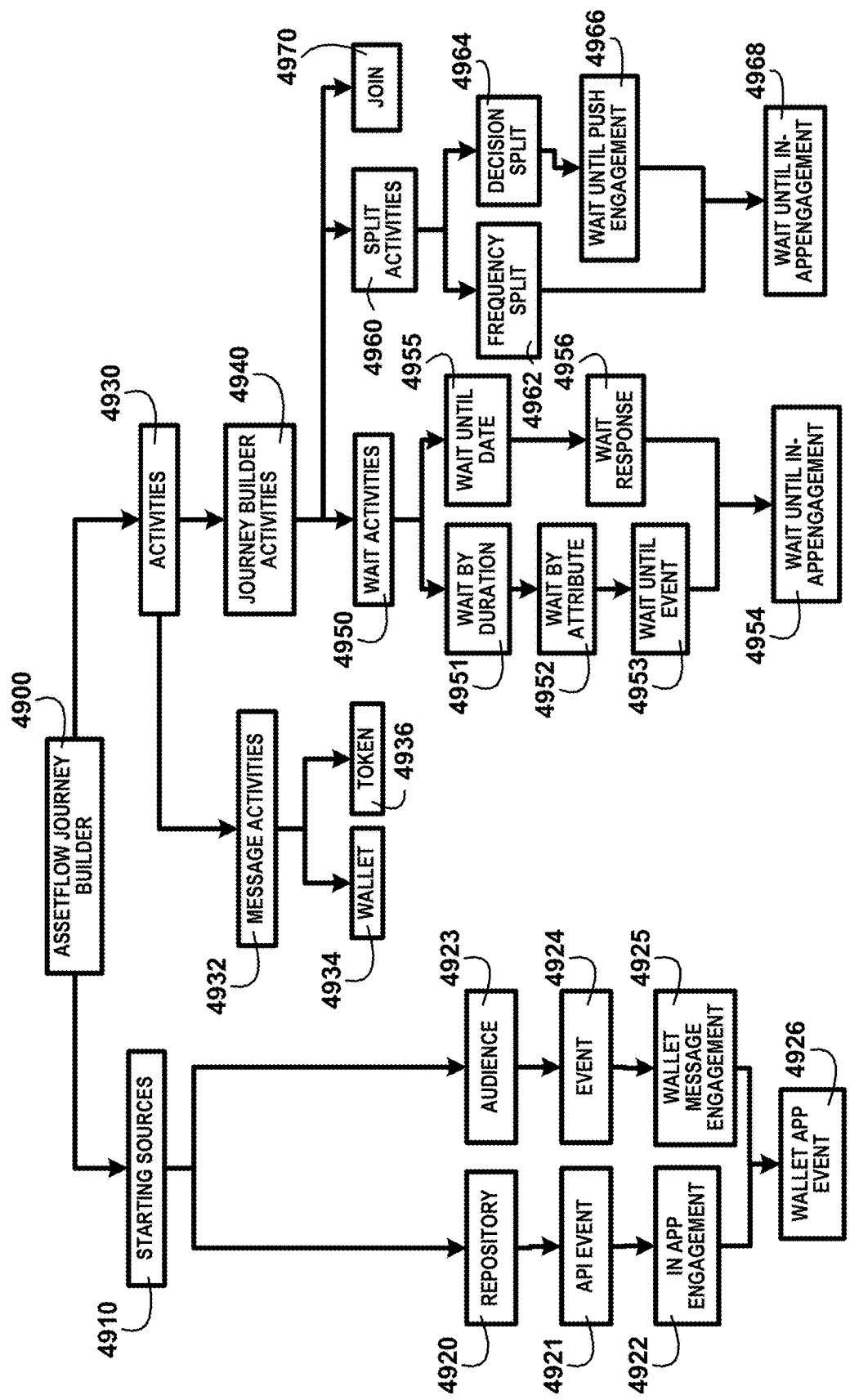
FIG. 49 shows a block diagram of an overview of asset flow journey builder of one embodiment.

FIG. 49 shows a block diagram of an overview of assetflow journey builder of one embodiment. FIG. 49 shows an assetflow journey builder 4900 that shows starting sources 4910 for the repository 4920. An API event 4921 and in app engagement 4922 are displayed for an audience 4923 for a particular event 4924. A wallet message engagement 4925 is shown for a wallet app event 4926. Activities 4930 are notified with message activities 4932 involving a wallet 4934 and a token 4936.

Journey builder activities 4940 include wait activities 4950, wait by duration 4951, wait by attribute 4952, wait until event 4953, wait until in-appengagement 4954, wait until date 4955, and wait response 4956. Activities may include split activities 4960, frequency split 4962, decision split 4964, wait until push engagement 4966, and wait until in-appengagement 4968. The wallet holder may elect to join 4970 the activities of one embodiment.

AssetFlow Journey Builder in this database system revolutionizes how large corporations manage and transact Asset Bound Tokens (ABTs) and other financial instruments while overseeing digital wallets. AssetFlow Journey Builder is a robust tool set designed to meet the unique needs of financial institutions, empowering them to create highly customizable journeys.

The 0 includes the following: 1. Customized Journey Templates: Create highly personalized journey templates specifically designed for financial scenarios. These templates encompass "ABT Issuance Journey", "Asset Portfolio Management Journey," and "Investor Onboarding Journey," among others. These templates streamline complex processes, providing a seamless experience for both issuers and investors.

2. Audience Segmentation: Harness the "Create an Audience from Token Holders" feature to segment database users based on intricate criteria, such as asset class, investor type, or geographic region. Precise audience segmentation ensures that communications and actions within journeys are precisely targeted. Audience Segmentation allows marketers and business users to create customer journeys and campaigns. When defining these journeys, they can specify target audiences based on asset categories and attributes defined in Asset Groups. For example, a campaign could target customers holding specific types of digital assets within predefined Asset Groups.
3. Event-Driven Journeys: Use events strategically to trigger journeys based on critical user actions and system events. For instance, when a corporation issues new ABTs or a high-value transaction is executed, AssetFlow Journey Builder initiates journeys, incorporating compliance checks, real-time notifications, and portfolio adjustments.

4. Goal-Oriented Journeys: Define specific objectives for each journey, such as capital raising, asset diversification, or regulatory compliance. These goals provide a clear roadmap for journey success and enable precise measurement of outcomes.
5. Activities for Financial Workflows: Customize journeys with financial-centric activities like "Capital Injection Verification," "Asset Valuation," and "Regulatory Compliance Audit." These activities facilitate intricate financial processes within each journey.
6. Strategic Wait Activities: Implement wait activities strategically within journeys to introduce calculated pauses. For instance, waiting periods for compliance approvals or scheduled asset revaluation ensure that each step is executed with precision.
7. Intelligent Decision Splits and Joins: Employ decision splits and join activities to dynamically route users based on their financial profile, risk appetite, or investment strategy. Personalization is at the core of Asset-Flow Journey Builder, ensuring that each investor receives a tailored experience.
8. Data-Driven Insights: Leverage the power of Journey Analytics and the Versions Dashboard to gain insights into journey performance. Metrics like capital raised, risk exposure, and investor satisfaction are meticulously tracked, allowing for data-driven optimization.
9. Validation for Reliability: Prior to launching a journey, utilize the validation feature to ensure all components, activities, and event-driven function as intended. This meticulous validation process guarantees a seamless and error-free administrator experience.
10. Organized Journey Repository: As the financial database grows, maintain a well-organized journey repository. Categorize journeys into sections such as "Capital Raising Journeys" and "Asset Management Journeys" to simplify administrator navigation.
11. Efficient Duplication and Deletion: AssetFlow Journey Builder facilitates the duplication and deletion of journeys. Corporations can effortlessly create customized variations of existing journeys while keeping their journey library clutter-free.
12. Portfolio Management Integration: Assetflow Journey Builder integrates with the portfolio management capabilities of the Transaction Studio. Marketers can create customer segments within Journey Builder based on portfolio performance metrics. This allows for highly targeted marketing efforts, such as offering promotions to customers with portfolios showing specific investment patterns.

AssetFlow Journey Builder empowers financial institutions, governments, and corporations to create dynamic, user-centric journeys, whether they are focused on managing ABTs, transacting financial instruments, or ensuring regulatory compliance. This toolset is designed to the specific needs of large entities, you can streamline complex financial processes, enhance user engagement, and drive success in the world of digital finance of one embodiment.

Figure 50:
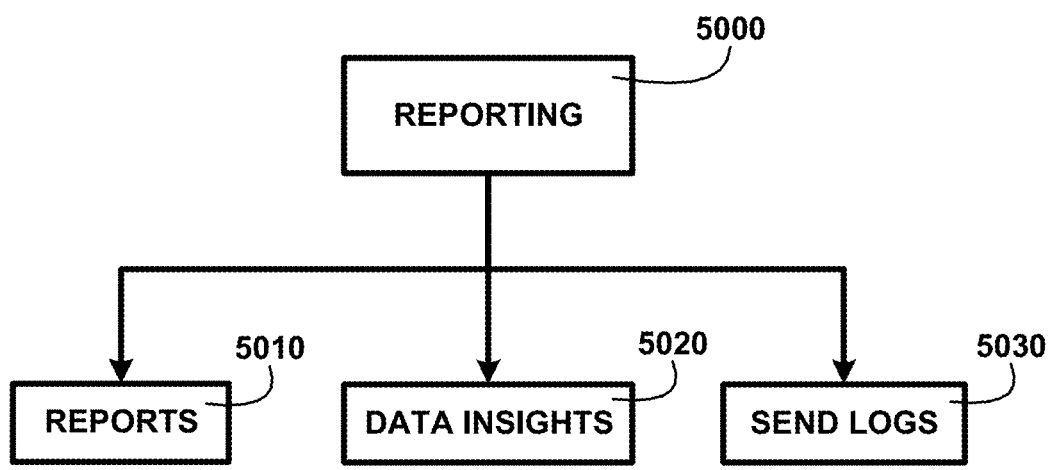
FIG. 50 shows a block diagram of an overview of data insights of one embodiment.

FIG. 50 shows a block diagram of an overview of data insights of one embodiment. FIG. 50 shows reporting 5000 that includes reports 5010, data insights 5020, and processes to send logs 5030 to wallet owners. Reporting and analytics tools are available, allowing administrators to generate custom reports and dashboards tailored to their specific requirements. In addition to scalability and performance considerations, the system places a strong emphasis on compliance and auditing. KYC procedures are in place to verify wallet owners, ensuring adherence to regulatory requirements.

This financial system and database architecture introduces a unique approach to managing digital Asset Bound Tokens (ABTs) that represent multiple assets. It provides a comprehensive and secure solution for asset management, transaction tracking, and regulatory compliance in the digital asset space of one embodiment.

The database system is configured to efficiently manage digital tokens known as Asset Bound Tokens (ABTs). These tokens represent a wide array of assets, including securities, derivatives, commodities, and other fungible and non-fungible instruments. The database prioritizes data security, scalability, and regulatory compliance while also serving as a robust platform for processing and facilitating transactions. The database system employs a well-structured data model, comprising four fundamental components that collectively manage and interlink data seamlessly.

The four fundamental components include:
1. Token Holder Records,
2. Wallet Repositories,
3. Token Attribute Repositories, and
4. Asset Management Modules.

Token Holder Records: Token Holder Records form an integral part of the data model. Each Token Holder Record is uniquely identified by a Token Holder Connect Key and/or Token Holder Connect ID. These identifiers play a crucial role in the precise identification and management of individual token holders within the system.

Wallet Repositories: Wallet Repositories utilize a distinct identification method, known as the Wallet Repository Key and/or Wallet ID. These identifiers are essential for accurate tracking and efficient management of wallet-related data, including transactions and holdings.

Token Attribute Repositories: Token Attribute Repositories are designed to organize and access attributes associated with tokens. They are identified using a unique Token Attribute Repository Key and/or Token Attribute Repository ID, enabling structured management of token-related data.

Asset Management Modules: The database includes Asset Management Modules, which are responsible for efficiently managing various assets represented by ABTs. These modules interact seamlessly with the other components to facilitate transactions and asset-related activities.

In certain defined scenarios involving inter-repository communication, the linkage between repositories permits a sendable repository to interface with an asset holder such that the Repository Key may also function as the Asset Holder Key. Consequently, the Asset Holder Key becomes equivalent to the Token Holder Connect ID. This linkage ensures that the asset holder's information is appropriately connected to the token data, enabling smooth and secure transaction processing.

The data structure establishes a systematically organized and highly interconnected framework for efficient data management within the database. Each component maintains its unique identifiers, ensuring precise identification and efficient data management. Furthermore, this architecture allows for seamless linking between asset holders and tokens, facilitating secure and transparent transaction processing within the database. The database system is not only configured to manage ABTs comprehensively but also serves as a powerful platform for processing and facilitating a wide range of transactions involving these digital tokens. It incorporates precise identification, efficient data management, and secure linkage mechanisms to ensure the smooth operation of the financial ecosystem it supports.

The Wallet Repositories are categorized into different types, such as Standard, Filtered, or Random, depending on their intended usage. These Wallet Repositories can be designated as Sendable or Non-Sendable.

The Token Attribute Repositories (TARs) are pivotal components of the system, facilitating granular compliance enforcement and transaction tracking. TARs enable one-to-one, one-to-many, and many-to-many relationships between ABTs and underlying assets. They store attribute-based transaction histories, allowing for a comprehensive view of compliance adherence.

The system also provides robust data integration capabilities, enabling data import and export via secure SFTP connections. Data can be encrypted or decrypted as needed to protect sensitive information, particularly wallet keys and transaction records. For optimal performance and scalability, the system adheres to data management guidelines. These guidelines recommend limiting the number of fields and characters within Wallet Repositories to ensure efficient data storage and retrieval. This configuration ensures that the system can accommodate a high volume of ABTs, supporting the needs of corporations, governments, holding companies, and other entities. In this case they will be known as administrators.

Furthermore, the system is designed to facilitate user hierarchies, enabling companies and governments to gain insights into how customers utilize their assets. The database system and method for ABT token management and transaction tracking has a:

1. Data Structure: The database system is constructed upon a resilient data framework, harnessing the strengths of both centralized and decentralized blockchain or ledger technologies. This architecture cultivates confidence and openness in the management of tokens. It harnesses the potential of distributed ledger technology to: register, authenticate, and safely preserve transactions across a network of interconnected nodes, guaranteeing the integrity and dependability of data.
2. Cardinal Relationship Model: At its core, the system implements a sophisticated cardinal relationship model that intricately defines connections between individual tokens and their associated securities, commodities, or derivatives. This model accommodates both fungible and non-fungible assets. The database system supports one-to-one, one-to-many, and many-to-many relationships, offering a versatile framework for tokenization strategies, including fractional ownership. This flexibility empowers administrators to tailor their tokenization approach to specific needs and requirements.
3. Tokenization of Securities: The database system excels in the tokenization of real-world securities, encompassing a wide range of financial instruments such as stocks, bonds, ETFs, and various derivatives. This process establishes a direct, legally backed link between tokens and the underlying securities. Each token issued within the system represents a precise, legally recognized claim on the corresponding security, ensuring full transparency, compliance with regulatory standards, and the protection of investors' rights.
4. Attribute Groups and Token Holder Structures: Within the system, tokens are intelligently categorized into attribute groups, each of which comes with a customizable set of attributes. These attribute groups provide fine-grained control over essential token properties. Administrators can define attributes governing: ownership, transferability, dividend distribution, and more, tailoring tokens to specific use cases while maintaining regulatory compliance and operational efficiency.
5. Transaction Tracking Mechanism: An innovative and robust transaction tracking mechanism is a cornerstone of the system's capabilities. It records, verifies, and securely stores every token transaction on the blockchain or ledger. This mechanism empowers administrators with detailed auditing and reporting functionalities, enabling comprehensive oversight of token movements, changes in ownership, and adherence to regulatory requirements. It ensures accountability, security, and transparency throughout the transaction lifecycle.

This database system represents a solution for ABT token management and transaction tracking, providing administrators with a reliable, transparent, and highly customizable platform for managing tokens and their associated financial instruments. Wallet data is imported into the system, maintaining a clear separation between the database and external wallet services.

1. Wallet Repository Types: Wallet Repositories are designed to store and manage information related to wallets, which represent the ownership of digital assets, including Asset Bound Tokens (ABTs). These repositories can be categorized into different types based on their intended usage. Explanations of each type follow:

Standard wallet repositories are used for typical wallet management and storage of wallet related data. They serve as the default storage for wallet information and are suitable for most use cases. Filtered Wallet Repositories: Filtered Wallet Repositories are used to create subsets or segments of wallet data from existing repositories.

They allow the administrator to define specific criteria or filters to select a subset of wallet records. This type is useful when the administrator needs to work with a specific group of wallets within the system. Random Wallet Repositories enable the administrator to randomly select wallets from a source repository. This can be beneficial when the administrator needs to perform random sampling or select wallets for specific purposes.

2. Sendable vs. Non-Sendable Wallet Repositories: The designation of a Wallet Repository as Sendable or Non-Sendable pertains to its relationship with communication channels and the ability to send messages or notifications to the wallet owners. Each designation means the following: Sendable Wallet Repositories are those that have a send relationship with communication channels. In the context of this system, this means that wallet owners associated with sendable wallet repositories can receive messages or notifications through various communication channels, such as email, SMS, or other methods. These repositories are typically used for engaging with wallet owners and facilitating communication.

Non-Sendable Wallet Repositories, on the other hand, do not have a direct send relationship with communication channels. Database for Asset Bound Tokens are used for reference and data storage purposes but are not intended for sending messages or notifications to wallet owners. Non-Sendable Wallet Repositories may contain important wallet-related information, but they are not actively used for communication. The categorization of Wallet Repositories into standard, filtered, or random types allows the administrator to organize and manage wallet data efficiently based on different use cases and requirements. Additionally, the designation as Sendable or Non-Sendable determines whether the wallet data in a particular repository can be used for communication purposes or if it is strictly for data reference and storage. This flexibility ensures that the system can adapt to a wide range of scenarios and administrator needs while maintaining clarity in data management.

1. Sendable Wallet Repositories: Using Sendable Wallet Repositories for communication with wallet owners is a practical way to facilitate two-way communication. This allows the administrator to send transaction notifications, important updates, or other relevant information directly to wallet users. It is important to ensure that communication through Sendable Wallet Repositories is secure and complies with privacy regulations, as cryptocurrency-related communications involve sensitive data.
2. Non-Sendable Wallet Repositories: Designating certain Wallet Repositories as Non-Sendable for storing data not intended for direct communication but essential for wallet management and analytics is a good practice. This clear separation between data used for communication and internal data can help maintain data integrity and streamline the database.
3. Data Retention: Implementing data retention policies within Wallet Repositories is crucial, especially for regulatory compliance. Ensuring that transaction history and related data are retained for a predetermined period while adhering to data protection regulations is essential. This ensures that the administrator maintains a compliant and well-managed database.
4. Data Storage and Scalability: Storing data in an external SFTP storehouse and only calling data into the database when needed for analytics is a sound approach for scalability. It minimizes the storage burden on the primary database and allows the administrator to manage large volumes of data efficiently. This balances the need for communication, data management, and scalability, to ensure a robust and scalable system. Storing essential data on the blockchain and using an SFTP or similar external storage for additional analytics and management purposes provide the best of both worlds: the security and immutability of blockchain data, and the flexibility and scalability of external storage.

Blockchain technology is particularly well-suited for maintaining a transparent and tamper-resistant ledger of financial transactions, making it an excellent choice for recording cryptocurrency-related data. External storage allows the administrator to efficiently manage and analyze large volumes of data without overburdening the blockchain network.

Token Holder Connect in this database system is designed for managing token holders and their related attributes. It plays a crucial role in creating a unified view of token holder data by linking together various data sources and organizing them effectively.

The components of Token Holder Connect:
1. All Token Holders: Definition: Represents a comprehensive list of all customers, "All Token Holders" in Token Holder Connect is a unified repository that contains information about every token holder or asset owner within the system. Function: All Token Holders serve as the foundation for this database, providing a complete overview of the token holder base. It is the starting point for building relationships and associating attributes with individual token holders.
2. Token Holder Data: Definition: Token Holder Data, refers to the collection of attributes and information associated with each token holder. These attributes can include names, wallet addresses, transaction histories, and any other data relevant to token holders. Function: Token Holder Data is the heart of Token Holder Connect. It allows an administrator of this database to create a detailed profile for each token holder, enabling the administrator to understand token holder behavior, preferences, and interactions.
3. Attribute Group (Attribute Groups):—Definition: Attribute Groups in Token Holder Connect represent collections of related attributes that can be linked or associated with token holders. These attributes can come from various sources, including Token Attribute Repositories (TARs) and Wallet Repositories. Function: Attribute Groups help organize and categorize attributes logically. For example, the administrator might have an Attribute Group for "Transaction History" that includes attributes related to token transactions. This organization simplifies data management and retrieval for various use cases.
4. Transaction Records and History: Token Holder Connect is tightly integrated with Transaction Studio to provide administrators with a seamless experience. When transactions are initiated through Token Holder Connect, all transaction details, including buy, sell, or transfer actions, are recorded in Transaction Records within the Transaction Studio. Administrators can easily access the complete transaction history for each digital asset directly from Token Holder Connect. Token Holder Connect essentially facilitates the creation of a unified view of token holders. It allows the administrator to link data from different sources, attribute groups, and repositories, making it easier to personalize interactions, analyze user behavior, and ensure compliance with regulatory requirements. This approach enhances the ability to manage and engage token holders effectively.

Cardinal relationships in Token Holder Connect are fundamental to how data is structured and linked within the database system. These relationships define how different data elements, such as token holders, their attributes, and repositories, are interconnected. Cardinal relationships in Token Holder Connect play a crucial role in establishing data associations.

1. One-to-One (1:1) Cardinal Relationship:—Definition: In a one-to-one relationship, each record in one repository is linked to exactly one record in another repository. This means that there is a unique and direct connection between records in the two repositories. Use Cases: One-to-one relationships are useful when you have a specific and unambiguous link between data. For instance, the administrator might establish a one-to-one relationship between a token holder's profile in the "Token Holder Data" repository and their wallet information in the "Wallet Repository."
2. One-to-Many (1:N) Cardinal Relationship: Definition: In a one-to-many relationship, each record in one repository can be linked to multiple records in another repository. This implies that one data element can be associated with several related data elements in another repository. Use Cases: One-to-many relationships are beneficial when there are multiple instances of related data. For example, a token holder may have multiple transactions recorded in the "Transaction Repository." Each transaction can be linked back to the token holder, establishing a one-to-many relationship.
3. Many-to-Many (N:M) Cardinal Relationship: Definition: A many-to-many relationship allows multiple records in one repository to be associated with multiple records in another repository. This type of relationship is more complex and flexible, allowing for versatile data connections. Use Cases: Many-to-many relationships are useful in scenarios where data elements can have numerous cross-connections. For example, consider token holders participating in various investment groups. Each token holder can belong to multiple groups, and each group can have multiple token holders, creating a many-to-many relationship.

How Cardinal Relationships Work: Linking Data of Cardinal relationships are established by defining key fields in the repositories that serve as references. For example, a unique token holder connects an ID in the "Token Holder Data" repository may be used to link to wallet information in the "Wallet Repository" based on the same token holder connect ID. Data Integrity: Cardinal relationships help maintain data integrity. They ensure that data associations are accurate and that related records are properly connected. This is essential for creating a unified and reliable database.

Data Retrieval: Cardinal relationships simplify data retrieval and querying. The administrator can access related data elements easily, enabling the administrator to gather comprehensive information about token holders and their activities. Scalability: Cardinal relationships are adaptable to this database's growth. As more data and repositories are added, an administrator can establish new relationships to accommodate evolving requirements.

Cardinal relationships in Token Holder Connect are a structural framework that allows an administrator to create meaningful connections between various data elements, ensuring that the administrator can effectively manage, analyze, and utilize the database's information. They are the backbone of data organization and accessibility within this system.

Token Attribute Repositories (TARs) can be categorized into different types based on their intended usage. These categories help organize and manage data effectively within the database. Here is an explanation of each type:
1. Standard Token Attribute Repositories: Standard TARs are the primary repositories for storing and managing token related data. They are designed for general token attribute storage and management and serve as the default storage for this type of information. Standard TARs are suitable for most use cases involving tokens.
2. Filtered Token Attribute Repositories: Filtered TARs are used to create subsets or segments of token attribute data from existing repositories. Administrators can define specific criteria or filters to select a subset of token attributes. This type is beneficial when working with specific groups of tokens or when segmenting data for targeted analysis or actions.
3. Random Token Attribute Repositories: Random TARs enable administrators to randomly select token attributes from a source repository. This can be useful for various purposes, such as random sampling, selecting tokens for specific actions, or conducting randomized analyses. The categorization of TARs into standard, filtered, or random types allows for efficient organization and management of token attribute data, catering to different use cases and requirements.

Token Attribute Repositories (TARs) are an essential component of this database system, responsible for storing and managing attributes related to tokens and their associated assets, such as securities, derivatives, commodities, and more. Entities can categorize TARs based on their intended usage and data retention requirements:
1. Sendable TARs: Usage: Sendable TARs are designed to store attributes that are meant for direct communication with users, asset holders, or token holders. These attributes might include information related to token ownership, transaction notifications, or other details that administrators need to know. Data Retention: Sendable TARs typically have shorter data retention periods because they contain information that is relevant for immediate communication and may become outdated quickly. For example, transaction notifications or account balance updates may be stored in Sendable TARs for a limited time. Example: If a user purchases tokens or engages in token transactions, the details of these transactions might be stored in a Sendable TAR for the purpose of sending transaction confirmations or updates.
2. Non-Sendable TARs: Usage: Non-Sendable TARs are used to store attributes that are essential for wallet management, analytics, and compliance but are not meant for direct communication with users. These attributes might include historical transaction data, asset valuations, or audit logs. Data Retention: Non-Sendable TARs can have longer data retention periods because they contain historical and analytical data that can be valuable for compliance reporting, auditing, and long-term analysis. These attributes help in understanding user behavior and the performance of different assets. Example: Storing the complete transaction history of tokens, including details like timestamps, quantities, and counterparties, in a Non-Sendable TAR can be crucial for regulatory compliance and historical analysis.
3. Data Retention Attributes: Usage: Data retention attributes are associated with how long the data in the TAR should be retained. These attributes help with managing data in compliance with regulatory requirements and business needs. They define the shelf life of data in the TAR. Data Retention Policies: Data retention attributes can specify different retention policies for Sendable and Non-Sendable TARs based on the type of data they store. For example, data in Sendable TARs might be retained for 90 days, while data in Non-Sendable TARs might be retained for several years. Example: A data retention attribute in a TAR could specify that transaction data in a Sendable TAR should be retained for 90 days, while transaction history in a Non-Sendable TAR should be retained for 7 years to meet regulatory compliance requirements.

By categorizing TARs into Sendable and Non-Sendable and applying appropriate data retention policies, the administrator can efficiently manage data related to tokens and assets, ensuring that users receive timely communication while maintaining historical data for compliance, analysis, and auditing purposes. Cardinal Relationships in Token Attribute Repositories (TARs):

Cardinal relationships play a crucial role in Token Attribute Repositories (TARs) within the database, where intricate connections between individual tokens and their underlying securities, commodities, derivatives, or other financial instruments are defined.

These relationships enable versatile tokenization strategies, including fractional ownership and the management of both fungible and non-fungible assets.
1. One-to-One (1:1) Cardinal Relationship: Definition: In a one-to-one relationship, each record in one TAR is directly linked to exactly one record in another TAR. This means that there is a unique and precise connection between records in the two repositories, representing a one-to-one correspondence. In a one-to-one relationship, each token is directly linked to one specific security or derivative. This means that a single token represents the entirety of that underlying asset. Use Cases: One-to-one relationships are valuable when there is a specific, singular association between tokens and their corresponding attributes.

For example, a one-to-one relationship can be established between a token and its ownership details in the "Token Holder Data" TAR. Use Cases: A token representing one share of a company's stock has a one-to-one relationship with that stock.

2. One-to-Many (1:N) Cardinal Relationship: Definition: In a one-to-many relationship, each record in one TAR can be linked to multiple records in another TAR. This implies that one token or attribute can be associated with multiple related tokens or attributes in another TAR. One token can be associated with multiple commodities, securities, derivatives, or other assets. Use Cases: One-to-many relationships are beneficial when tokens have multiple attributes or when multiple tokens share common attributes. For instance, a token may have multiple transaction records associated with it, creating a one-to-many relationship between tokens and transactions. Use Cases: For fractionalized ownership, a token may represent partial ownership of several different real estate properties.

3. Many-to-Many (N:M) Cardinal Relationship: Definition: A many-to-many relationship allows multiple records in one TAR to be associated with multiple records in another TAR. This type of relationship is highly flexible, accommodating complex data connections. Many tokens may collectively represent ownership of one or more securities or derivatives, and conversely, one security or derivative may be represented by multiple tokens. Use Cases: Many-to-many relationships are particularly useful when tokens can have diverse and cross-cutting connections. For example, consider tokens representing ownership in various investment portfolios.

Each token can belong to multiple portfolios, and each portfolio can have multiple tokens, forming a many-to-many relationship. Use Cases: Multiple investors may collectively own a security or derivative through different tokens. How Cardinal Relationships Work in TARs: Establishing Links: Cardinal relationships are established by defining key fields in the TARs that act as references. For instance, a unique token ID in one TAR may be used to link to corresponding attributes in another TAR, based on the same token ID. Ensuring Data Consistency with Cardinal relationships are vital for maintaining data consistency. They ensure that data associations are accurate and that related records are correctly connected, preventing data anomalies.

Streamlining Data Access in Cardinal relationships simplify data access and retrieval. Administrators can efficiently retrieve related data elements, allowing for comprehensive analysis of token attributes and their connections. Scalability: Cardinal relationships are scalable and adaptable to accommodate the growth of the database. As more data and repositories are added, new relationships can be established to meet evolving requirements and support the database's expanding scope.

Cardinal relationships in TARs serve as the foundation for structuring, organizing, and managing the diverse attributes and attributes of tokens within the system. They enable administrators to establish meaningful connections between tokens and their associated data, facilitating efficient data management, analytics, and utilization in a dynamic and evolving database environment.

Transaction Studio is a core component of the database, designed to handle the management and analysis of transactions, compliance activities, and data relationships. It provides a comprehensive framework for organizing and understanding the database's financial ecosystem. Transaction Studio serves as the central hub for efficient management, monitoring, and analysis of financial transactions, compliance, and data relationships within the database. It offers a transparent and seamless experience within the financial ecosystem.

An in-depth breakdown of how the elements in Transaction Studio function:

1. Asset Holder List: Definition: The Asset Holder List is a dynamic record that maintains an up-to-date inventory of individuals or entities holding digital assets within the system. It includes details such as the names of asset holders, their contact information, and the specific assets they possess. Use Cases: The Asset Holder List serves several critical functions within the database, with a focus on tracking and managing asset ownership: Ownership Tracking: The Asset Holder List provides a real-time snapshot of who holds specific digital assets within the system. This tracking ensures transparency and accountability in asset ownership.

Contact Information: It maintains contact information for asset holders, making it easy for administrators, auditors, and regulatory authorities to communicate with relevant parties when necessary. Transfer Records: The list includes records of asset transfers and ownership changes, creating a historical record of ownership transitions over time. Compliance Oversight: Compliance auditors and regulatory authorities can use the Asset Holder List to verify the accuracy of ownership information and assess compliance with regulatory requirements. Reporting: Administrators can generate reports based on the Asset Holder List, providing insights into asset ownership, trends, and potential compliance issues.

Due Diligence: When evaluating the ownership of specific assets, due diligence can be conducted by referring to the Asset Holder List. This helps ensure that assets are held by authorized parties. The Asset Holder List is a fundamental component for maintaining transparency, accountability, and compliance within the database. It provides a centralized repository of asset ownership information, streamlining ownership tracking and facilitating communication with asset holders.

2. Asset Groups: Definition: Within the database, Asset Groups serve as repositories for related digital assets, encompassing a diverse range of financial instruments, including Asset Bound Tokens (ABTs), securities, commodities, derivatives, and various other financial assets. These groups are defined by their ability to bring together digital assets that share common characteristics or attributes. Use Cases: Asset Groups provide valuable functionality and utility within the database, supporting a multitude of purposes and administrator objectives:

Categorization: Asset Groups enable administrators to systematically categorize and organize digital assets based on specific criteria. For instance, an Asset Group could be established to include all ABTs representing an Exchange-Traded Fund (ETF) composed of a basket of securities. Portfolio Management: Asset Groups play a pivotal role in portfolio management. Administrators can create and manage portfolios of digital assets with similar characteristics, facilitating portfolio analysis, performance evaluation, and decision-making.

Compliance Management: Asset Groups are instrumental in compliance management. Regulatory requirements often differ based on the type and characteristics of digital assets. By grouping assets into distinct categories, compliance professionals can apply relevant regulatory standards efficiently. Reporting: Asset Groups simplify the process of generating reports and conducting analysis. Administrators can generate customized reports specific to asset categories, allowing for in-depth insights into the performance, risk exposure, and compliance status of asset groups.

Ownership Tracking: Asset Groups facilitate the tracking of ownership and transfers of digital assets. This functionality is particularly valuable in situations involving fractional ownership or complex ownership structures. Asset Groups serve as a foundational element for effective and structured management of digital assets within the database. They enhance portfolio management, streamline compliance efforts, and support robust reporting and analysis capabilities.

3. Transaction Categories: Definition: In the database, Transaction Categories are a means of classifying various types of financial transactions or activities. These categories are essential for organizing and categorizing transactions based on their characteristics and attributes. Use Cases: Transaction Categories serve multiple purposes within the database, helping streamline transaction management and compliance: Categorization: Transaction Categories allow transactions to be organized into distinct groups based on their nature. For example, transactions related to stock trading activities can be categorized under a "Stock Trading" Transaction Category. Reporting: The categorization provided by Transaction Categories simplifies reporting and analysis. Administrators can generate reports specific to each category, providing insights into different transaction types.

Compliance: Transaction Categories play a vital role in compliance management. Regulatory requirements often vary depending on the type of transaction. By categorizing transactions, compliance professionals can ensure that the appropriate regulations are applied to each category. Analysis: Transaction Categories enable in-depth analysis of transaction data. Administrators can assess the performance of specific transaction types, identify trends, and make data-driven decisions. Administrator Interface: Transaction Categories enhance the administrator interface by providing an intuitive way to navigate and filter transactions based on their classification. This improves administrator experience and efficiency.

Transaction Records and History: Token Holder Connect is tightly integrated with Transaction Studio to provide users with a seamless experience. When users initiate transactions through Token Holder Connect, all transaction details, including buy, sell, or transfer actions, are recorded in Transaction Records within Transaction Studio. Users can easily access the complete transaction history for each digital asset directly from Token Holder Connect. Manual Transaction Approval: Administrators have the capability to manually review and approve transactions that meet predefined criteria requiring approval. This Manual Transaction Approval process extends its functionality to Token Holder Connect, ensuring seamless transaction oversight and management.

Key Aspects of Manual Transaction Approval: Initiation: When a transaction initiated through Token Holder Connect aligns with the predefined criteria necessitating approval, the Manual Transaction Approval process is triggered. Administrator Review: Administrators can access Transaction Studio to review pending transactions that require approval. This step allows administrators to thoroughly examine transaction details, ensuring compliance and security.

Transaction Approval: From Transaction Studio, administrators can approve transactions that meet the established criteria. This approval confirms the transaction's legitimacy and compliance with regulatory requirements. Notification: Token Holder Connect users involved in the transaction receive notifications of the approval status. This notification informs them of the transaction's progress and status change. Manual Transaction Approval within Transaction Studio, administrators maintain full control over the approval process, ensuring that transactions are thoroughly reviewed and compliant with the established criteria. This process enhances security, accountability, and regulatory adherence within the financial ecosystem.

Transaction Categories are a foundational component for effectively managing and classifying financial transactions within the database. They contribute to organized data management, compliance adherence, and insightful data analysis.

Compliance Auditors: Definition: Within the database, Compliance Auditors are individuals or entities entrusted with the responsibility of overseeing and ensuring regulatory compliance. Their primary role is to monitor and audit various aspects of the system to verify adherence to regulatory requirements and industry standards. Use Cases: Compliance Auditors play a crucial role in upholding compliance within the system, utilizing their authority for specific purposes:

Transaction Monitoring: Compliance Auditors actively monitor financial transactions to assess their compliance with applicable laws and regulations. They scrutinize transaction details, ownership, and other attributes. Asset Group Audits: Auditors review asset groups to ensure that they align with regulatory standards. This includes verifying the composition of asset groups and the compliance attributes associated with them. Data Relationship Audits: Compliance Auditors conduct audits of data relationships to verify the accuracy and completeness of attribute associations. This ensures that data is correctly linked and reflects the actual state of assets and transactions.

Audit Trails: Auditors maintain comprehensive audit trails, documenting their findings, assessments, and actions taken during audits. These audit trails serve as records of compliance oversight. Reporting: Compliance Auditors generate reports on compliance performance, highlighting areas of concern, potential violations, and recommended actions for remediation. Recommendations: In cases of non-compliance or issues identified during audits, Compliance Auditors provide recommendations and guidance for corrective actions.

Compliance Auditors act as internal guardians of compliance, working diligently to maintain regulatory adherence and industry standards within the system. Their monitoring and audit activities contribute to a compliant and regulated financial ecosystem.

Regulatory Authorities: Definition: Regulatory Authorities within the database represent external entities, including government agencies and financial regulatory bodies. They assume the role of establishing and enforcing compliance standards and regulations applicable to the system. Use Cases: Regulatory Authorities play pivotal roles in ensuring adherence to compliance standards and regulations, utilizing their access to shared compliance records and transaction data for specific purposes: Regulatory Oversight: Regulatory Authorities actively oversee compliance within the system, monitoring transactions, asset groups, and compliance-related activities.

Audit and Inspection: They have the authority to conduct audits and inspections of system operations, ensuring that regulatory requirements are met consistently. Investigations: In cases of suspected non-compliance or irregularities, Regulatory Authorities can initiate investigations into specific transactions or entities within the system. Data Access: Regulatory Authorities have access to shared compliance records, transaction details, and other relevant data sources. This access enables them to perform thorough reviews and assessments.

Compliance Enforcement: Regulatory Authorities are responsible for enforcing compliance standards and regulations within the system. They may impose penalties or sanctions for non-compliance. Reporting: These entities generate compliance reports, providing insights into the system's adherence to regulatory requirements. These reports are essential for maintaining transparency and accountability. Regulatory Authorities act as external guardians of compliance, ensuring that the system operates within the bounds of applicable laws and regulations. Their access to data and oversight capabilities empowers them to fulfill their roles effectively, fostering a compliant and regulated financial environment.

Attribute Associations: Definition: Attribute Associations are structural components that establish connections between various data attributes or characteristics of digital assets and transactions within the database. Use Cases: Attribute Associations serve vital roles within the system, facilitating tracking and analysis of essential attributes related to digital assets: Data Linkages: Attribute Associations create linkages between data attributes, allowing for the correlation of information across different aspects of digital assets. For example, they link ownership details, transaction history, and compliance attributes to specific assets.

Ownership Tracking: These associations enable the system to track and record ownership changes and transitions for digital assets. Administrators can trace the history of asset ownership over time. Compliance Oversight: Attribute Associations play a pivotal role in compliance management. They connect compliance attributes to digital assets, ensuring that regulatory requirements and industry standards are met. Data Analysis: Attribute Associations provide a foundation for data analysis by organizing and relating attributes. Administrators can perform in-depth analyses to extract meaningful insights and patterns.

Asset Profiling: Administrators can create comprehensive profiles of digital assets by utilizing Attribute Associations to consolidate relevant attributes. These profiles offer a holistic view of asset characteristics. Audit Trails: The connections established by Attribute Associations contribute to creating audit trails for digital assets and transactions. These trails are valuable for accountability and regulatory compliance. Attribute Associations are instrumental in enhancing the system's ability to manage and analyze digital assets effectively. They provide the structural framework for organizing, correlating, and extracting insights from attribute-related data, making them a crucial component for asset tracking and compliance monitoring.

Transaction Records: Definition: Transaction Records are detailed records that capture comprehensive information about each financial transaction or activity within the database. Use Cases: Transaction Records serve essential functions within the system, providing a thorough account of individual transactions: Comprehensive Documentation: Transaction Records document each financial transaction comprehensively. They capture critical details such as the transaction type, timestamp, parties involved, and specific asset details. Transaction History: These records maintain a historical log of all transactions, allowing administrators to track the evolution of financial activities over time.

This historical data is invaluable for reference and analysis. Audit Trail: Transaction Records serve as an audit trail, providing a clear and chronological record of transactions. This audit trail aids in accountability, regulatory compliance, and dispute resolution. Data Analysis: Transaction Records offer a wealth of data that can be analyzed to gain insights into transaction patterns, trends, and performance. This analysis supports decision-making processes and strategic planning.

Regulatory Compliance: Transaction Records are crucial for regulatory compliance, as they provide the necessary documentation to demonstrate adherence to financial regulations and industry standards. Transparency: Making Transaction Records available ensures transparency, as stakeholders can review transaction details and verify the accuracy of financial activities within the system. Transaction Records play a fundamental role in documenting, analyzing, and ensuring the transparency and compliance of financial transactions within the database. Their detailed and comprehensive nature makes them a valuable resource for administrators, auditors, and regulatory authorities.

Public Compliance Records: Definition: Public Compliance Records refer to records containing transaction details and compliance-related information that are accessible to regulatory authorities or the general public for the purposes of transparency and accountability. Use Cases: Public Compliance Records serve vital functions within the database, focusing on transparency and accountability to external stakeholders: Transparency: Public Compliance Records provide transparency by making certain compliance-related information available to external parties. This transparency showcases a commitment to openness and adherence to regulatory standards.

Regulatory Oversight: Regulatory authorities have access to these records to perform audits and reviews. This access enables regulatory bodies to verify compliance with applicable regulations and ensure that the database adheres to legal requirements. Accountability: By allowing external stakeholders, including the public and regulatory authorities, to review compliance records, the system promotes accountability. Administrators can assess whether the database complies with regulatory standards and industry norms. Audit Trails: Public Compliance Records serve as comprehensive audit trails, documenting compliance-related activities, actions, and transactions. This documentation aids in tracking compliance efforts and provides historical data for reference. Legal Compliance: Making compliance records accessible to external stakeholders aligns with legal requirements and regulatory obligations. It ensures that the database adheres to transparency regulations and facilitates external reviews.

Trust Building: The availability of compliance records fosters trust among administrators, investors, and regulatory authorities. It demonstrates a commitment to compliance and regulatory integrity. Public Compliance Records play a critical role in promoting transparency, accountability, and regulatory compliance within the database. By allowing external stakeholders to access compliance-related information, the system demonstrates its dedication to upholding industry standards and legal requirements.

Restricted Transactions: Definition: Restricted Transactions pertain to transactions that are subject to specific limitations or restrictions imposed by regulatory authorities or compliance auditors. Use Cases: Restricted Transactions serve essential functions within the database, primarily focused on ensuring compliance with regulatory requirements: Regulatory Compliance: These transactions are subject to stringent regulatory scrutiny and oversight. Compliance with established rules and regulations is paramount to avoid potential legal consequences.

Flagging Mechanism: Restricted Transactions are flagged within the system, highlighting their unique status. This flagging mechanism alerts relevant parties, such as compliance auditors and regulatory authorities, that further review and approval processes are necessary. Review and Approval: Transactions classified as restricted require thorough review and approval by authorized personnel. Compliance auditors or regulatory authorities are responsible for evaluating the transaction details to confirm adherence to regulatory requirements.

Documentation: Restricted Transactions necessitate meticulous documentation to substantiate their compliance with regulatory standards. This documentation serves as a record of due diligence and helps demonstrate compliance efforts. Risk Mitigation: By subjecting certain transactions to additional scrutiny, restricted transactions mitigate the risk of non-compliance with regulatory guidelines. This proactive approach helps prevent potential regulatory breaches. Transparency: The designation of transactions as restricted enhances transparency by clearly indicating that these transactions have been subject to regulatory evaluation. This transparency fosters accountability and trust within the database.

Restricted Transactions play a pivotal role in maintaining regulatory compliance and ensuring that transactions align with established legal frameworks. They help prevent regulatory violations, protect the database's integrity, and demonstrate a commitment to upholding regulatory standards.

Mutually Agreed Restrictions: Definition: Mutually Agreed Restrictions refer to limitations or conditions that have been consensually agreed upon by multiple parties involved in a transaction. Use Cases: Mutually Agreed Restrictions play a crucial role in transaction management and compliance within the database.

They serve several essential purposes: Transaction Consistency: Mutually Agreed Restrictions ensure that transactions conform to the mutually accepted terms and conditions established by all parties involved. This promotes consistency and fairness in the execution of transactions. Transparency: These restrictions enhance transparency by clearly defining the constraints and obligations associated with a transaction. All parties are aware of and consent to the limitations, reducing the risk of disputes or misunderstandings. Customized Agreements: Mutually Agreed Restrictions allow for tailored agreements that suit the specific needs and preferences of the parties involved. This flexibility enables parties to negotiate and set restrictions that align with their unique circumstances.

Legal Compliance: By adhering to the mutually agreed-upon restrictions, transactions are more likely to meet legal and regulatory requirements. Parties can ensure that their actions are compliant with applicable laws and regulations. Conflict Resolution: In cases where disputes arise, these restrictions serve as a reference point for resolving conflicts. They provide a clear framework for addressing disagreements and determining whether parties have complied with the agreed-upon terms. Risk Mitigation: Mutually Agreed Restrictions help mitigate risks associated with transactions. Parties can proactively define and manage risks by setting restrictions that protect their interests.

Mutually Agreed Restrictions are a valuable mechanism for facilitating transactions with multiple stakeholders. They contribute to transactional transparency, legal compliance, and conflict resolution, ultimately fostering trust and accountability among all parties involved.

Attribute Filters: Definition: Attribute Filters are tools that refine, and narrow down data based on specific attributes or criteria. Use Cases: Attribute Filters play a pivotal role in data management and analysis within the database. They are instrumental in the following scenarios: Data Refinement: Attribute Filters enable administrators to refine large datasets by specifying criteria relevant to their analysis or reporting needs. This process narrows down the dataset to include only the data points that meet specific attributes or conditions.

Focused Analysis by Administrators can employ Attribute Filters to concentrate on particular aspects of transactions or assets. For instance, they can focus on transactions within a specific time frame, assets of a certain type, or transactions involving particular parties. Compliance Checks: Attribute Filters are essential for compliance checks. Administrators can filter data to identify transactions or assets that may require additional scrutiny based on predefined compliance attributes or regulatory criteria.

Customized Reporting: Attribute Filters allow for the creation of customized reports that present data in a tailored manner. Administrators can generate reports that highlight specific attributes or trends of interest. Performance Optimization: By reducing the volume of data to only what is relevant, Attribute Filters enhance data processing efficiency. This is particularly valuable for large-scale data analysis. Data Exploration: Attribute Filters facilitate in-depth data exploration by providing administrators with the ability to interact with the data in a way that aligns with their research or analytical objectives. Attribute Filters are versatile tools that empower administrators to navigate and interact with data efficiently. They are invaluable for extracting meaningful insights, ensuring compliance, and tailoring data presentations to meet specific needs.

Compliance Metrics: Definition: Compliance Metrics are quantifiable indicators used to assess and measure compliance performance. Use Cases: Compliance Metrics play a crucial role in tracking and evaluating adherence to regulatory requirements. They provide valuable insights into the system's compliance with industry standards and regulations. Here's how Compliance Metrics are utilized: Performance Assessment: Compliance Metrics serve as benchmarks for evaluating how well the system complies with various regulatory requirements and industry standards. They allow for an objective assessment of compliance performance. Monitoring Progress using these metrics provides a means to continuously monitor and measure progress towards compliance goals. By tracking specific indicators, administrators can identify areas that require improvement or further attention. Regulatory Reporting: Compliance Metrics contribute to the preparation of regulatory reports and documentation.

They offer quantifiable evidence of compliance efforts, making it easier to demonstrate adherence to authorities and auditors. Decision-Making: Compliance Metrics inform decision-making processes by providing data-driven insights. Administrators can make informed choices based on the performance indicators to enhance compliance strategies. Identifying Trends: Over time, Compliance Metrics can help identify trends and patterns related to compliance. This allows administrators to proactively address potential issues and adapt to changing regulatory landscapes.

Compliance Metrics are an integral part of maintaining a compliant and well-regulated system. They enable administrators to gauge the effectiveness of compliance efforts, make informed decisions, and demonstrate a commitment to meeting regulatory requirements and industry standards.

Tracking: Definition: Tracking involves monitoring, recording, and storing activities, changes, and events within the database.

Use Cases: Tracking is essential for maintaining an audit trail, ensuring data integrity, and providing a history of actions and transactions for compliance, security, and accountability purposes. Tracking serves the following critical functions: Audit Trail: It creates a detailed record of all activities, changes, and events, allowing for comprehensive audits of administrator actions, system modifications, and transaction history.

Data Integrity: Tracking helps safeguard data integrity by providing a clear account of all changes made to the database. This ensures that data remains accurate, reliable, and tamper-proof. Security: It plays a pivotal role in enhancing security measures by monitoring administrator and database user access, authentication, and authorization. Suspicious or unauthorized activities can be quickly identified and addressed. Accountability: Tracking establishes accountability by attributing actions and changes to specific administrators, database users or entities. This promotes transparency and responsibility within the system.

Tracking is an integral part of the database's operation, contributing to its robustness, security, and reliability. By maintaining an audit trail, upholding data integrity, enhancing security, and enforcing accountability, tracking serves as a critical pillar for ensuring compliance, security, and accountability within the system. 14. Profile and Preference Center: Definition: The "Profile and Preference Center" within Transaction Studio is a dedicated feature designed for users to manage and customize their personal profiles, communication preferences, and interaction history. It empowers users to have full control over how they engage with the system while maintaining their privacy and ensuring a personalized experience.

The Profile and Preference Center serves several critical functions within the database: Profile Management: Users can update and maintain their profiles, including personal information, token holder details, and authentication settings. This feature ensures that user profiles remain accurate and up to date.

Communication Preferences: Users have the ability to define their communication preferences, specifying how they wish to receive notifications, updates, and alerts from the system. This includes choices related to wallet messages, wallet notifications, and other communication channels.

Preference History: The center keeps a detailed record of users' historical preferences, allowing them to review past choices and make adjustments as needed. This historical data ensures that administrators can track and reference their previous interaction preferences. User Support: Users can access dedicated user support resources, such as FAQs, guides, and contact options, directly from the Profile and Preference Center. This feature ensures that users have easy access to assistance whenever needed.

Privacy Controls: Privacy settings are an integral part of the center, allowing users to define the level of data sharing and visibility within the system. Users can adjust privacy settings to align with their comfort and requirements. The Profile and Preference Center puts users in the driver's seat, offering a seamless and intuitive way to manage their experience and interactions within the database. By providing control over profiles, communication settings, and support resources, users can receive communication from the system with confidence and ensure that their preferences are respected, all while preserving their privacy. Compliance management remains the responsibility of administrators and professionals on the backend, ensuring that regulatory standards are met with precision.

AssetFlow Automation Suite is designed to cater to the specific requirements of large entities engaged in the utility of Asset Bound Tokens (ABTs) and the management of digital assets and financial instruments.

AssetFlow Automation Suite provides a comprehensive set of automation tools:

1. Scheduled Workflows: Configure scheduled workflows to automate routine tasks like data imports, token issuance, or compliance checks. Ensure precise data management and timely operations by scheduling workflows at predefined intervals.
2. File Integration Automations: Deploy File Integration Automations to seamlessly receive and process external data files. This feature streamlines data imports when a file is dropped, making it efficient, even when dealing with substantial transaction volumes or asset updates.
3. Event Driven Automations: Set up Event Driven Automations to respond swiftly to specific occurrences within the database. For instance, when a user initiates a token transfer or requests compliance verification, Event Driven Automations executes the necessary actions automatically.
4. SQL Data Query: Harness SQL Data Query such as action query, a select query, or a combination of both to retrieve and segment data within the database. This functionality is particularly valuable for creating targeted asset or user groups based on attributes like asset ownership, compliance status, or transaction history.
5. Data Integration Automations: Automate the importing process of Asset Groups or Repositories with external files using the Data Integration Automations. This feature facilitates the efficient management of user data and asset information, ensuring the database remains current.
6. Custom Workflow: Create customized Workflows to execute intricate operations within the database. These tailored workflows align with specific business rules and requirements, providing flexibility and precision.
7. Data Filtering: Implement Data Filtering to refine and segment data based on predefined criteria. This capability proves beneficial when you need to isolate specific attributes or assets for targeted actions.
8. Data Extraction: Automate data extraction from the database using Data Extraction. This functionality generates reports, compliance documentation, or data backups, ensuring crucial information is readily accessible.
9. Workflow Orchestration: Strategically introduce delays in the automated processes with Workflow Orchestration. For example, you can include wait periods for compliance verifications or synchronize asset updates.
10. Workflow Control: Retain complete control over running workflows by pausing, skipping, or stopping them as needed with Workflow Control. This flexibility enables efficient operations and real-time adjustments.

11. Workflow Duplication and Management: Empower administrators to duplicate and customize workflows to address various scenarios effectively. Additionally, provide the option to manage and remove workflows that are no longer relevant, ensuring a streamlined interface.
12. Workflow Monitoring and Performance: Implement tools to monitor workflow history and performance. Track successful runs, error tracking, and performance metrics, enabling continuous optimization of the automated processes.
13. Transaction Management: Assetflow Automation Suite incorporates Transaction Management features from Transaction Studio to automate various financial processes. For example, automated routines can be configured to initiate buy or sell transactions based on predefined criteria, such as specific asset performance metrics or market conditions. This streamlines asset management processes and reduces manual intervention.
14. Transaction Approval Workflow: The Assetflow Automation Suite integrates seamlessly with the Transaction Approval within Transaction Studio. Automated routines can be designed to follow approval processes when necessary. If a transaction meets specific criteria that require approval, the automation triggers the workflow, and Administrators can review and approve transactions through the suite.
15. Transaction Notifications: Assetflow Automation Suite provides notification capabilities to alert users about automated transaction activities. When an automated transaction is executed or requires attention, notifications are sent to designated users, ensuring they are informed and can take appropriate actions.
16. Reports: Empowers users to track and analyze the performance of their marketing campaigns and customer journeys. The suite offers robust reporting capabilities that provide valuable insights into customer behavior, campaign effectiveness, and journey outcomes, including transactions and transfers of ABTs and other digital assets.

Key Features of Reports in Assetflow Automation Suite:
1. Comprehensive Data: Reporting features encompass a wide range of data, including transactions and transfers of ABTs and other digital assets. Users gain a holistic view of how customers engage with marketing campaigns and interact with digital assets.
2. Customized Reports: Users can create customized reports tailored to their specific needs and objectives. This flexibility allows for the inclusion of relevant metrics and data points related to both marketing activities and asset transactions.
3. Integration with Transaction Studio: Assetflow seamlessly integrates with Transaction Studio, providing users with access to additional data from Asset Group Reports, as well as transaction and transfer data. This integration enhances the depth of insights available to users, allowing them to correlate marketing campaign data with asset-specific information and financial transactions.
4. Performance Tracking: Users can track the performance of marketing campaigns and customer journeys, as well as monitor the impact of asset transactions and transfers. This includes monitoring key performance indicators (KPIs), conversion rates, customer engagement levels, and financial transaction data.
5. Data Visualization: Reports in Assetflow Automation Suite utilize data visualization techniques such as charts, graphs, and dashboards to present information in a visually appealing and easy-to-understand manner. This aids users in quickly identifying trends and patterns related to both marketing activities and financial transactions.
6. Data Segmentation: Users can segment data within reports to gain insights into specific customer groups or campaign segments, as well as transaction and transfer patterns.

This segmentation capability supports targeted marketing strategies and allows for a deeper understanding of asset-related activities.
7. Export and Sharing: Reports can be exported in various formats and shared with team members or stakeholders. This facilitates collaboration and data-driven decision-making across the organization, including discussions related to marketing campaigns and financial transactions. The reporting features within Assetflow Automation Suite, users can measure the effectiveness of their marketing efforts, optimize customer journeys, and make data-driven decisions.

Transactions and transfers of ABTs and other digital assets in reports provide a comprehensive view of customer behavior and financial activities, enabling organizations to gain valuable insights into both marketing and financial aspects of their operations automatically. The AssetFlow Automation Suite empowers large entities to automate mission-critical tasks, streamline operations, and elevate their overall experience within the financial sector. Whether it is data management, compliance checks, or asset transfers, these features ensure that processes are efficient, error-free, and tailored to meet the precise business needs of an entity's financial ccosystem.

Importing data into the database is a critical process that ensures the system remains up-to-date and accurate.

There are several methods and mechanisms in place to facilitate data import, including API integration for entities seeking to access and utilize the database programmatically.
1. Manual Data Import: Token Holder Connect: Administrators utilizing the database can manually import data into the system through Token Holder Connect. This user-friendly interface allows for the input of various data types, user profiles, ownership details, and transaction records. Entities can access Token Holder Connect through a secure login and input data directly into the system, ensuring data accuracy and completeness.

Transaction Studio: Transaction Studio serves as a platform for managing and recording transaction data. Entities, such as administrators and financial institutions, can manually input transaction details, including trade types, asset information, timestamps, and parties involved. This manual data entry ensures that all transaction-related information is accurately captured and stored within the database.
2. Automated Data Import through AssetFlow Automation Suite: Scheduled Workflows: AssetFlow Automation Suite offers Scheduled Workflows that can be configured to import data at specific intervals. For example, it can automate the import of daily market data, ensuring that asset valuations and prices are up to date.

File Integration Automations: This feature allows for seamless external data file ingestion. Administrators can set up File Integration Automations to receive, process, and import external data files into the database. This is particularly useful when dealing with large volumes of data, such as regulatory reports or market feeds. Event-Driven Automations: Event-Driven Automations can initiate data import processes in response to specific events or conditions. For instance, when a new user is onboarded or when a compliance audit is requested, an Event-Driven Automation can automatically import the necessary user data or compliance records.

API Integration: Entities seeking programmatic access to the database can utilize APIs for data import. The database provides well-documented APIs that allow external systems to securely interact with the database. Entities can use these APIs to import and export data, facilitating seamless data integration with their existing systems and workflows.
  3. Data Validation and Transformation: Before data is imported into the database, it undergoes validation and transformation processes to ensure data accuracy and consistency. This includes checks for data format, completeness, and adherence to predefined data schemas and standards.
  4. Security Measures: All data imports, whether manual or automated, adhere to stringent security measures. Secure Sockets Layer (SSL) encryption and authentication protocols are in place to safeguard data during transmission. Additionally, role-based access controls and permissions ensure that only authorized administrators and entities can perform data imports.
  5. Error Handling and Logging: The database includes comprehensive error handling and logging mechanisms. In the event of data import errors or issues, detailed logs are generated to facilitate troubleshooting and resolution. Notifications can also be sent to designated personnel or administrators to address data import issues promptly.
  6. API Integration for External Entities: The database offers a RESTful API that external entities can leverage to programmatically interact with the system. This API allows for secure data exchange, including data import and export. External entities can use the API to integrate the database with their own systems, ensuring seamless data flow and synchronization. Data import into this database is a multifaceted process that accommodates both manual and automated methods. Asset-Flow Automation Suite enhances automation capabilities, while robust security measures, validation, and error handling ensure data accuracy and integrity.

The API integration further extends the database's accessibility, allowing external entities to seamlessly interact with and utilize the database's rich dataset for their specific financial needs.

The database system provides multiple options for the location and type of files that can be imported or exported. Here are the available file location types along with their descriptions:
  1. Amazon S3, Google Cloud Storage, or Microsoft Azure Blob Storage: Description: This option allows you to transfer files directly to or from the external cloud storage location. It offers the advantages of fast file transfer and provides granular control over file and folder permissions.

You can seamlessly integrate the database with cloud storage services like Amazon S3, Google Cloud Storage, or Microsoft Azure Blob Storage for efficient data exchange.
  2. Database Enhanced FTP Site: Description: The Enhanced FTP Site is a part of the database system. It enables the transfer of files to or from the default Import and Export directories or any other subfolder within the Enhanced FTP. This feature provides a built-in FTP capability that simplifies file transfer operations within the database.
  3. Database Safehouse: Description: The Safehouse serves as a secure data storage and transfer mechanism within the database. It allows for the encryption and decryption of files before import or extraction without exposing these files to the Enhanced FTP directories. Access to the Safehouse is restricted to authenticated administrators only, and it resides on highly redundant and highly available central storage servers, ensuring data security and integrity.
  4. External FTP, SFTP, or FTPS: Description: This option enables the transfer of files to and from your own FTP, SFTP, or FTPS site. You can integrate the database with your external file transfer service for data exchange. Whether you use a standard FTP server, a secure SFTP connection, or FTPS for added security, the database can accommodate your specific file transfer requirements. These diverse file location types offer flexibility and compatibility with various storage and transfer methods, ensuring that the database can seamlessly import and export data from multiple sources and destinations while adhering to security and compliance standards.

The Database for Asset Bound Tokens (ABTs), and Digital Assets exhibits several characteristics that classify it as a database.
  1. Tabular Structure: The database stores data in structured tables with predefined schemas. These tables consist of rows and columns, where columns represent attributes or fields, and rows represent individual records. For instance, Token Attribute Repositories (TARs) within the database have a tabular structure, where each row corresponds to a specific token, and columns contain attribute-related information, including ownership, transaction history, and other pertinent data.

This tabular structure aligns with the fundamental organization of relational databases.
  2. Schema: Relational databases require a predefined schema that specifies the structure of each table. This schema includes information about data types, constraints, and relationships between tables. In the context of the ABT database, the presence of TARs suggests a predefined structure for these repositories, which encompasses ownership details, transaction history, and various attributes. Enforcing this structure ensures data integrity, as it imposes constraints on how data can be entered and manipulated.
  3. ACID Transactions: This database ensures data consistency and reliability through mechanisms such as transaction handling. ACID (Atomicity, Consistency, Isolation, Durability) transactions are a hallmark of relational databases, ensuring that all database operations are either completed in their entirety or completely undone in case of failure. This system provides a robust transactional support, the ABT database aligns with the ACID principles commonly associated with relational databases.
  4. SQL Query Language: This database supports a query language similar to SQL (Structured Query Language). administrators can query the database using SQL queries or data filters Attribute Filters). SQL is renowned for its powerful capabilities in performing complex queries and joins, which is crucial for extracting meaningful insights from the database's structured data. This feature is synonymous with relational databases, where SQL is the standard language for data manipulation and retrieval. The database for ABTs embodies the core characteristics of a relational database, including a tabular structure, predefined schema, support for ACID transactions (implicitly), and the utilization of a query language akin to SQL.

These attributes collectively establish the database's identity as a structured and organized system for storing and managing data related to Asset Bound Tokens and their associated attributes. Segmenting data in this database is a crucial aspect of managing Asset Bound Tokens (ABTs) and digital wallets efficiently. This process involves dividing the database's records into distinct groups or segments based on specific criteria. Here's how data segmentation works within the database, incorporating filtered repositories, data filters, SQL queries, and the audience segmentation manager:

1. Filtered Repositories: Filtered repositories are specialized data containers within this database designed to hold subsets of data based on specific criteria or attributes. For instance, you can create filtered repositories for ABTs of a particular asset type, owned by specific users, or involved in recent transactions. To segment data using filtered repositories, customize these repositories to match administrator segmentation requirements. For example, you might establish a filtered repository for "High-Value ABT Holders" or "Recent ABT Transfers." Once defined and populated, filtered repositories provide easy access to segmented data according to your criteria.

2. Data Filters: Data filters consist of rules or conditions applied to the data to isolate specific records that meet certain criteria. Within this database, data filters are valuable for segmenting ABTs, wallet information, or transaction records. For instance, you can create a data filter to extract all ABTs issued in the last month or identify wallet holders who meet specific compliance criteria. Data filters offer flexibility in dynamically segmenting data, and you can save them for repeated use.

3. SQL Queries: SQL queries play a pivotal role in segmenting data within this database. SQL (Structured Query Language) empowers you to craft intricate queries to retrieve specific data based on user-defined conditions. In the context of this database, SQL queries provide a highly customized approach to data segmentation. For example, you might use SQL to fetch a list of users holding ABTs from different asset classes or identify transactions exceeding a certain value threshold.

SQL queries grant precise control over data segmentation, enabling extraction of exactly the information needed.

4. Audience Segmentation Manager: The audience segmentation manager is a feature tailored to segment data for targeted communication or actions within this database. It allows you to create segmented groups of users, ABTs, or wallets based on various attributes. For instance, you can utilize the audience segmentation manager to create audience segments like users who recently acquired ABTs or those requiring compliance verification.

Once audience segments are defined, they can be seamlessly integrated into communication campaigns, compliance checks, or other actions tailored to the unique needs of each segment. Data segmentation within this database is a versatile process encompassing filtered repositories, data filters, SQL queries, and the audience segmentation manager. These tools provide the capability to organize and access data with precision, facilitating targeted actions, report generation, compliance checks, and improved user engagement. Whether segmenting ABTs, wallets, or transaction data, the segmentation capabilities of this database offer the flexibility and control necessary to meet specific business requirements within the financial sector.

1. Message building is creating messages for communication with wallets in this database involves various elements, including Asset Personalization Tag, Dynamic Content, Message Templates, Content Blocks, and AssetScript (scripting capabilities). Let us delve into how message building works within this database: 1. Asset Personalization Tags: Asset Personalization Tags are personalized strings that allow you to insert dynamic information into the messages. These tags act as placeholders that get replaced with specific wallet-related data when the message is sent. For example, you can use an Asset Personalization Tag like %%WalletBalance%% to personalize messages with the recipient's current wallet balance.

2. Dynamic Content: Dynamic Content are dynamic content elements that enable you to create message variations that are automatically selected based on specific conditions or recipient attributes. For instance, you can use Dynamic Content to display different content to wallet holders based on their asset type, transaction history, or compliance status.

3. Message Templates: Message Templates are pre-designed message layouts tailored for wallet-related communication. These templates provide a consistent and visually appealing format for the messages. A user can choose from a library of Message Templates or create custom ones to suit various communication needs, such as transaction notifications, compliance updates, or asset statements.

4. Content Blocks: Content Blocks are modular components that you can use to assemble the messages. These blocks can contain text, images, links, and other content elements. When building a message, a user can arrange Content Blocks to create a message structure that conveys information effectively to wallet holders.

Testing content within this database, particularly for communication purposes, involves ensuring that messages sent to wallet holders are accurate, compliant with regulations, and successfully connect to the intended wallet addresses. Here's how testing content would work in this context:

1. Token Holder Preview: Before sending any messages to wallet holders, administrators have the option to utilize a "Token Holder Preview" feature within the database. Token Holder Preview allows administrators to review how the message content will appear to wallet holders before it is sent. This ensures that the message is formatted correctly, and any personalized information, such as token balances or transaction details, is accurate. Administrators can select specific wallet holders or groups to preview the message and verify that the content is tailored appropriately to the recipients.

2. Message Compliance (CAN-SPAM and GDPR Regulations): Compliance checks within the database now encompass both CAN-SPAM and GDPR regulations. Before sending any messages to wallet holders, administrators can run compliance checks on their message content to ensure it adheres to these regulations. The database verifies that messages include essential elements for both regulations, such as an opt-out mechanism, a valid physical address, accurate sender identification, and explicit consent for data processing when applicable. Administrators receive guidance and recommendations to maintain compliance with both CAN-SPAM and GDPR when creating message content.

3. Connects to Wallet Address: To test whether a message successfully connects to the intended wallet address, administrators can use a "Connectivity Test" feature. This feature allows administrators to simulate the message delivery process. Administrators can select specific wallet addresses or groups and send test messages. The database monitors the delivery process and provides real-time feedback on whether the message was successfully delivered to the wallet address or if any issues occurred.

4. Message Personalization and Dynamic Content: Testing content also involves verifying that dynamic content and personalization are functioning correctly within the messages. Administrators can use placeholders and dynamic content tags in their message templates. During testing, the database ensures that these placeholders are replaced with accurate and up-to-date information for each wallet holder. Administrators can preview how dynamic content will appear for specific wallet holders to confirm that personalization is working as intended.

5. Testing Variations: Administrators have the flexibility to test different variations of message content. For instance, they can create A/B tests to assess which message content or format performs better in terms of engagement or compliance. The database tracks the performance of these variations and provides insights into which content resonates most with wallet holders.

6. Delivery and Read Receipts: As part of the testing process, the database tracks delivery and read receipts. Administrators can monitor whether wallet holders have received and opened the messages. This information is valuable for assessing the effectiveness of communication and making necessary adjustments to message content. Testing content within this database for communication involves a multi-faceted approach. Administrators can preview message content, ensure compliance with regulations like CAN-SPAM, verify successful delivery to wallet addresses, test dynamic content and personalization, and assess message variations. By conducting comprehensive testing, administrators can optimize their communication strategies, maintain compliance, and deliver accurate and engaging messages to wallet holders.

Reporting within this Database for Asset Bound Tokens (ABTs) and digital wallets is facilitated through a combination of Reports, Data Insight, and Send Logs.

Let us explore how these components work together to provide comprehensive reporting capabilities:

1. Reports: Reports in this database are customizable tools that allow administrators to extract, analyze, and visualize data based on their specific requirements. These reports can cover a wide range of aspects related to ABTs, wallets, transactions, compliance, and more. Administrators can create custom reports by selecting relevant data fields, applying filters, and defining criteria for data extraction. These reports can be scheduled for regular updates and distribution to stakeholders. Sample reports in this database may include: ABT Transaction History Report: Provides a detailed overview of all ABT transactions, including timestamps, involved parties, and transaction amounts. Wallet Portfolio Summary: Offers insights into the composition of wallet portfolios, categorizing assets by type, value, and ownership. Compliance Verification Status: Tracks and reports on compliance verification status for wallet holders, ensuring regulatory adherence. Asset Diversification Analysis: Analyzes the distribution of assets within wallets to assess diversification levels.

2. Data Insight: Data Insight is a set of predefined, structured collections of data that provide specific insights into various aspects of the database. These views offer valuable information that can be used for reporting and analysis. Within this database, you may find Data Insight such as: ABT Transaction Data Insight: Contains detailed information on all ABT transactions, including sender and receiver details, transaction types, and timestamps. Wallet Holder Data Insight: Provides comprehensive profiles of wallet holders, including ownership details, compliance status, and contact information. Asset Type Data Insight: Focuses on categorizing assets by type, enabling a deeper understanding of the asset composition within the database.

3. Send Logs: Send Logs are records of all messages, notifications, or communications sent from the database to wallet holders or other stakeholders. They capture essential information about the sent messages. Send Logs can be invaluable for auditing, tracking communication history, and ensuring the successful delivery of critical notifications. Information typically found in Send Logs includes message content, recipient details, timestamps, and delivery status. How Reporting Works in This Database: Administrators access the Reports section of the database to create, customize, and run reports. They can select the appropriate report type, define criteria, and choose data fields to include in the report.

Data Insight serves as a foundational source of data for reports. Administrators can reference specific Data Insight when creating reports, ensuring that the data used for reporting is consistent and up to date. Reports can be generated on-demand or scheduled for regular updates. Scheduled reports can be configured to be sent to designated recipients, promoting transparency and timely access to information. Send Logs play a vital role in tracking the delivery and status of messages and notifications sent to wallet holders. These logs provide a comprehensive history of communication events. Reporting within this database empowers administrators to make informed decisions, monitor compliance, track transaction history, and gain insights into the overall state of ABTs and digital wallets. Whether it is assessing the performance of wallet portfolios, verifying compliance, or analyzing transaction trends, reporting capabilities ensures that stakeholders have access to the data they need for effective management and decision-making.

Example: A User's ABTs Purchase—Buying a Stock.

1. User Registration: The user registers on the platform and creates an account. During registration, the user provides personal information and is assigned a unique Token Holder Connect Key, which serves as their identifier within the system. This Token Holder Connect Key is used for linking various records and activities to the user.

2. Creating a Wallet: After registration, the user creates a wallet to manage their assets. The creation of a wallet is recorded in the database as follows: A new Wallet Repository is generated for the user.

This Wallet Repository is categorized as "Standard" and designated as "Sendable" since it will be used for both communication and transaction channels. The Wallet Repository is associated with the user's Token Holder Connect Key, linking the user to the ownership of the wallet.

3. Buying a Stock Using ABTs: The user decides to invest in a stock using their ABTs. Here is what happens during this process: Token Creation: The user initiates a request to create a new ABT for the stock(s) they want to purchase. This request triggers the generation of a new Token Attribute Repository (TAR) specifically for the stock(s). The Token Attribute Repository is associated with the user's Token Holder Connect Key, linking the user to the ownership of this ABT. Transaction Execution: The user places an order to purchase the stock(s) using the ABT. This transaction is recorded in the system.

The database logs details of the transaction, including: The user's Token Holder Connect Key as the buyer. The ABT's Token Attribute Repository is the asset being traded. The stock as the underlying asset. Transaction date and time. Transaction status (e.g., pending, completed). Any other attributes.

4. Administrator's View: From the administrator's perspective, they have access to a dashboard or interface that provides insights into user activities. When the user's first ABTs purchase is made, the administrator sees the following: User Activity Log: In the user activity log, the administrator can see a new entry indicating the user's purchase of the stock using ABTs. This entry includes details such as the user's Token Holder Connect Key, the ABT's TAR, and the stock information. Asset Ownership Records:

The administrator can view asset ownership records, which show that the user now owns a specific quantity of the stock represented by the ABT. This ownership is associated with the user's Token Holder Connect Key and the Token Attribute Repository linked to that ABT. Transaction History: The transaction history log reflects the stock purchase transaction, including the date, time, and status. The administrator can confirm that the transaction has been successfully executed. 5. Regulatory Compliance: Additionally, the system ensures that the transaction adheres to any regulatory requirements. For example, if there are rules specifying that only accredited investors can buy certain securities, the system verifies the user's status before allowing the purchase. This demonstrates how the database system manages user activities, records ownership of assets through ABTs, and provides administrators with insights into these activities.

The use of Token Holder Connect Keys, Token Attribute Repositories, and Wallet Repositories facilitates data organization and tracking, ensuring a comprehensive and compliant record of transactions and asset ownership. Certainly, this database requires a centralized setup location to manage various aspects and features effectively. Similar to Marketing Cloud Setup, this setup for the database, referred to as "AssetFlow Setup," provides users with the tools and resources needed for seamless configuration and administration. Below is a detailed breakdown of AssetFlow Setup, incorporating the new names and features relevant to this database: Database Setup serves as a centralized hub for managing and configuring the database account. This comprehensive setup area offers a range of tools and resources to ensure smooth account management and optimal utilization of the database's features. Navigation Menu: The Navigation Menu provides easy access to various sections within the database Setup. It is categorized into sections such as "Administration," "Platform Tools," and "Settings," allowing users to quickly locate the setup pages they need.

Quick Search: Quick Search enables administrators to find specific setup pages by entering relevant search terms. This feature streamlines the process of accessing administrative tools, ensuring efficient navigation throughout the setup. Dashboard: The Dashboard section of the database setup offers key insights and metrics related to your database account. These metrics may include: ABT Data Overview: A graphical representation of ABT data within your account, displaying the number of ABTs issued, active ABTs, and more. Compliance Check Status: An overview of compliance verification status, indicating the number of completed verifications, pending checks, and compliance-related alerts. Wallet Holdings Analysis: Insights into wallet portfolios, categorizing assets by type, value, and compliance status. User Management Summary: An overview of user accounts and their roles within the database.

Resource Links: Database setup includes a section with links to essential resources, including: System Status: Provides real-time updates on the operational status of the database system. Release Notes: Access the latest release notes to stay informed about updates and improvements. Knowledge Base: A knowledge base to access documentation, guides, and tutorials for the database. Training: Access training materials and resources to enhance your proficiency in using the database. Setup Assistant: The setup assistant guides administrators through the initial configuration of their database account. It provides a prioritized task list to ensure users make the most of the databases capabilities from the start.

Limits: The database setup includes details on usage limits and constraints specific to your database account. It outlines both internal and external limitations that may affect your usage of the database. Password Management: Password Management in the database allows users to reset lost or forgotten passwords securely. This automated process ensures the security of user accounts while providing a straightforward password recovery mechanism.

Account Settings: Account administrators have access to the Account Settings workspace, where they can control configuration information. This workspace contains essential account details, including database settings and user permissions. Feature Configuration: The database setup enables administrators to review and configure settings for various features offered by the database. This includes customization options for compliance checks, automated workflows, and data import/export processes. Security Settings: The database's Security Settings encompass parameters related to session timeout, access controls, and data encryption.

These settings enhance the overall security of the database account. User Management: Administrators can access the User Management section to create, modify, or deactivate user accounts within the database. It also allows administrators to assign roles and permissions to users based on their responsibilities. Business Units: The database supports the creation of business units to manage data access and sharing. Administrators can define user roles within each business unit, control data access, and configure filter criteria for token holders. Alert Manager: The database's Alert Manager allows administrators to designate recipients for critical system alerts. In the event of system errors or issues, notifications are sent to specified email addresses, providing insights into the problem's nature. FTP Accounts: Administrators can assign FTP privileges to individuals or teams within the database account.

FTP accounts facilitate secure file transfers to and from the database, ensuring efficient data management. File Locations: File Locations in the database represent external file storage locations, such as cloud storage or FTP sites. Users can configure these locations to facilitate secure file transfers between the database and external repositories. Key Management: Key Management allows administrators to manage security keys and other encryption-related options. These keys are utilized for data encryption, message signing, and implementing secure single sign-on (SSO) for the database account.

Branding: Branding enables users to customize the look and feel of their database account. It allows for the application of branding elements, such as color schemes, based on uploaded logos, providing a branded user experience. Single Sign-On (SSO) Authentication: The database supports single sign-on (SSO) authentication via SAML 2.0. This feature allows third-party identity providers to authenticate users to both internal systems and the database, enhancing security and user convenience. Account Login Access: Account Login Access permits the database support to log in to user accounts for specific configurations or troubleshooting purposes. This feature streamlines support interactions and issue resolution.

SSL Certificates: SSL Certificates enhance security by encrypting page-based interactions. This ensures the confidentiality of sensitive information during interactions with subscribers and contacts. Setup provides a comprehensive framework for managing and configuring the database account effectively. From user management to security settings, this centralized location ensures that users can efficiently customize, monitor, and optimize their database experience while adhering to regulatory compliance requirements and best practices within the financial sector.

Figure 51:
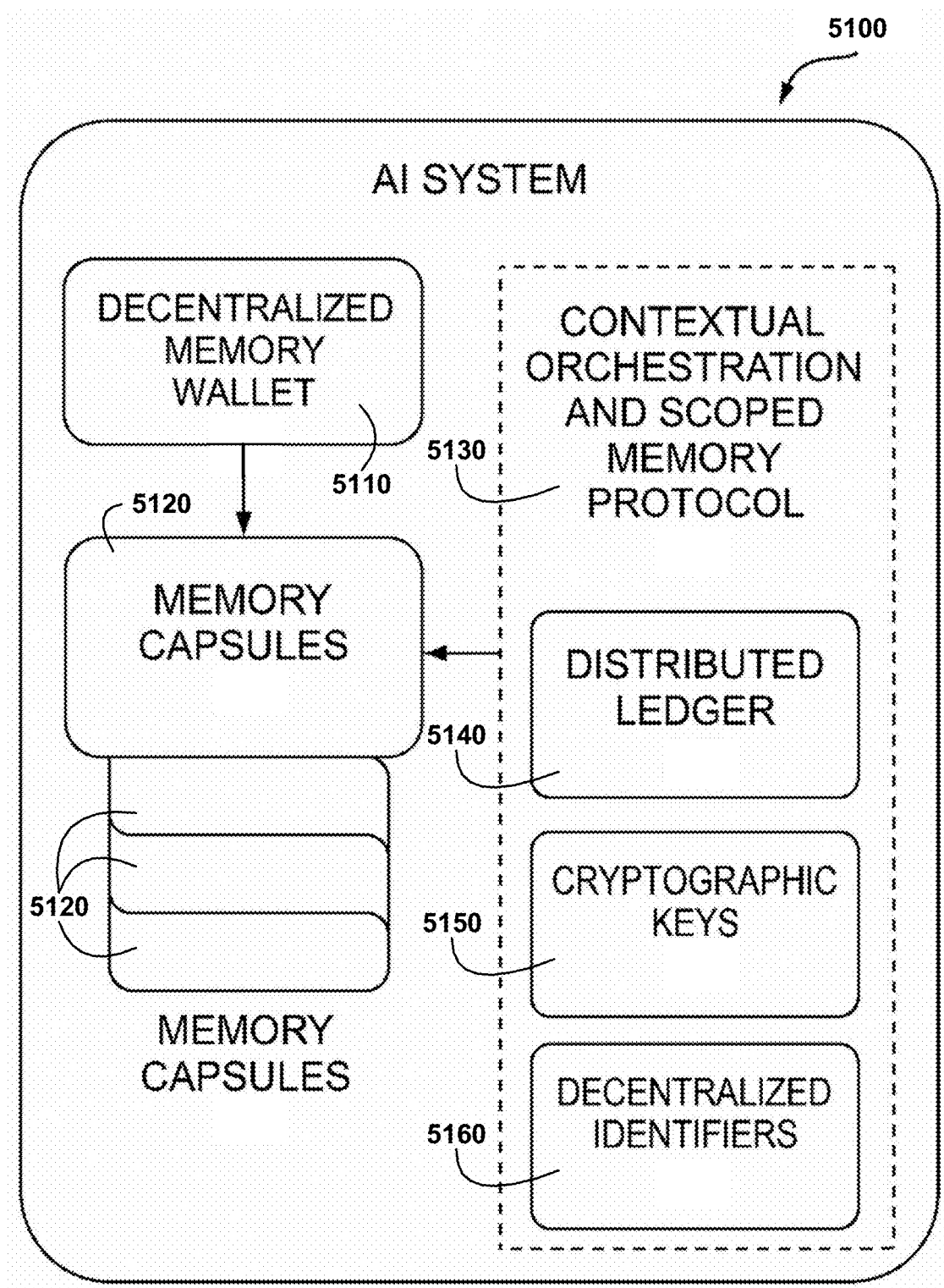
FIG. 51 shows a block diagram of an overview of an exemplary architecture of the Contextual Orchestration and Scoped Memory Protocol (COSMP) system of one embodiment.

FIG. 51 shows a block diagram of an exemplary architecture of the Contextual Orchestration and Scoped Memory Protocol (COSMP) system of one embodiment. FIG. 51 shows a Contextual Orchestration and Scoped Memory Protocol 5130 (COSMP) with a Decentralized Memory Wallet 5110 (DMW) to ensure that every AI memory access is controlled, minimal, and auditable. Memory capsules 5120 secure data containers with embedded access rules and tamper-evident logs 5400 of FIG. 54, a distributed ledger 5140 of verifiable AI knowledge. Private cryptographic keys 5150 and decentralized identifiers 5160 (DIDs) serve as credentials that gate access to memory capsules 5120 and orchestrate AI behavior according to policy. Every memory operation or decision by an AI agent becomes a signed transaction recorded on an immutable ledger, enabling after-the-fact verification and compliance checks via cryptographic proofs. The architecture provides a universal trust and governance layer for AI, applicable to domains ranging from national security and healthcare to autonomous systems, by enforcing rigorous access control, behavioral constraints, and privacy-preserving auditability within the AI's memory and decision processes. The system is specifically designed to integrate with and enhance Large Language Models (LLMs), transformer-based AI models, AI inference systems, generative models, adaptive agents, and other intelligence systems.

Memory capsules 5120 serve as the fundamental data units. A memory capsule 5120 is analogous to a token, but enriched with embedded governance. Each memory capsule 5120 contains not only data (knowledge or context for AI) but also its own access control rules and an internal log of usage. The memory capsule 5120 itself carries its metadata, context tags, and permissible-use graph. A unique cryptographic identifier (e.g., a hash or decentralized identifier 5160) for each memory capsule 5120, ensuring each knowledge element is individually verifiable and traceable.

Each user or AI agent is provisioned with their own decentralized memory wallet 5110 instance, which functions as a personal data store and access controller. The memory wallet 5110 is an active entity (software module or process) holding cryptographic key 5150 pairs and policy configurations for its owner. It directly manages that owner's memory capsules 5120. The decentralized identifier 5160 (DID) paradigm is employed: each memory wallet 5110 (and potentially each AI agent) has a DID linked to its public key, which serves as its credential and address in the system. This means identity and access control are handled via cryptographic keys 5150 enhancing security and user sovereignty over data of one embodiment.

The interactions between a user's decentralized memory wallet 5110 node, memory capsule 5120 storage/ledger, one or more AI agents, and the immutable audit ledger. Key components such as the contextual orchestration engine (COE) and cryptographic access control module are depicted in their operational context.

The COSMP framework role is fulfilled by a Contextual Orchestration Engine, sometimes referred to as the Scoped Context Builder (SCB). The orchestration engine dynamically determines which memory capsules 5120 need to be accessed by an AI agent in a given context or task. For example, the new orchestration engine might compile only the specific memory capsules 5120 an AI needs for a particular decision, based on context tags and scope policies. Every request to retrieve or modify memory capsules 5120 goes through this orchestration engine, which cryptographically authenticates the request (using the agent's keys or certificates) and checks it against the allowed scope defined in each memory capsule 5120. It ensures that an AI agent never sees data outside of what it is authorized and contextually permitted to see, a form of real-time, fine-grained data curation of one embodiment.

The interaction between the Decentralized Memory Wallet 5110 (DMW), the Contextual Orchestration and Scoped Memory Protocol (COSMP), and various AI agents, LLMs, and other intelligent systems. The DMW 5110 serves as a secure repository for memory capsules 5120, while the COSMP governs the access, retrieval, and management of these capsules based on the context 5200 of the AI agent's, LLM's, and other intelligent system operations.

Information is encapsulated into cryptographic memory capsules, which are data structures containing payload data (which could be anything from text, images, sensor readings, to model parameters), along with cryptographic metadata and embedded governance rules. A decentralized memory wallet 5110 contains multiple memory capsules 5120. Upon a verified AI agent request a memory capsule that is retrieved from the decentralized memory wallet 5110 for an AI agent request.

A cryptographically governed access control governs the transaction the AI agent performs or is disallowed. The AI system 5100 analyzes the context of the AI agent request to determine the cryptographically governed access control response to the AI agent request.

Each memory capsule includes, for example, a cryptographic header (with capsule ID, creator, timestamp), an access control graph or policy (defining who/what under what conditions can access the content), and an audit trail segment that logs modifications or accesses to that capsule. The capsule's content is encrypted (using keys managed by the memory wallet 5110) to prevent unauthorized reading. These capsules serve as the building blocks of the AI's knowledge base, replacing free-form memory storage with structured, self-describing units. Notably, every capsule carries tamper-evident structures (e.g., hashes of content and prior history), so any attempt to alter memory retrospectively would be detectable. This design ensures memory integrity: an AI agent can only obtain data from a capsule if it can satisfy the capsule's cryptographically enforced policy.

A high-level architecture of the COSMP system is shown. Each user or autonomous entity (which may be a human user, an AI agent acting on behalf of a user, an IoT device, or any digital actor) is associated with a Decentralized 5110 node. The memory wallet 5110 node comprises one or more processors, memory, and network interfaces, and is logically divided into functional modules including a cryptographic identity module, a policy store, a contextual orchestration engine, and a local cache for memory capsules. The identity module manages the entity's cryptographic keys (e.g., a public/private key pair) and may generate or register a Decentralized Identifier (DID) for the entity. The DID is a globally unique identifier (for example, in URL form like did: example: xxxx . . . ) that resolves (via a blockchain or distributed ledger, not shown) to a document containing the entity's public key and perhaps service endpoints. This allows any other component in the system to verify signatures made by this entity or encrypt data to this entity.

Connected to the memory wallet 5110 is a Memory Capsule Ledger (distributed storage). The memory capsule ledger represents the data store for all memory capsules associated with various entities. In one embodiment, the ledger is implemented as a decentralized storage network, such as a distributed hash table overlay, a content-addressable storage (CAS) system, or a blockchain-based data store—such that no single central server holds all capsules. Each memory capsule in the ledger is indexed by a cryptographic key or hash (its capsule ID) and may be replicated across multiple nodes for durability. The ledger ensures immutability and consistency of capsule data: for instance, by using hash-linked blocks or embedding the capsule records in a blockchain, the system guarantees that once a capsule or its version is written, it cannot be tampered with without invalidating a cryptographic hash chain. Multiple capsules, potentially belong to one or multiple memory wallets 5110.

The Contextual Orchestration Engine (COE) within the memory wallet 5110 is a key differentiator of this invention. It interfaces with AI agents (represented by an AI Agent module) that requests data. An AI agent could be any software requiring access to knowledge, for example, a machine learning model performing inference, a reasoning engine, or an autonomous control system's decision module. The AI agent communicates with its associated memory wallet 5110 by sending a memory access request. This request includes the agent's identity (which could be the agent's own DID or a token proving it is acting under a user's authority) and contextual information such as the task at hand or the type of data needed. For instance, an AI agent might specify "I need patient X's medical history for diagnosis" or a more generic "I need relevant knowledge about topic Y to answer a question."

Upon receiving a request, the COE initiates a Scoped Context Retrieval Process. The COE queries the policy store and potentially external metadata indices to determine which memory capsules might be relevant to the context described. Each memory capsule has associated metadata and tags (which could include topics, timestamps, source info, etc.) and importantly an embedded scope policy. The scope policy is essentially a set of rules or an access graph that specifics conditions under which the capsule's content can be accessed. The COE evaluates the context of the request against these policies. Only those capsules whose scope policy admits the requesting agent and deems the context appropriate will be considered "eligible."

For each eligible capsule, the COE further ensures that the agent 130 has presented valid cryptographic authorization. This is handled by the Cryptographic Access Control module (which can be considered part of or a service to the COE). The access control module verifies signatures on the request using the public key from the agent's DID or provided certificate. It also checks if a valid access token 2 is present. In one embodiment, before making a memory request, the AI agent must obtain an access token from the memory wallet 5110. To get this, the agent may have to prove its identity and perhaps the reason for access. The memory wallet (specifically, a token issuance component) would then issue a signed token specifying what the agent is allowed to do (e.g., "Agent A may read capsules of type Z for the next 10 minutes."). This token is attached to the request and is cryptographically verified by module. This mechanism ensures a second layer of control: even if an agent is in possession of certain credentials, it must still be explicitly granted a scoped permission by the wallet for each session, which can be tightly bounded in scope and time.

After authentication and policy vetting, the COE compiles the list of approved capsules and instructs the memory wallet to retrieve them from the capsule ledger. If the wallet has a local cache of recently used capsules, it may fetch from there; otherwise, it queries the distributed ledger (which might involve contacting one or more storage nodes or blockchain smart contracts). The capsules retrieved (still encrypted) are then decrypted using the memory wallet's private key (or a capsule-specific key that the wallet manages or has access to via key derivation). Importantly, even at this stage, partial access can be enforced: since each capsule's content might contain multiple data fields or sections with different sensitivities, the memory wallet can decrypt and release only the portions the agent is allowed to sec. For example, a capsule might contain a full document, but the policy allows the agent to see only certain sections or a summary, other parts remain encrypted or are redacted in the delivered result.

The resulting context data (information assembled from permitted capsule contents) is then delivered back to the AI agent. The memory wallet ensures that this context data is packaged in a way that the agent cannot accidentally or maliciously obtain more data than intended. This could involve, for instance, running the AI agent's code in a secure enclave or sandbox that only has access to the data provided and not the raw capsules themselves. However, implementation may vary; logically, the agent simply receives the data it requested, now filtered, and vetted.

Every step of this process is instrumented for audit. The Audit Logging module (depicted as part of memory wallet, but functionally could be integrated with a global ledger service) creates a record for the transaction. An Audit Ledger, which may be a blockchain network or any append-only log accessible to stakeholders. The audit record typically includes: the identity of the requester (e.g., agent DID), the identity of the memory wallet (user DID), what capsule IDs were accessed (or at least a cryptographic digest of them, if we don't want to reveal actual data references publicly), the time, and whether the access was read or write (and possibly what portion or bytes were delivered, as a hash). It will also include the signature of the memory wallet attesting to the event, and a link (hash pointer) to the previous log entry by that wallet or in that capsule's history, thereby forming a tamper-evident chain. If a blockchain is used, each access event could be a transaction on the chain, visible to permitted observers or regulators.

The security and trust guarantees achieved by this design are multifold. First, any agent's access to memory is explicitly authorized and limited—there is no way to bypass the wallet and directly query the data store, because the data is encrypted and only the wallet holds the keys. Second, there is a cryptographic record of everything important that happens, which can be independently verified. Third, by minimizing context, the system adheres to the principle of least privilege, reducing the risk of data leakage or misuse by AI components. And fourth, since each wallet is decentralized, compromise of one node does not directly jeopardize others; even in case of compromise, the audit trail and embedded policies can mitigate damage (for example, a stolen key can lead to revocation of certain capsules or a halt on that wallet's operations, using the system's oversight mechanisms).

Figure 52:
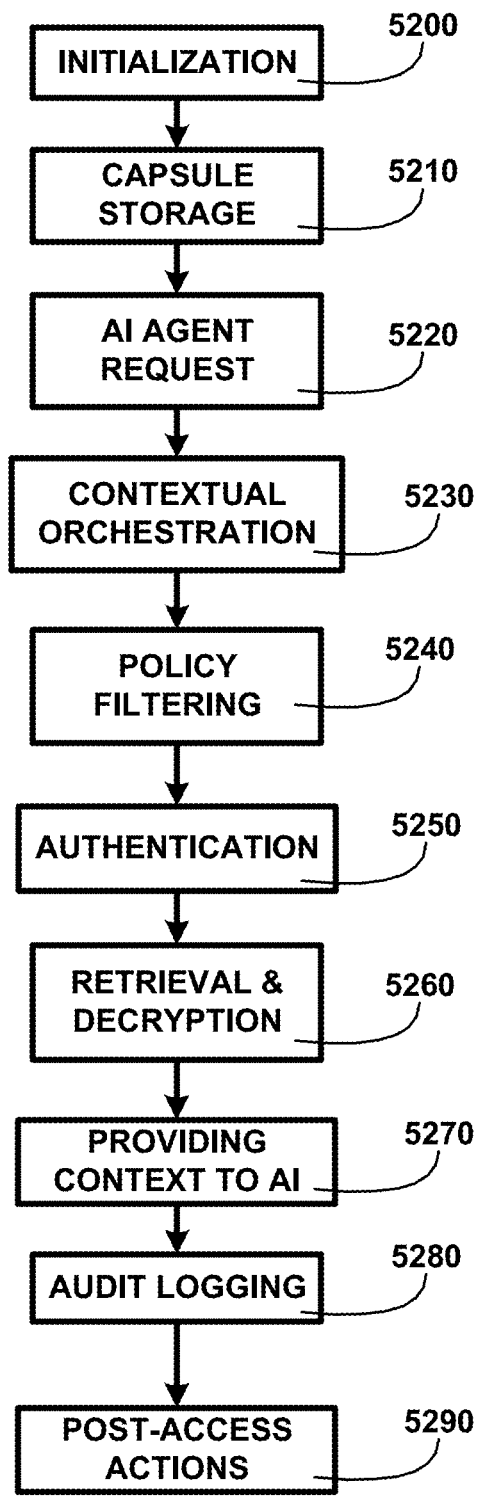
FIG. 52 shows a block diagram of an overview of a flow chart of a process for retrieving context-scoped memory for an AI agent using the invention of one embodiment.

FIG. 52 shows a block diagram of an overview flow chart of a process for retrieving context-scoped memory for an AI agent using the invention of one embodiment. FIG. 52 shows the flowchart details steps including agent authentication, context submission, relevant capsule selection, policy verification, decryption of allowed data, and audit logging of the transaction.

Initialization 5200 is performed before any memory access takes place; entities are set up in the system. This includes creating a memory wallet node for a user or AI (if not already existing). As part of this initialization, the wallet generates an asymmetric key pair (if one is not provided) and registers a DID on a suitable network. It also sets up initial policy data, for instance, default rules about who can access what kinds of capsules. Memory capsules can be pre-populated or will be created over time; initially, the wallet may be empty or loaded with some baseline knowledge capsules relevant to the user/agent.

Capsule storage 5210 in the memory wallet stores a plurality of encrypted memory capsules in the ledger. This can happen offline or prior to requests. Each capsule is created either by the user input, ingestion from external data (like uploading documents to the wallet), or dynamically by AI processes (learning outcomes). Regardless, the ledger has many capsules, each with embedded policies as described. The wallet knows the keys to decrypting them, and the policies define who can get what.

An AI agent request 5220 triggers a memory access by sending a request to its associated memory wallet. This request includes context about what it needs. For example, Agent X (with DID X) says, "I am performing Task Y under Role Z." The request is timestamped and signed with Agent X's private key (proving it indeed came from Agent X). If Agent X is a sub-agent of the user, it might also be accompanied by a token or certificate from the user's wallet indicating this agent is authorized to act. The wallet is receiving this request and beginning processing.

A contextual orchestration 5230 with the wallet's Contextual Orchestration Engine interprets the context and searches for relevant capsules. It might consult an index of capsule tags or metadata (the system can maintain an index mapping keywords to capsule IDs to speed this up). Suppose Agent X requested "information about device D's maintenance history." The wallet finds any capsule tagged with device D or maintenance records. It compiles a candidate list.

Policy filtering 5240 for each candidate capsule, the wallet evaluates the scope policy against Agent X's attributes and context. If Agent X's credentials (DID or role or token) do not satisfy the policy, that capsule is filtered out. Continuing the example, if device D's maintenance capsule has a policy "only accessible by users with Technician role and if emergency flag is true," and Agent X is a Technician and in emergency mode, it passes. If Agent X lacked the role, it would be denied. This step yields a subset of capsules that Agent X may access if all else is in order.

Authentication 5250 in parallel or just before delivering data, the wallet ensures all cryptographic checks are passed. Step 206 involves verifying the agent's identity credential. The agent's signature on the request is verified using the agent's public key (retrieved via DID resolution perhaps). If a separate access token was needed, the wallet verifies that token is valid (correctly signed by this wallet earlier, not expired, scope matches the request). Only if these checks succeed does the process continue.

Retrieval & decryption 5260 from the wallet now fetches the needed capsules from the memory capsule ledger. It might retrieve the full encrypted content of, say, capsule A and capsule B. Using its internal keys, the wallet decrypts these. If the capsule content is large or partially restricted, the wallet extracts only the portions relevant to the request. For instance, if the request context only needs data from last year, the wallet might parse the capsule and only decrypt the sections that fall under that date range if the policy allows that segmentation. The outcome of step 207 is that the wallet has in-memory the data information that Agent X is permitted to sec.

Providing context to AI 5270 from the wallet transfers the allowed information back to the AI agent. This could be via a direct data response or by loading it into a secure shared memory or environment that the agent can read. The key is that the agent receives exactly what was authorized, no more, no less. The agent then continues its task using this memory. From the agent's perspective, it made a request and got data, somewhat analogous to calling an API or database but with the difference that the data has been vetted and possibly pruned by the wallet.

Audit logging 5280 concurrently or immediately after delivering the data, the memory wallet creates an audit entry. In step 209, it records the details of the transaction into the immutable audit ledger. If using a blockchain, it might create a transaction including: "Wallet X gave Agent X data from Capsule A (hash) and Capsule B (hash) at time T for purpose Y" and sign it. If using a simpler log, it appends a line with similar info and links it via hash to the previous line. Optionally, the agent might also log that it received data (the agent could have its own log for transparency, but the primary source of truth is the wallet's log).

Post-access actions 5290 after the main flow, there could be additional steps depending on system configuration. For instance, if the capsule was marked as sensitive, the system might trigger an alert to the owner that their data was accessed (imagine a user gets a notification that "Your data capsule X was accessed by Agent Y for Task Z."). Or if the policy requires it, the capsule might self-update (e.g., increment a counter of how many times accessed, or if it was one-time-use, perhaps the capsule is now locked until re-authorized). Also, this step covers any cleanup like releasing the temporary decrypted data from memory after use to avoid lingering data in the system.

It should be noted that the above flow is just one typical scenario (read access). A similar set of steps applies for writing or updating operations: an agent might request to update a memory capsule (e.g., an AI learning component wants to store new knowledge). In that case, the policy check would ensure the agent has written permission, and the audit log would record the new version creation.

The system is robust against failures as well: if at any point a check fails (say the agent is not authorized or the capsule is not found), the wallet will deny the request, and optionally log an attempted access (which could be important to detect potential intrusion or misbehavior). Because everything is cryptographically tied to identities, malicious agents cannot spoof others or hide their actions easily.

Figure 53:
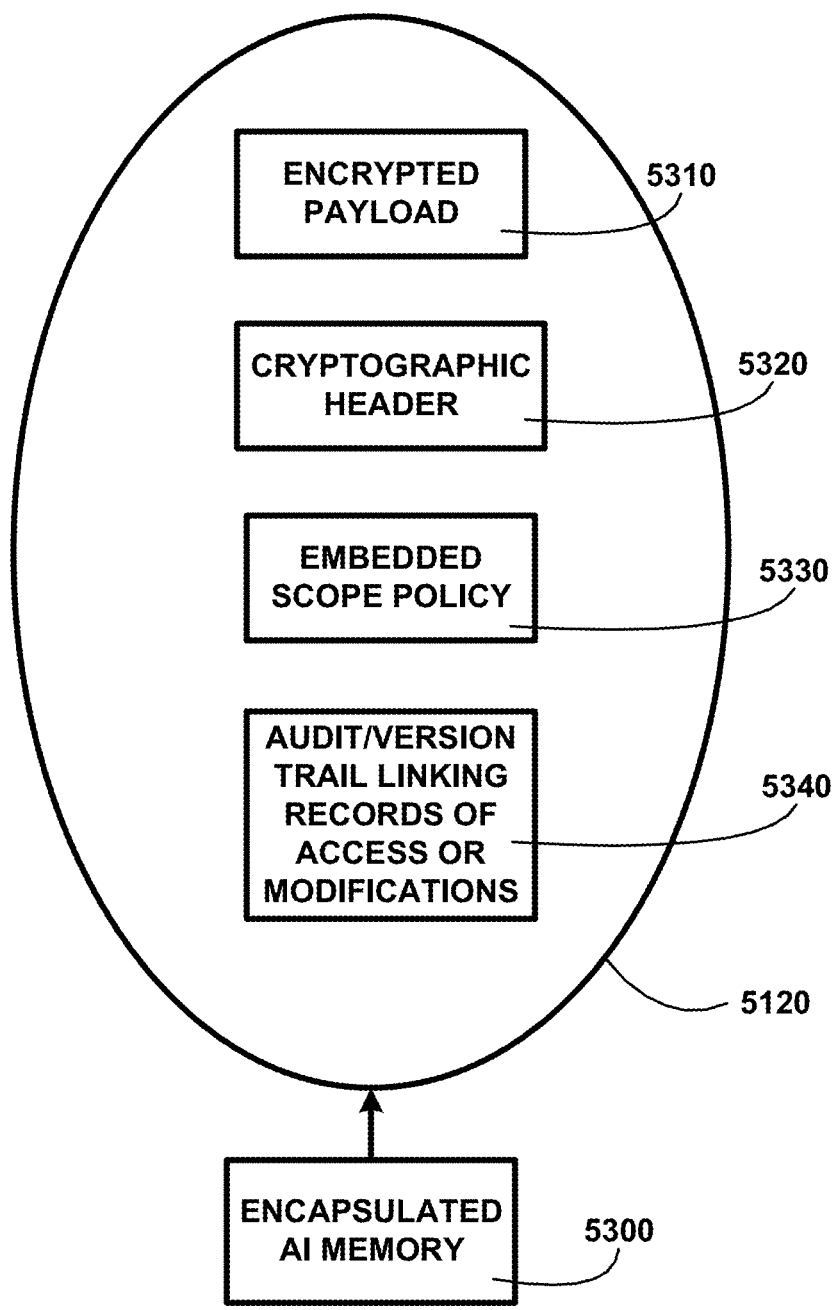
FIG. 53 shows a block diagram of an overview of a schematic representation of a memory capsule structure of one embodiment.

FIG. 53 shows a block diagram of an overview of a schematic representation of a memory capsule structure of one embodiment. FIG. 53 shows the internal encapsulated AI memory 5300 components of a memory capsule 5120, including the encrypted payload 5310, cryptographic header 5320, embedded scope policy 5330 (access control graph), and the audit/version trail linking records of access or modifications 5340.

Memory capsule 5120 is illustrated in an expanded form to show its internal structure. At a high level, a memory capsule 5120 can be thought of as a specialized file or object with layered security and metadata. The major components of memory capsule 5120 include:

Cryptographic header 5320: This section contains identifying and administrative information, all cryptographically secured. It may include a unique capsule ID (for instance, a SHA-256 hash of the capsule's original content or a UUID signed by the creator's key), the owner DID (who owns this capsule's data, typically the user or entity whose memory wallet created it), a content hash or Merkle root (to ensure integrity of the content), timestamps (creation time, last update time), and perhaps a type or category label (e.g., "personal data", "financial record", "image", "model output" etc.). The cryptographic header 5320 is digitally signed by the creator or issuing memory wallet, attesting that the memory capsule 5120 is authentic within the system. In some embodiments, the cryptographic header 5320 may also include a small set of data tags or descriptors that help the orchestration engine quickly identify relevant capsules (for example, keywords or vectors for semantic search). These tags can be public or encrypted depending on privacy needs.

Encrypted payload 5310: This is the actual content of the memory capsule 5120, encrypted with a symmetric key (or combination of keys) that is managed by the memory wallet. The payload can be arbitrarily large or structured (it could contain a single datum or a complex nested data structure). Because it is encrypted, even if the capsule ledger is public or semi-public (e.g., a blockchain), the raw content is protected from unauthorized eyes. Only the rightful memory wallet or an authorized delegate (with the proper keys and fulfilling the policy) can decrypt it. Notably, the payload might be segmented internally such that different parts could be encrypted with different keys or under different conditions, enabling partial disclosure. For example, the capsule might contain both a summary and detailed data, where the summary is encrypted with a key that a wider range of roles have, while details require a more privileged key. This design ties in with hierarchical access in the policy.

Embedded scope policy 5330: This is a defining feature of the invention, each memory capsule 5120 carries its own access control policy in a computational form. The policy can be represented as a directed acyclic graph (DAG) or another logical structure (such as a tree of rules, a Boolean circuit, or a script) that must be evaluated when access is requested. In general, the nodes in a graph represent conditions or actors (such as roles, specific DIDs, or contextual prerequisites), and the edges represent the logical relationships (such as inheritance or AND/OR conditions) between these conditions. The acyclic nature ensures there are no circular dependencies in defining access.

When an AI agent's request comes in, the orchestration engine/map will check this graph: starting from a root node representing the content, it will traverse allowed edges based on the agent's attributes (for instance, an edge might allow access if (AgentRole==Doctor) AND (Purpose==Treatment)). If a path through the graph satisfies all conditions, the agent is granted access to the content (or a portion thereof, if the graph is segmented by content part). The graph may also encode dynamic constraints: for example, a node could represent a time constraint ("current date is before Jan. 1, 2026") or a quantitative limit ("this capsule can only be accessed 5 times per day."). These policies are cryptographically bound to the capsule such that they cannot be removed or altered without invalidating the capsule's signature or hash. In some embodiments, the policy graph is written in a high-level policy language or a smart contract code that the memory wallet interprets or even executes in a secure sandbox to decide access.

The presence of a rich, per-capsule policy mechanism is a major evolution from prior systems that might have relied on external ACL databases or coarse-grained roles; here the policy travels with the data itself, ensuring contextual enforcement at the point of use, of access or modifications 5340: Each memory capsule 5120 contains references to its own history of use and modifications 5340. Rather than (or in addition to) storing all audit logs globally, each memory capsule 5120 can carry a summarized log or cryptographic accumulators of its access events. For example, audit/version trail linking records could include the hash of the last access event that touched this capsule, which in turn links to the one before it, and so forth, forming a chain local to the capsule.

It may also list version identifiers: if the capsule has been updated, version v1, v2, v3 . . . each have their content hashes and perhaps differences or pointers stored here. This way, if a capsule is fetched, one can not only get its current state but also a secure reference to its prior states and usage. The memory wallet uses this information in conjunction with the global audit ledger to reconcile and verify that all expected events are accounted for. For instance, if a capsule's internal audit trail says it was accessed yesterday at 3 PM by agent X, one should find a corresponding entry in the global ledger.

If not, that discrepancy indicates potential tampering or loss of data. The version metadata allows roll-back or fork tracking; an update might be, for example, that an AI learning agent has refined some knowledge in the capsule (say updated a summary or corrected a fact), the old version is still referenced for accountability, and possibly kept if needed for compliance (some regulations require retaining historical model decisions, etc.).

Cryptographic proofs are an optional extension: In some embodiments, a capsule can include pre-computed zero-knowledge proofs or other cryptographic constructs that help in verification. For example, if a capsule contains sensitive data, it might also contain a zk-SNARK that proves some property about the data without revealing it (perhaps used in regulated scenarios to prove the data meets certain criteria or that an operation was done correctly). Another example: a memory capsule 5120 that has an encrypted value can carry a non-interactive zero-knowledge proof that a certain update adhered to a rule (like "I, the user, prove I have rights to modify this capsule's content according to policy, without showing you my credential again").

While these are advanced features not necessarily needed for base functionality, the architecture anticipates their use to bolster trust when memory capsules 5120 are shared or audited by third parties who cannot see the data. These proofs tie into the privacy-preserving aspect mentioned: e.g., a capsule might allow an external auditor to verify via a proof that the capsule's use complied with law X, without revealing the data inside.

In operation, when the memory wallet 5110 processes an access request for a particular capsule, it will utilize the capsule's own scope policy combined with the system's context to make a decision. If granted, it might then update the audit trail 340 of that capsule to reflect this access (e.g., append the new access event hash). If the capsule is modified, a new version gets created; the old version's hash is recorded and the new version's hash becomes the capsule's current ID (with pointers maintained). The global audit ledger also gets an entry for this event, possibly referencing the capsule ID and new version ID. In this manner, at both micro (capsule-level) and macro (system-level), every change is cryptographically tracked.

Figure 54:
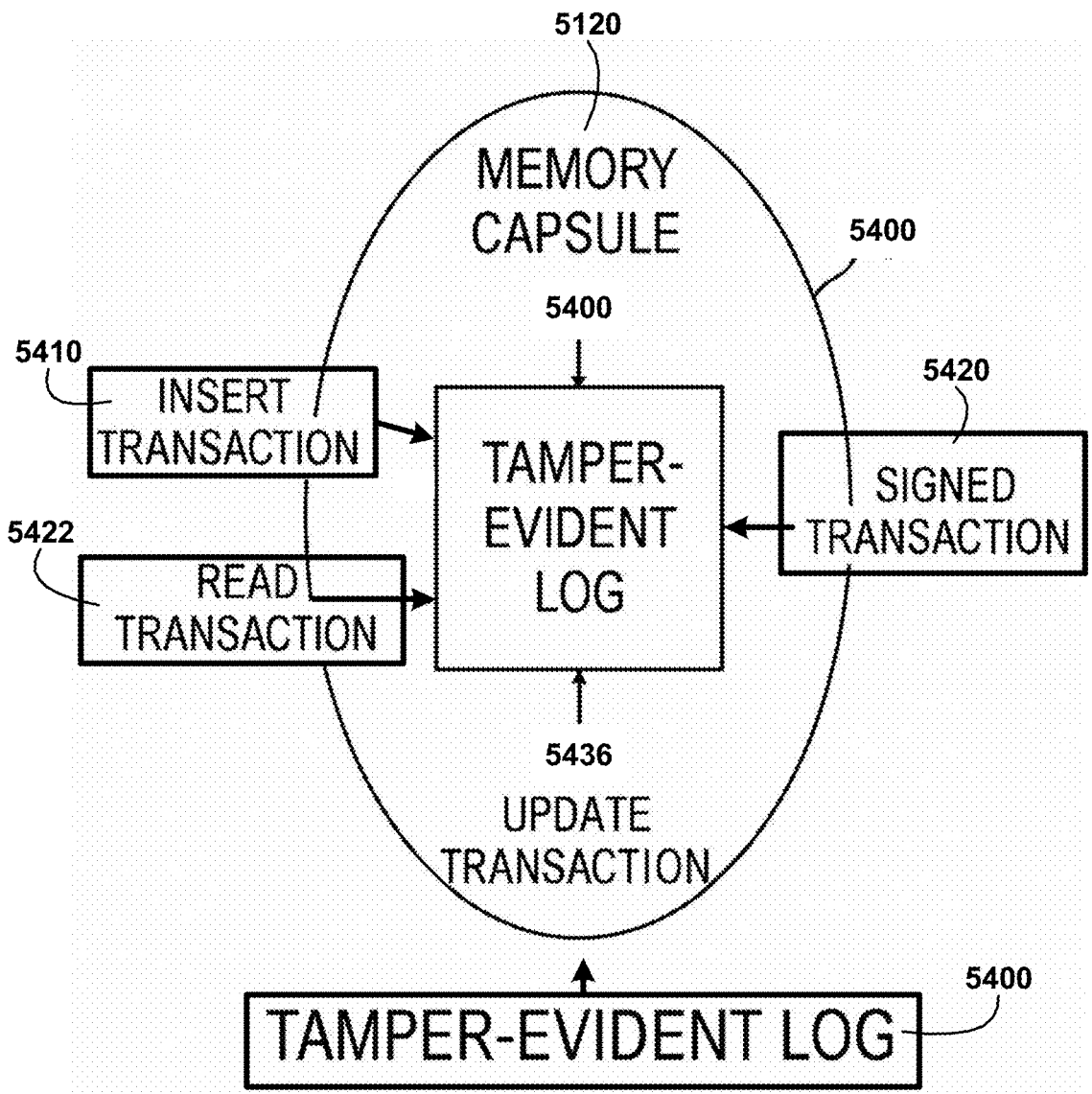
FIG. 54 shows a block diagram of an overview of a scoped access control graph (policy DAG) for a memory capsule of one embodiment.

FIG. 54 shows a block diagram of an overview of an AI memory audit ledger of one embodiment. FIG. 54 shows an AI memory audit ledger is an immutable audit ledger for AI memory interactions. Every time an AI agent accesses a memory capsule, attempts an operation, or updates a capsule, a transaction entry is recorded in a tamper-evident log 5400 (which can be blockchain-based or an equivalent hash-linked ledger). Each entry includes details such as the agent identity (via DID or public key), timestamp, memory capsule ID, action performed, and cryptographic hashes linking it to prior events. This creates an unbroken chain of custody for the AI's knowledge and actions. Just as the previous ledger ensured accountability for token transfers, the new ledger provides accountability for cognitive transactions—i.e., how an AI's knowledge state changes over time. This audit trail is crucial for post hoc analysis, regulatory compliance (proving the AI did or did not use certain information), and forensic investigation of incidents (e.g., explaining why an autonomous vehicle made a decision based on the memory it accessed).

The AI memory audit ledger includes a tamper-evident log 5400. The tamper-evident log 5400 is stored in the memory capsule 5120. The action performed includes at least an insert transaction 5410, a read transaction 5422, and signed transaction 5420. Another action performed is an update transaction 5436 for previous transactions.

Beyond controlling data access, the COSMP architecture inherently supports governance of AI behavior by virtue of controlling the information an AI can utilize and by monitoring its requests. Many AI failures or undesirable behaviors can be traced to them having access to inappropriate information or failing to follow certain constraints. By integrating a governance layer at the memory and decision input level, the invention helps enforce behavior indirectly but powerfully. Descriptions follow of some mechanisms for behavioral constraint and policy enforcement.

Policy-driven memory scoping includes if an AI agent is intended to operate only within certain bounds (for example, a medical diagnosis AI should not access non-medical personal data, or a military AI should not target non-combatants), these rules can be encoded as policies in the relevant memory capsules or the wallet's global policy. Thus, the agent will simply never be given disallowed information (e.g., the military AI's target identification capsule might exclude friendlies by design and never supply such data to the targeting algorithm). By shaping the input, we shape the behavior outcome space. In effect, the AI is sandboxed by the knowledge it can and cannot obtain.

The system includes real-time oversight of AI requests. The memory wallet sees every request an AI agent makes for data. This provides an opportunity to detect and intervene if an agent's pattern of requests itself is suspicious or violates a governance rule. For instance, if an AI starts requesting an unusual combination of capsules that it should not (potentially indicating it is trying to circumvent a constraint or has been compromised), the wallet can flag this or even refuse those requests. The policy store can include meta-policies about request patterns ("if Agent attempts to access high-sensitive capsule more than twice in a minute, throttle or alert"). This is analogous to an intrusion detection system built into the agent's own memory supply chain.

The audit ledger not only logs memory accesses but can be extended to log certain actions of the AI if those are reported back to the wallet in behavioral logs and accountability. For example, if the AI agent, after processing data, commits some decision (like executing a trade or firing a weapon or prescribing a medication), that decision event can also be used to be signed and logged via the wallet. The wallet might enforce that the agent attaches a reference to the memory capsules that informed that decision (closing the loop on provenance: "Action X was taken, and it was based on Capsules A, B, C)." This kind of design would require the AI to route its critical outputs through a signed channel. While not strictly necessary for memory management, it complements the system's goal of end-to-end accountability and may be needed in certain regulated uses. The existence of such logs means that after-the-fact, one can audit not only what data was seen but what the AI did with it.

Revocation and emergency braking are included in the system to provide mechanisms to enforce changes in behavior by revoking access. If at any point an entity should no longer have certain knowledge (say an employee AI agent leaves an organization, or a certain data is discovered to be corrupted or disallowed), the memory wallet can render capsules inaccessible by, for instance, destroying the decryption key or updating the policy to a state that no one can satisfy (or simply deleting the capsule and noting that in ledger). Because each capsule's access requires checking current policy, the next time any agent tries, it will be denied if revocation occurred.

Additionally, memory capsules 5120 or tokens issued to agents can have short lifespans, so if not renewed, they naturally expire, limiting long-term unchecked use of information. In urgent cases, an administrator could put a wallet in a lockdown mode where all current tokens are invalidated and only a minimal safe set of capsules can be accessed until further notice. These controls act as a brake on AI behavior, ensuring that if an AI is misbehaving or conditions change, its informational inputs (and thereby its actions) can be curtailed swiftly.

The architecture aligns with zero-trust and verification of compliance principles, meaning no component is implicitly trusted without verification. From a governance perspective, this enables independent checks. For example, a regulator or third-party auditor could be granted access to the audit ledger (or a filtered view of it) and maybe even to certain zero-knowledge proofs emitted by the system, to verify compliance with regulations. One might imagine an AI system 5100 of FIG. 51 in healthcare proving to auditors that it never accessed a patient's genetic data capsule when making a diagnosis (because that would be illegal without consent). The proof could be a zero-knowledge proof generated by the wallet that shows "in the set of audit logs for this query session, none involve capsule ID X (the genetic data capsule)", without revealing anything else about the query. By providing such cryptographic evidence, the system does not require blind trust even from oversight bodies.

Figure 55:
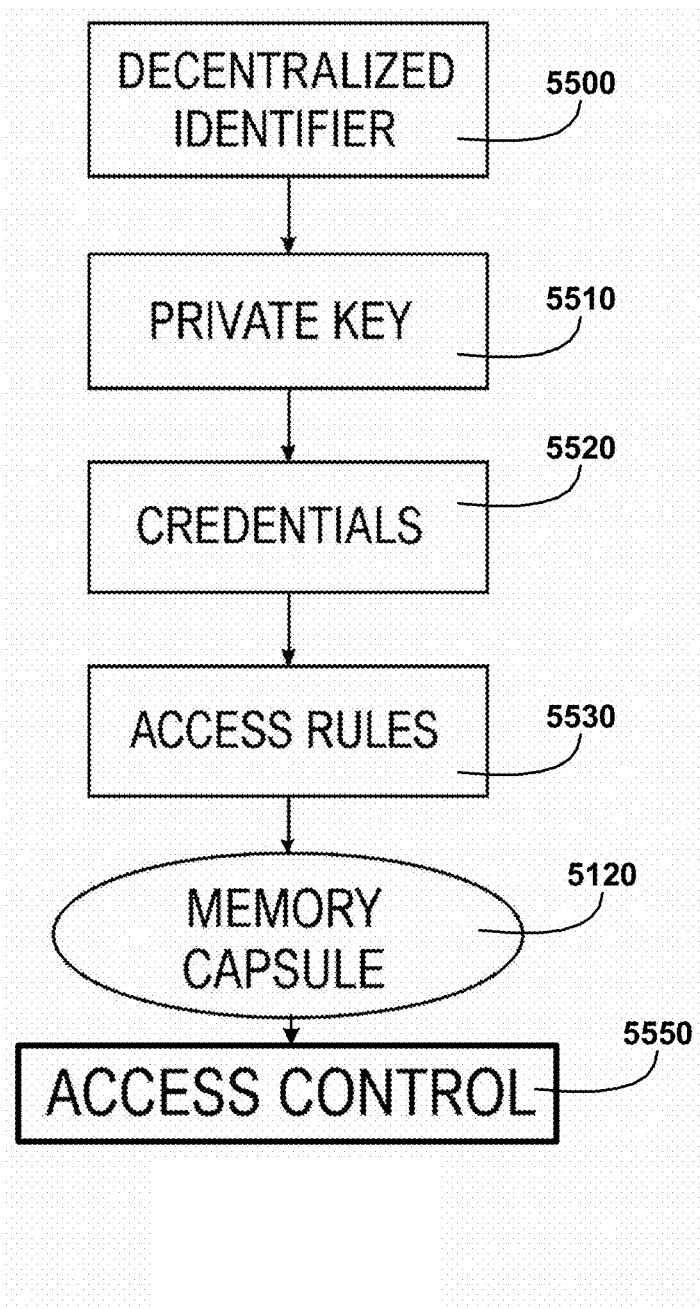
FIG. 55 shows a block diagram of an overview of a use-case diagram applications in different domains of one embodiment.

FIG. 55 shows a block diagram of an overview of a use-case diagram applications in different domains of one embodiment. FIG. 55 shows sub-figures or annotated sections that illustrate scenarios such as: (a) an autonomous vehicle's AI using a DMW to access map data under safety constraints; (b) a healthcare AI system 5100 of FIG. 51 sharing patient memory capsules between hospitals with cryptographic consent and audit; and (c) an AI-driven financial system proving compliance to a regulator via the audit ledger and zero-knowledge proof of policy adherence.

The identity module manages the entity's cryptographic keys (e.g., a public/private key 5510 pair) and may generate or register a Decentralized Identifier 5500 (DID) for the entity. The DID 5500 is a globally unique identifier (for example, in URL form like (DID: example: xxxx . . . ) that resolves (via a blockchain or distributed ledger, not shown) to a document containing the entity's public key and perhaps service endpoints. The request is timestamped and signed with Agent X's private key 5510 (proving it indeed came from Agent X).

Credentials 5520. This mechanism ensures a second layer of control: even if an agent is in possession of certain credentials 5520, it must still be explicitly granted a scoped permission by the wallet for each session, which can be tightly bounded in scope and time.

Cryptographic Access Control and Authentication: Every interaction with memory capsule 5120 is gated by cryptographic checks. When an AI agent requests access, the cryptographic access control 5550 module verifies the agent's identity and permissions. This can involve verifying a decentralized identifier (DID) signature or a signed token/certificate presented by the agent in accordance with access rules 5530. For added security, the system can require the agent to obtain a time-limited access token from its memory wallet prior to each memory request, where the token encodes the approved scope (which memory capsules 5120 or type of data the agent may access and for what purpose). The contextual orchestration engine will validate this token's signature and scope against the actual request. In sum, private keys 5510 and DIDs serve as the gatekeepers: only entities that can prove their identity cryptographically (matching a known key/DID with rights) can retrieve or modify memory capsules, and even then, only according to the memory capsule's 5120 specific rules. This prevents impersonation and unauthorized data access at a fundamental level.

While the Decentralized Memory Wallet (DMW) system described herein may leverage blockchain and distributed ledger technologies (DLTs) in certain embodiments to achieve cryptographic verification and immutable audit trails, the core innovation resides in the contextual orchestration engine's dynamic selection of storage and execution mechanisms based on real-time operational requirements. The DMW's technical architecture enables intelligent routing between multiple implementation backends while maintaining the fundamental guarantees of memory capsule integrity through the following components:

Adaptive Audit Trail System: The contextual orchestration engine within the DMW dynamically selects between blockchain-based immutable logs and alternative tamper-evident systems (including Merkle tree structures, hardware security module (HSM) backed logs, or trusted execution environment (TEE) chains) based on latency requirements, regulatory constraints, and security context. The selection algorithm evaluates memory capsule sensitivity scores derived from the embedded scope policy and access frequency patterns to optimize between decentralized verification and performance requirements while maintaining the audit trail integrity.

Policy Execution Framework: The system's embedded scope policy enforcement dynamically instantiates either blockchain smart contracts or secure computation engines based on the directed acyclic graph (DAG) complexity metrics and real-time performance demands. The contextual orchestration engine measures policy graph complexity as defined in the memory capsule's access control structure, expected execution frequency, and trust guarantees to route enforcement through the optimal execution path while maintaining cryptographic proof of correct policy application consistent with suitable access control mechanisms.

Incentive Mechanism Abstraction: The DMW's reward distribution system, building upon the yield mechanisms described in the parent application, abstracts value exchange through a unified interface that contextually selects between blockchain tokens, traditional payment rails, or reputation-based systems. The selection criteria include transaction volume thresholds, regulatory jurisdiction detection, and user preference profiles managed through the human control mechanisms, enabling seamless value transfer across heterogeneous economic systems while maintaining auditability.

Identity Verification Layer: The system implements a multi-modal identity framework extending the DID infrastructure where the contextual orchestration engine selects appropriate credential verification based on assurance level requirements. High-security contexts trigger blockchain DID verification, while performance-critical paths may utilize federated credentials or hardware-backed attestation, with all paths generating equivalent cryptographic proofs of authentication that satisfy the cryptographic access control module requirements.

Hybrid Storage Orchestration: Memory capsule storage dynamically distributes between decentralized networks (e.g., IPFS, Arweave as mentioned in the distributed storage discussion) and high-performance encrypted databases based on access pattern prediction, data lifecycle stage, and compliance requirements. The orchestration engine maintains the cryptographic integrity of memory capsules across storage tiers through unified capsule addressing using the unique cryptographic identifiers and cross-tier synchronization protocols that preserve the tamper-evident properties.

Technical Advantages: The DMW's dynamic implementation selection provides unexpected technical benefits including: (a) reduced memory access latency through intelligent caching that exploits complementary characteristics of blockchain and traditional storage while maintaining memory capsule integrity; (b) cryptographic proof generation that maintains validity across heterogeneous implementation boundaries through the unified verification protocols inherent in the DMW architecture; and (c) adaptive security postures that dynamically respond to detected threats while preserving the human control mechanisms. These synergistic effects demonstrate that the flexible DMW architecture achieves performance and security characteristics distinct from static blockchain-only or database-only implementations, while maintaining the core guarantees of contextual memory management, cryptographic access control, and auditable AI behavior that define the invention.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A cryptographically governed system for contextual memory management in artificial intelligence, comprising:
   a decentralized memory wallet node associated with an entity, executing on a networked computing device, including a processor and memory storing a cryptographic key pair and access policies, configured to generate a decentralized identifier (DID) and manage data for the entity;
   a memory capsule ledger, implemented on a distributed ledger system, coupled to the wallet node, storing encrypted memory capsules each containing entity data, a scope policy defining access conditions, a unique cryptographic ID, and a tamper-evident modification record;
   a contextual orchestration engine on the wallet node, configured to receive from an AI system a memory request with task context and identity credentials, and to identify, based on scope policies, a subset of capsules relevant and authorized for access;
   a cryptographic access control module verifying each request by authenticating identity via DID or public key and enforcing policy compliance using access tokens or attributes;
   a secure memory retrieval component configured to retrieve and decrypt, using the wallet node's key, authorized portions of each capsule while leaving unauthorized data encrypted;
   an immutable audit logging mechanism stored on a tamper-resistant cryptographic ledger, recording each access event in an append-only format, including AI identity, accessed capsules, and event details, with cryptographic hashes linking to prior events; and
   wherein the cryptographically governed system provides only context-relevant memory under cryptographic control and ensures authenticated, immutable tracking of all memory access or modifications.

2. The system of claim 1, wherein each memory capsule's embedded scope policy comprises a directed acyclic graph (DAG) of access permissions including nodes representing roles, attributes, and contextual conditions and edges representing logical relationships among said nodes, such that the contextual orchestration engine grants access to the memory capsule only if the artificial intelligence system's verified identity and context fulfill a path through the DAG that authorizes disclosure of the capsule's content.

3. The system of claim 1, wherein each memory capsule further maintains an internal audit trail and version history embedded within the memory capsule, including cryptographic hashes of past access events and previous versions of the capsule's data, and wherein the memory wallet node updates this internal audit trail upon each authorized access or update of the capsule, thereby enabling reconstruction of the capsule's state changes over time and detection of any unauthorized tampering with memory capsule content.

4. The system of claim 1, wherein the memory capsule ledger is implemented as a distributed ledger or blockchain network comprising a plurality of storage nodes, such that the integrity of stored memory capsules and their access logs is preserved even if a subset of the storage nodes is compromised, all memory capsule records being hash-linked or block-chained to prevent undetected alteration, and all capsule data at rest remaining encrypted under keys managed by the memory wallet node.

5. The system of claim 1, wherein the cryptographic access control module requires that each request from the artificial intelligence system be accompanied by a signed access token or certificate issued by the memory wallet node, details of the access event token specifying a scope of allowed memory access and a validity duration for that artificial intelligence system, and wherein the contextual orchestration engine is configured to validate a signature and contents of said access token before retrieving any memory capsule, such that no artificial intelligence system can access the memory capsule ledger without presenting a valid, wallet-issued proof of authorization tied to that specific context.

6. The system of claim 1, wherein the memory wallet node is configurable in multiple operational modes that govern data sharing and privacy, including at least: a private mode, in which all memory capsules and AI interactions are kept local to the memory wallet node with no synchronization to external nodes except for audit logging, thereby maximizing data sovereignty and isolation; and a collaborative mode, in which designated memory capsules are shareable with other memory wallet nodes or external AI agents under predefined scope limitations and time-limited access rules, the memory wallet node being operable to switch between modes based on user input or contextual triggers while continuously enforcing audit logging and scope policies regardless of mode.

7. The system of claim 1, further comprising a hybrid memory management subsystem in which the memory wallet node utilizes a tiered storage approach for the memory capsules, such that frequently used or real-time context data is cached in a local memory store of the wallet node (ephemeral memory cache) and long-term or less frequently used memory capsules are stored in the distributed memory capsule ledger (persistent decentralized storage), wherein the system dynamically balances performance and security by caching decryptable capsule content locally only as needed and purging or re-encrypting it after use, under the governance of the embedded policies.

8. The system of claim 1, further comprising a zero-knowledge proof module configured to generate cryptographic proofs of compliance with predetermined rules without revealing underlying memory content, wherein the audit logging mechanism or the memory wallet node produces, for one or more memory access events, a zero-knowledge proof attesting that the artificial intelligence system's interactions satisfied specific constraints or did not include disallowed data, such proof being verifiable by an external auditor or regulatory system to confirm the AI system's compliance with privacy or usage policies without accessing the raw memory data.

9. The system of claim 1, wherein the artificial intelligence system's identity credential comprises a decentralized identifier (DID) and associated public key identifying the artificial intelligence system or its human owner, and wherein the scope policy of at least one memory capsule explicitly references one or more DIDs or DID attributes, such that only an artificial intelligence system presenting a credential that matches the referenced DID (or satisfies associated attribute conditions, such as belonging to a certain organization or trust domain) can gain access to that memory capsule.

10. The system of claim 1, wherein the embedded scope policy of at least one memory capsule includes a revocation or expiration condition that can disable access to the capsule after a certain event, wherein the memory wallet node is further configured to receive revocation commands or trigger conditions (originating from the capsule owner or an external governance service) and in response update the capsule's scope policy or cryptographic keys to revoke access, thereby preventing any subsequent artificial intelligence system from decrypting or using that capsule unless re-authorized by an updated policy.

11. The system of claim 1, wherein the contextual orchestration engine is further configured to enforce context minimization, such that if multiple memory capsules contain overlapping or duplicate information, the engine selects only the minimal set or the lowest sensitivity capsule necessary to satisfy the artificial intelligence system's request, and if an artificial intelligence system requests a broader scope of data than necessary, the engine automatically filters out any extraneous memory capsules, thereby reducing data exposure and focusing the artificial intelligence system on a constrained context relevant to its task.

12. A cryptographically governed system for contextual memory management in artificial intelligence, comprising:
a decentralized memory wallet node associated with an entity, wherein the decentralized memory wallet node includes a processor and a memory storing an asymmetric cryptographic key pair and a set of access policies, the memory wallet node configured to generate a decentralized identifier (DID) for the associated entity and to securely manage data on behalf of the entity;
a memory capsule ledger communicatively coupled to the memory wallet node, wherein the memory capsule ledger stores a plurality of encrypted memory capsules, each memory capsule containing data associated with data associated with the entity and including an embedded scope policy that specifies authorized access conditions for that capsule, each memory capsule being identified by a unique cryptographic identifier and having a tamper-evident record of modifications;
a contextual orchestration engine executing on the memory wallet node, the contextual orchestration engine configured to receive from an artificial intelligence system a request for memory data that includes contextual information about the artificial intelligence system's task and an identity credential of the artificial intelligence system, and further configured to determine, based on the received contextual information and the embedded scope policies of the plurality of memory capsules of the memory capsules, a subset of the plurality of encrypted memory capsules stored in the memory capsule ledger that are relevant to the request and permissible for access by the artificial intelligence system;
a cryptographic access control module integrated with the contextual orchestration engine, wherein the cryptographic access control module requires that each request from the artificial intelligence system be cryptographically authenticated, wherein details of the access event control module verifies the artificial intelligence system's identity credential using the DID or public key of the artificial intelligence system and enforces compliance with the scope policy of each memory capsule in the subset by validating that the artificial intelligence system's attributes or presented access token satisfy access conditions embedded in each such memory capsule;
a hybrid memory management subsystem in which the memory wallet node utilizes a tiered storage approach for the memory capsules, such that frequently used or real-time context data is cached in a local memory store of the wallet node (ephemeral memory cache) and long-term or less frequently used memory capsules are stored in the distributed memory capsule ledger (persistent decentralized storage), wherein the system dynamically balances performance and security by caching decryptable capsule content locally only as needed and purging or re-encrypting it after use, under the governance of the embedded policies;
a secure memory retrieval component configured to retrieve the determined subset of encrypted memory capsules from the memory capsule ledger and decrypt, using the memory wallet node's cryptographic key, at least a portion of each retrieved memory capsule to produce context-specific contents of memory data for the artificial intelligence system, wherein any portion of a memory capsule that is outside of a portion outside of the authorized scope for the artificial intelligence system remains encrypted or inaccessible; and
an immutable audit logging mechanism configured to record a memory access event for each memory access request in an append-only audit ledger, each memory access event including information identifying the artificial intelligence system, the memory capsules accessed by the artificial intelligence system, and details of details of the access event, wherein the audit logging mechanism further links the memory access event to prior events via cryptographic hash to form a verifiable chain of memory transactions, whereby whereby the cryptographically governed system provides the artificial intelligence system with only a minimal necessary set of memory data under cryptographic policy constraints and ensures that every access or modification of the memory data is authenticated and indelibly logged for subsequent verification.

13. The cryptographically governed system for contextual memory management in artificial intelligence of claim 12, wherein each memory capsule's embedded scope policy comprises a directed acyclic graph (DAG) of access permissions including nodes representing roles, attributes, and contextual conditions and edges representing logical relationships among said nodes, such that the contextual orchestration engine grants access to a memory capsule only if the artificial intelligence system's verified identity and context fulfill a path through the DAG that authorizes disclosure of the capsule's content.

14. The cryptographically governed system for contextual memory management in artificial intelligence of claim 12, wherein each memory capsule further maintains an internal audit trail and version history embedded within the capsule, including cryptographic hashes of past access events and previous versions of the capsule's data, and wherein the memory wallet node updates this internal audit trail upon each authorized access or update of the capsule, thereby enabling reconstruction of the capsule's state changes over time and detection of any unauthorized tampering with capsule content.

15. The cryptographically governed system for contextual memory management in artificial intelligence of claim 12, wherein the memory capsule ledger is implemented as a distributed ledger or blockchain network comprising a plurality of storage nodes, such that the integrity of stored memory capsules and their access logs is preserved even if a subset of the storage nodes is compromised, all memory capsule records being hash-linked or block-chained to prevent undetected alteration, and all capsule data at rest remaining encrypted under keys managed by the memory wallet node.

16. The cryptographically governed system for contextual memory management in artificial intelligence of claim 12, wherein the cryptographic access control module requires that each request from the artificial intelligence system be accompanied by a signed access token or certificate issued by the memory wallet node, details of the access event token specifying a scope of allowed memory access and a validity duration for that artificial intelligence system, and wherein the contextual orchestration engine is configured to validate a signature and contents of said access token before retrieving any memory capsule, such that no artificial intelligence system can access the memory capsule ledger without presenting a valid, wallet-issued proof of authorization tied to that specific context.

* * * * *